United States Patent
Hook et al.

(10) Patent No.: US 8,343,328 B2
(45) Date of Patent: Jan. 1, 2013

(54) BRINE PURIFICATION

(75) Inventors: Bruce Hook, Lake Jackson, TX (US); Dan Tirtowidjojo, Lake Jackson, TX (US); Frank Koester, Bremervoerde (DE); Sunil K. Chaudhary, Missouri City, TX (US); Anil Mehta, Lake Jackson, TX (US); Jean Chauvel, Jr., Lake Jackson, TX (US); Christopher P Christenson, Seguin, TX (US); Timothy Frank, Midland, MI (US); Celio Lume Pereira, Stade (DE); Steve Gluck, Lake Jackson, TX (US); Glenn Lord, Lake Jackson, TX (US); David West, Houston, TX (US); Christine Lundstroem, Drochtersen (DE); Annett Horn, Hammah (DE); Istvan Lengyel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 522 days.

(21) Appl. No.: 12/670,020

(22) PCT Filed: Aug. 18, 2008

(86) PCT No.: PCT/US2008/073444
§ 371 (c)(1),
(2), (4) Date: Jan. 21, 2010

(87) PCT Pub. No.: WO2009/026208
PCT Pub. Date: Feb. 26, 2009

(65) Prior Publication Data
US 2010/0219372 A1    Sep. 2, 2010

Related U.S. Application Data

(60) Provisional application No. 60/957,673, filed on Aug. 23, 2007.

(51) Int. Cl.
*C25B 1/34* (2006.01)
(52) U.S. Cl. .......... 205/536; 205/742; 205/761
(58) Field of Classification Search .......... 205/536
See application file for complete search history.

(56) References Cited

U.S. PATENT DOCUMENTS

| 4,126,526 A * | 11/1978 | Kwon et al. ......... 205/536 |
| 4,240,885 A | 12/1980 | Suciu et al. |
| 4,415,460 A | 11/1983 | Suciu et al. |
| 5,399,247 A | 3/1995 | Carey et al. |

(Continued)

FOREIGN PATENT DOCUMENTS

EP    1762556    5/2005

(Continued)

OTHER PUBLICATIONS

Martinez-Huitle, et al, "Electrochemical Oxidation of Organic Pollutants for the Waster Treatment: Direct and Indirect Processes", Chem. Soc. Rev., 2006, 35, pp. 1324-1340.

(Continued)

*Primary Examiner* — Necholus Ogden, Jr.

(57) ABSTRACT

Process and apparatus for reducing organic content of brine comprising subjecting a brine solution to at least two purification treatments selected from electrochemical treatment, chlorinolysis, or other chemical oxidation treatment, carbon adsorption, extraction, biological treatment and chrystallizing treatment; wherein the organic content of purified brine is sufficiently low to enable sense of the purified brine in an industrial process.

21 Claims, 8 Drawing Sheets

U.S. PATENT DOCUMENTS

| | | |
|---|---|---|
| 5,486,627 A | 1/1996 | Quarderer |
| 5,532,389 A | 7/1996 | Trent et al. |
| 2010/0193443 A1 | 8/2010 | Chaudhary et al. |
| 2010/0193732 A1 | 8/2010 | Hook et al. |
| 2010/0206744 A1 | 8/2010 | Pereira et al. |
| 2010/0261255 A1 | 10/2010 | Pereira et al. |

FOREIGN PATENT DOCUMENTS

| | | |
|---|---|---|
| WO | 2005/054167 | 6/2005 |
| WO | 2006/020234 | 2/2006 |
| WO | 2006/100318 | 9/2006 |

OTHER PUBLICATIONS

Jin-Fang Zhi et al., Electrochemical Incineration of Organic Pollutants on Boron-Doped Diamond Electrode. Evidence for Direct Electrochemical Oxidation Pathway, American Chemical Society, 2003, 107, pp. 13389-13395.

* cited by examiner

US 8,343,328 B2

BRINE PURIFICATION

CROSS-REFERENCE TO RELATED APPLICATIONS

This is a §371 application of PCT International Patent Application Number PCT/US2008/073444 filed Aug. 18, 2008, and claims priority from provisional application Ser. No. 60/957,673, filed Aug. 23, 2007, each of which is incorporated herein by reference in its entirety. In addition, the present application is related to the following applications, with the disclosures of each of the applications being incorporated by reference herein in their entireties:

Application No. PCT/US2008/073446, filed Aug. 18, 2008, entitled "Total Organic Carbon TOC) Reduction in Brine Via Chlorinolysis".

Application No. PCT/US2008/073448, filed Aug. 18, 2008, entitled "Process and Apparatus for Purification of Industrial Brine".

Application No. PCT/US2008/073449, filed Aug. 18, 2008, entitled "Process, Adapted Microbes, Composition and Apparatus for Purification of Industrial Brine".

Application No. PCT/US2008/073452, filed Aug. 18, 2008, entitled "Brine Purification".

BACKGROUND OF THE INVENTION

1. Field of the Invention

The present invention relates to purified brine, particularly brine having reduced organic content, and even more preferably reduced chlorate content. The present invention also relates to processes and apparatus for obtaining brine having reduced organic content, and even more preferably reduced chlorate content, and can relate to mineralization of brine. The present invention also relates to improvement of processes and apparatus wherein brine is used in the processes or apparatus so as to include brine therein having reduced organic content, and can also include reduced chlorate content, in brine used therein or brine obtained therefrom. The present invention is useful in various processes and technologies, such as processes involving water, waste water and brine purification, and particularly useful in chlorine/alkali processes, and processes involving conversion of glycerin to epichlorohydrin. Thus, the present invention also relates to processes and apparatus for purification of brine generated by industrial processes. Purified brine may be used in industrial processes such as a chlor-alkali process for electrolytic conversion of brine to chlorine gas and sodium hydroxide or hypochlorite.

2. Discussion of Background Information

In chemical processes, there is a need to obtain a maximum utility of incoming process streams as well as the ability to recycle process streams, or to use by-products from one process in other processes, particularly in nearby processes. Such uses of process streams are environmentally and economically desirable.

Some chemical processes use a brine stream with high organic content, such as total organic carbon (TOC) and high sodium chloride content. For example, some chemical processes result in a TOC of up to about 20,000 parts per million (ppm) with a sodium chloride content of up to about 23% by weight. If the TOC can be significantly reduced in concentration, there is the possibility for recycling the brine stream as a raw material for other processes, such as chlor/alkali processes or other electrolysis processes. The presence of sodium chloride may pose difficulties in the removal of organic compounds from various brine by-product streams because some removal processes may cause deleterious precipitation of the sodium chloride in separation equipment. Also, the presence of the chloride ion may result in the formation of undesirably corrosive or toxic chlorinated organic compounds during chemical treatment to destroy the organic compounds.

The brine stream may also contain a variety of organic compounds, some of which may be difficult to remove by traditional techniques such as extraction or carbon bed treatment.

For example, in the production of epichlorohydrin from glycerin, a by-product brine stream may have a TOC of up to about 2500 ppm, typically about 1500 ppm and a sodium chloride content of up to about 23% by weight, typically about 20% by weight. For the successful implementation of a glycerin to epichlorohydrin process and related waste reduction and economic optimization, the discharge of brine should be integrated in the site environmental strategy. The level of sodium chloride (NaCl) is too high for direct discharge, after TOC removal, to the environment. The concentration of NaCl is also too high for effective biological wastewater treatment without significant consumption of fresh water and a corresponding increase in the necessary capacity of the wastewater operation. The main TOC component of the by-product brine stream is glycerin, with the other compounds contributing to TOC of the brine including glycidol, 1,2-dichlorohydrin, or 1,3-dichlorohydrin, 1-chloro-2,3-propanediol, 2-chloro-1,3-propanediol, epichlorohydrin, diglycerol, triglycerol, other oligomeric glycerols, chlorohydrins of oligomeric glycerols, acetic acid, formic acid, lactic acid, glycolic acid, and other aliphatic acids. The TOC specifications for the usage of this brine by a nearby or on-site chlor/alkali process may be only 10 ppm or less. However, the major component of the TOC is glycerin which is difficult to remove by traditional techniques such as extraction or carbon bed treatment.

U.S. Pat. No. 5,486,627 to Quaderer, Jr. et al discloses a method for producing epoxides which is continuous, inhibits formation of chlorinated byproducts, and eliminates or substantially reduces waste water discharge. The method includes: (a) forming a low chlorides aqueous hypochlorous acid solution; (b) contacting the low chlorides aqueous hypochlorous acid solution with at least one unsaturated organic compound to form an aqueous organic product comprising at least olefin chlorohydrin; (c) contacting at least the olefin chlorohydrin with an aqueous alkali metal hydroxide to form an aqueous salt solution product containing at least epoxide; and (d) isolating the epoxide from the aqueous salt solution; wherein water is recovered from the product of at least Step (b) and recycled into Step (a) for use in forming the low chlorides aqueous hypochlorous acid (HOCl) solution. In this process, not only is the water internally recycled after Step (b), but a concentrated brine solution is generated in both Steps (a) and (d) which is useful in other processes such as electrochemical production of chlorine and caustic. The chlorine and caustic, in turn, may then be recycled back for use in forming the low chlorides aqueous HOCl solution. According to U.S. Pat. No. 5,486,627, it is generally preferred, prior to recycling into the chlor-alkali electrochemical cell, to remove any impurities from the brine. These impurities, it is disclosed typically comprise traces of organic solvent as well as HOCl decomposition products such as chloric acid and chlorate ion. A method for removing these impurities may include acidification and chlorine-based oxidation or absorption on carbon or zeolites.

Methods for removing impurities from brine before passing through a chlor/alkali electrochemical cell are disclosed in U.S. Pat. No. 5,532,389 to Trent et al, U.S. Pat. No. 4,126, 526 to Kwon et al, U.S. Pat. No. 4,240,885 to Suciu et al, and U.S. Pat. No. 4,415,460 to Suciu et al. U.S. Pat. No. 5,532,389 to Trent et al discloses removing chlorates from a chloride brine by contacting the chlorates with acid to convert the chlorates to chlorine. Additionally, it is disclosed that by-product organic compounds, such as propylene glycol present in a brine stream containing alkylene oxide are advantageously removed through any oxidation, extraction or absorption process.

U.S. Pat. No. 4,126,526 to Kwon et al discloses an integrated process for electrolytic production of chlorine and the production of an olefin oxide via the chlorohydrin wherein the chlorohydrin is contacted with an aqueous solution of sodium hydroxide and sodium chloride from the cathode compartment of an electrolytic cell, to produce the oxide and brine. The brine is contacted with gaseous chlorine to oxidize organic impurities to volatile organic fragments, which are stripped from the brine, prior to recycling the brine to the electrolytic cell.

In the processes of the two Suciu et al patents, U.S. Pat. Nos. 4,240,885 and 4,415,460, organic impurities in aqueous salt solutions; e.g., alkali or alkaline earth chloride solutions in particular, brines, are oxidized with chlorate ions to convert organics to carbon dioxide. However the processes employ harsh reaction conditions of high temperatures, which are above 130 degrees centigrade (° C.), requiring high pressure equipment, a low pH of less than 5, most preferably less than 1, and chlorate ions which tend to form chlorinated organic compounds.

Conventional processes for purification of brine contaminated with organic impurities include biological treatment; oxidation with chlorine or hypochlorite; absorption over various absorption capable materials such as activated carbon; oxidation with hydrogen peroxide in the presence of dissolved or suspended catalysts or under UV irradiation conditions; oxidation with gaseous oxygen, air or oxygen enriched air in the presence of a dissolved or suspended catalyst; oxidation with ozone in combination with hydrogen peroxide or suspended catalysts. Electrical treatment of aqueous systems, including wastewater, is known, such as disclosed in U.S. Pat. No. 5,399,247 to Carey et al. and Martinez-Huitle et al., "Electrochemical Oxidation of Organic Pollutants for the Waster Treatment: Direct and Indirect Processes", Chem. Soc. Rev., 2006, 35, 1324-1340, which are incorporated by reference herein in their entireties. However, such electrical treatment is not directed to the treatment of contaminated brine to reduce contaminants therein, or for use of the purified brine as process streams, including feed and recycle process streams.

Brine is generated by industrial processes that react chlorine atom-containing compounds with an inorganic base such as sodium hydroxide to form an aqueous brine solution containing chloride salts. Examples include the production of epichlorohydrin by reacting chlorohydrins with sodium hydroxide, the production of epoxy resins by reacting epichlorohydrin with polyphenolic compounds, such as bisphenol A or bisphenol F, in which the base reacts with chlorine atoms of the epichlorohydrin and the phenolic hydrogen atoms, and scrubbing of industrial effluent to remove hydrogen chloride from a chemical stream by reacting the hydrogen chloride with sodium hydroxide, such as in the hydrogen chloride absorber used to remove hydrogen chloride during the phosgenation process used to make isocyanates. The aqueous brine solutions produced by such processes often contain one or more organic compounds (associated with the processes) from which the brine is derived.

Aqueous brine solutions containing sodium chloride as the predominant salt are useful for the production of chlorine gas and sodium hydroxide or hypochlorite by an electrolytic process known as the chlor-alkali process. Chlorine gas, hypochlorite and sodium hydroxide produced by a chlor-alkali process are useful in a number of industrial processes in which chlorine atoms and/or a strong base is/are required. It would be desirable to be able to use aqueous brine solutions produced by industrial processes in the chlor-alkali process to integrate industrial chemical processes and thereby reduce raw material acquisition and byproduct disposal costs.

A problem associated with using aqueous brine solutions produced by industrial processes in the chlor-alkali process is that the presence of impurities such as organic compounds in such aqueous brine solutions must generally be reduced to a very low concentration, because the chlor-alkali process has a low tolerance for impurities, including organic compounds, and/or because products of high purity made from such chlor-alkali process, such as high purity sodium hydroxide, are desired. Generally, the organic compound concentration in aqueous brine used in industrial chlor-alkali production should be less than 50 ppm, and preferably should be less than 10 ppm, total organic carbon (TOC).

A known method for reducing the organic compound concentration in aqueous brine solutions is to conduct chlorinolysis to oxidize organic compounds to more volatile oxidation fragments and/or carbon dioxide that can be stripped from the aqueous brine solution. Chlorinolysis is generally carried out by introducing chlorine gas or hypochlorite into the aqueous brine solution at an elevated temperature. Such a process is disclosed, for example, in U.S. Pat. No. 4,240,885.

A disadvantage of relying solely on chlorinolysis for removal of organic compounds is that substantial amounts of chlorine gas or hypochlorite is generally required to reduce the organic compound concentration to an acceptable level when the initial organic compound concentration prior to chlorinolysis is relatively high. In that case, the purification process consumes a substantial portion of the chlorine gas or hypochlorite generated by the chlor-alkali process to thereby reduce the availability of the chlorine gas or hypochlorite generated by the chlor-alkali process for other industrial processes.

Another disadvantage of relying solely on chlorinolysis is that certain types of compounds such as acids and acid esters are generally more difficult to oxidize to break them down into oxidation fragments sufficiently volatile to be stripped from the aqueous brine solution. Reducing the concentration of such oxygen-containing compounds to an acceptable level via chlorinolysis is difficult and expensive.

Another disadvantage of relying solely on chlorinolysis is that it requires treatment of the vapor stream stripped from the brine solution to prevent discharge of chorine gas, hypochlorite and any chlorinated hydrocarbons into the environment.

Opportunities therefore remain to further improve the purification of aqueous brine solutions containing organic compounds so that the brine can be used for chlor-alkali electrolysis.

SUMMARY OF THE INVENTION

The present invention provides methods for reducing high total organic carbon (TOC) contents of brine streams having a high concentration of sodium chloride, such as a brine by-product stream from the production of epichlorohydrin from glycerin, without deleterious precipitation of the sodium chloride in separation equipment, which can be practiced under a one step process. The formation of undesirably corrosive or toxic chlorinated organic compounds during chemical treatment to destroy the organic compounds is avoided in the present invention. A recyclable brine stream having very low levels of TOC of less than about 10 ppm may be achieved without significant discharge of waste water or consumption of fresh water.

The present invention provides efficient processes and apparatus for purification of brine, especially brine process streams containing high organic concentration.

The present invention provides processes and apparatus for reducing organic content of brine, preferably in one step, and can surprisingly achieve over about 99 percent (%) reduction of total organic carbon content of brine in a one step process.

The present invention also provides for further treatment of reduced organic content brine to reduce concentration of chlorate in brine that has been treated to reduce organic content.

The present invention also provides a method of reducing organic content of brine comprising subjecting a brine solution to at least two purification treatments selected from electrochemical treatment, chlorinolysis or other chemical oxidation treatment, carbon adsorption, extraction, biological treatment and crystallizing treatment; wherein the organic content of purified brine is sufficiently low to enable reuse of the purified brine.

The present invention also provides a method for reducing organic contamination of brine in a chemical process comprising subjecting a brine stream of the chemical process to at least at least two purification treatments selected from electrochemical treatment, chlorinolysis or other chemical oxidation treatment, carbon adsorption, extraction, biological treatment and crystallizing treatment; wherein the organic content of purified brine is sufficiently low to be recycled back to the same chemical process or a different chemical process.

The present invention provides a process for purification of brine contaminated with organic compounds by electrochemical oxidation, preferably with subsequent post-treatment of the purified brine to reduce the concentration of chlorate and/or hypochlorite in the brine. Thus, the electrochemical oxidation of the present invention can be followed by further treatment to reduce the concentration of chlorate, such as treatment with sulfite. Preferably, the organic and chlorate content are reduced to an appropriate level such that the purified brine can be fed to chlor/alkali cells (C/A cells), such as chlor/alkali membrane cells.

The present invention provides a method of reducing organic content of brine, comprising subjecting a brine solution containing an organic content to an electrochemical process for a sufficient period of time, at a sufficient current and at a sufficient voltage to reduce the organic content of the brine to obtain a reduced organic content brine.

The present invention also provides a method for reducing organic contamination of brine in a chemical process comprising subjecting a brine stream of the chemical process to electrochemical oxidation to obtain a reduced organic content brine stream.

The brine can have a sodium chloride concentration of seawater to saturation, about 1 weight percent (wt %) to saturation, about 5 wt % to saturation, 8 wt % to saturation, and can have ranges of from about 15 wt % to about 22 wt % or about 15 wt % to about 22 wt %.

The pH can be neutral to alkali pH.

The pH of the reduced organic content brine can be lowered, such as to a pH of about 1 to about 3, or about 1.5.

The pH of the electrochemical process can be about 7 to about 10.

The chlorate and/or hypochlorite content of the reduced organic content brine can be lowered.

The chlorate content can be lowered by addition of an alkali metal sulfite, and the alkali metal sulfite can comprise sodium sulfite or sodium bisulfite or sulfur dioxide.

The electrochemical process can include a titanium anode.

The titanium anode can be coated with boron doped diamond.

The brine solution containing an organic content comprises a stream in a chemical process.

The reduced organic content brine can be recycled in the chemical process.

The reduced organic content brine can comprise a feed in a different chemical process.

The process can comprise conversion of glycerin to epichlorohydrin, and the reduced organic content brine can be recycled in the glycerin to epichlorohydrin process.

The recycled brine can be treated to reduce chlorate content.

The chemical process can be a chlor/alkali process, such as a chlor/alkali membrane process.

The reduced content brine can be at least one of recycled in the chemical process, fed to a different chemical process, and stored.

The reduced content brine can be treated to remove at least one of chlorate and hypochlorite.

The present invention also provides a process for purifying brine comprising:

(1) providing an aqueous brine solution comprising one or more inorganic salts, one or more organic compounds, and optionally one or more microbial nutrients other than microbial nutrients comprised in the one or more inorganic salts and the one or more organic compounds and (2) conducting at least one unit operation for removing organic compounds from the aqueous brine solution provided in step 1) to obtain a first purified brine solution, wherein the aqueous brine solution contains at least about 10 weight-percent of the one or more inorganic salts, at least about 80 weight-percent of the one or more inorganic salts is sodium chloride, and the at least one unit operation comprises:

(a) contacting the aqueous brine solution with living microbes capable of oxidizing the organic compounds in the presence of oxygen, (b) optionally adding biological nutrients to the aerated aqueous brine solution proportional to microbial demand for biological nutrients not satisfied by the aerated aqueous brine solution and (c) separating the microbes from the aqueous brine solution to obtain the first purified brine solution.

The aqueous brine solution provided in step (1) can contain at least about 15 weight-percent inorganic salts.

The aqueous brine solution provided in step (1) can contain at least about 18 weight-percent inorganic salts.

The aqueous brine solution provided in step (1) can have a total organic carbon concentration greater than about 500 ppm.

The contacting step (a) can be conducted at a temperature in the range from about 15° C. to about 60° C.

The microbes contacted with the aqueous brine solution can be separated from the aqueous brine solution by filtration, straining, centrifugal separation, hydrocyclone separation and/or gravity settling.

The microbes contacted with the aqueous brine solution can be separated from the aqueous brine solution by passing the aqueous brine solution through a membrane that is permeable to the liquid components of the aqueous brine solution and impermeable to the microbes.

A substantial number of microbes contacted with the aqueous brine solution can be immobilized on a solid support, the aqueous brine solution provided in step (1) can be contacted with the immobilized microbes, and the contacted aqueous brine solution can be separated from the immobilized microbes.

The solid support can be a particulate support having a density greater than about 1.5 grams per centimeter cubed (g/cm$^3$).

The organic compounds can be are hydrocarbon compounds having multiple hetero atoms.

The organic compounds can be hydrocarbon compounds having one or more functional groups comprising hydroxy, ester, acid, glycidyl, and amine groups, combinations thereof, and salts thereof.

The one or more organic compounds can comprise (a) one or more multihydroxylated-aliphatic hydrocarbon compound(s), ester(s) thereof and/or monoepoxide(s) thereof, and/or dimers, trimers and/or oligomers thereof, and/or halogenated and/or aminated derivatives thereof, (b) one or more organic acids having from 1 to 10 carbon atoms, ester(s) thereof, monoepoxide(s) thereof and/or salt(s) thereof, (c) one or more ketols, (d) one or more alkylene bisphenol compound(s) and/or epoxide(s), diols and/or chlorohydrins thereof, and/or (e) aniline, methylene dianiline, and/or phenol.

The one or more multihydroxylated-aliphatic hydrocarbon compounds can comprise glycerol.

The one or more organic acids can comprise formic acid, acetic acid, propionic acid, lactic acid and/or glycolic acid and the one or more ketols can comprise 1-hydroxy-2-propanone.

The one or more alkylene bisphenol compound(s) can comprise bisphenol A and/or bisphenol F.

The aqueous brine solution provided in step (1) can be produced by epoxidation of chlorohydrin(s) by reacting chlorohydrins with sodium hydroxide.

The chlorohydrin(s) can be produced by contacting a liquid-phase reaction mixture comprising glycerol and/or ester(s) thereof and/or monochlorohydrin(s) and/or ester(s) thereof with at least one chlorinating feed stream comprising at least one chlorinating agent, optionally in the presence of water, one or more catalyst(s), and/or one or more heavy byproduct(s) in a reaction vessel under hydrochlorination conditions.

The aqueous brine solution provided in step (1) can be produced by epoxidation of at least one alkylene bisphenol compound.

The one or more organic compounds of the aqueous brine solution provided in step (1) can comprise aniline and/or methylene dianiline and can be produced by sodium hydroxide neutralization of hydrogen chloride used to catalyze the reaction of aniline with formaldehyde to make methylene dianiline.

The aqueous brine solution produced by sodium hydroxide neutralization of hydrogen chloride can be subjected to azeotropic distillation to remove at least 50 weight-percent of aniline and/or methylene dianiline present in the aqueous brine solution prior to providing the aqueous brine solution in step (1).

The aqueous brine solution provided in step (1) can not be subjected to a stripping operation to remove aniline and/or methylene dianiline.

The total organic compound concentration (TOC) of the aqueous brine solution provided in step (1) can be at least about 200 ppm.

Less than about 5 weight-percent of the inorganic salt of the aqueous brine solution provided in step (1) can be sodium carbonate and/or sodium sulfate.

The weight ratio of the TOC concentration of the first purified aqueous brine solution to the TOC concentration of the aqueous brine solution provided in step (1) can be less than about 1:20.

The first purified aqueous brine solution separated in (c) can comprise residual organic compounds and the residual organic compound concentration in the first purified aqueous brine solution can be further reduced in one or more subsequent unit operations to obtain a second purified aqueous brine solution.

The one or more subsequent unit operations can comprise chlorinolysis.

The one or more subsequent unit operations can comprise contacting the first purified aqueous brine solution with activated carbon.

The one or more subsequent unit operations can comprise Fenton oxidation.

The one or more subsequent unit operations can comprise electro-oxidation.

The total organic carbon concentration of the purified aqueous brine solution can be less than about 10 ppm.

The purified aqueous brine solution can be electrolyzed to form chlorine gas and sodium hydroxide.

The residence time of the microbes in the aqueous brine solution can be in the range from about 10 hours to about 100 hours.

The weight-ratio of the one or more organic compounds to the microbes can be in the range from about 0.1 to about 1.5.

The first purified brine produced in step (c) can have a TOC concentration less than about 80 ppm.

The microbes can comprise bacteria.

The bacteria can belong to the genus *Vibrio* and/or *Halomonas*.

The bacteria can comprise the species *Vibrio alginolyticus*, *Halomonas salina*, and/or *Halomonas campaniensis*.

The present invention also provides microbes adapted to grow in the presence of oxygen and a brine solution comprising one or more organic compounds, one or more nutrients other than the one or more organic compounds as required for growth of the microbes, and at least 17 weight-percent sodium chloride.

The present invention also provides an aqueous composition comprising one or more organic compounds, a population of living microbes immersed in the aqueous composition in the presence of oxygen, one or more nutrients other than the one or more organic compounds as required for growth of the microbes, and at least 17 weight-percent sodium chloride.

The present invention also provides an aerated aqueous composition comprising at least about 15 weight-percent of one or more inorganic salts, one or more organic compounds, a population of living microbes immersed in the aqueous composition in the presence of oxygen, and one or more nutrients other than the one or more organic compounds as required for growth of the microbes, wherein the one or more inorganic salts comprise at least about 80 weight-percent sodium hydroxide.

The present invention also provides is a composition comprising particles having an average particle size in the range from about 1 to about 200 μm and a particle density greater than about 1.5 g/cm$^3$ coated with biofilm comprising microbes and extracellular polymer substances.

The present invention also provides a process for obtaining salt-tolerant living microbes capable of oxidizing hydrocarbon compounds in an aqueous brine composition comprising sodium chloride comprising:

(1) providing an aqueous composition comprising living microbes, one or more hydrocarbon compounds, oxygen, an osmotically acceptable concentration of two or more inorganic salts comprising sodium chloride and, optionally, one or more nutrients for the living microbes as required for the respiration, growth and/or propagation of the living microbes, and (2) increasing the sodium chloride concentration of the aqueous composition at a rate that allows at least some microbes to survive and adapt to the change in sodium chloride concentration, wherein step (2) comprises increasing the weight ratio of sodium chloride to the other inorganic salts) in the aqueous composition.

The sodium chloride concentration can be increased according to step (2) by at least about 10 weight-percent and the sodium chloride concentration of the aqueous composition after increasing the sodium chloride concentration according to (2) is at least about 17 weight-percent.

The present invention also provides bioreactors for brine purification comprising at least one bioreactor vessel containing salt-tolerant living microbes, wherein the salt-tolerant living microbes are microbes adapted to grow in the presence of oxygen and a brine solution comprising one or more organic compounds, one or more nutrients other than the one or more organic compounds as required for growth of the microbes, and at least about 17 weight-percent sodium chloride and/or microbes obtainable by the above process for obtaining salt-tolerant living microbes.

The present invention also provides a bioreactor for brine purification comprising a bioreactor vessel containing a composition comprising an aqueous brine solution comprising one or more inorganic salts, one or more organic compounds, optionally one or more microbial nutrients, and particles having an average particle size in the range from about 1 to about 200 μm and a particle density greater than about 1.5 g/cm$^3$ coated with biofilm comprising microbes and extracellular polymer substances.

The present invention also provides a process for purifying brine comprising:

(1) providing an aqueous brine solution comprising one or more inorganic salts and one or more organic compounds; and (2) conducting at least one unit operation for removing organic compounds from the brine solution to obtain a purified brine solution;

wherein at least about 80 weight-percent of the one or more inorganic salts of the aqueous brine solution provided in step (1) is sodium chloride and the at least one unit operation comprises a first redissolution operation comprising:

(a) crystallizing sodium chloride in the aqueous brine solution to form sodium chloride crystals and a first mother liquor;

(b) separating the sodium chloride crystals from the first mother liquor;

(c) redissolving the separated sodium chloride crystals in an aqueous solution having an organic compound concentration substantially less than the organic compound concentration in the aqueous brine solution provided in step (1) to obtain a first purified brine solution; and (d) crystallizing a first mother liquor purge stream from the first mother liquor to produce a recycle salt stream that is fed back to the step (a) wherein the mother liquor purge stream from this step (c) has a reduced volume of organic-containing purge.

The aqueous brine solution provided in step (1) can comprise at least about 10 weight-percent inorganic salt(s).

The at least one unit operation further can comprise a second redissolution operation comprising:

(a) crystallizing sodium chloride in the first purified brine solution to form sodium chloride crystals and a second mother liquor;

(b) separating the sodium chloride crystals from the second mother liquor;

(c) redissolving the separated sodium chloride crystals in an aqueous solution having an organic compound concentration substantially less than the organic compound concentration in the first purified brine solution to obtain a second purified brine solution having a total organic carbon (TOC) concentration less than the TOC concentration of the first purified brine solution; and (d) crystallizing a combination of a first mother liquor purge stream from the first mother liquor and a second mother liquor purge stream from the second mother liquor to produce a recycle salt stream that is fed back to the step (a) wherein the mother liquor purge stream from this step (c) has a reduced volume of organic-containing purge.

The first redissolution operation can further comprise a washing operation between step (b) and step (c) of the first redissolution operation in which the crystallized sodium chloride obtained in the step (b) of the redissolution operation is washed with a first aqueous washing solution containing at least about 15 weight-percent sodium chloride and having a TOC concentration substantially less than the TOC concentration in the aqueous brine solution provided in step (1).

The first aqueous washing solution can comprise the second purified brine solution.

The second redissolution operation can further comprise a washing operation between step (b) and step (c) of the second redissolution operation in which the crystallized sodium chloride obtained in the step (b) of the redissolution operation is washed with a second aqueous washing solution containing at least about 15 weight-percent sodium chloride and having a TOC concentration substantially less than the TOC concentration in the aqueous brine solution provided in step (1).

The process can comprise treating the mother liquor separated in step (b) of the first redissolution operation and/or any second redissolution operation in a concentrating operation comprising:

(a) crystallizing sodium chloride in the first mother liquor and/or the second mother liquor to form sodium chloride crystals and a third mother liquor, (b) separating the sodium chloride crystals from the third mother liquor, and (c) redissolving the separated sodium chloride crystals in an aqueous solution having an organic compound concentration substantially less than the organic compound concentration in the aqueous brine solution provided in step (1) to obtain a third purified brine solution.

The concentration operation can further comprise a washing operation between step (b) and step (c) of the concentrating operation in which the crystallized sodium chloride obtained in the step (b) of the concentrating operation is washed with a third aqueous washing solution containing at least about 15 weight-percent sodium chloride and having a total organic carbon (TOC) concentration substantially less than the TOC concentration in the aqueous brine solution provided in step (1).

The process can comprise the second redissolution step and the third aqueous washing solution can comprise the second purified brine solution.

The third purified brine solution can be recycled to the first redissolution operation by combining the third brine solution with a sourced aqueous brine solution to form the aqueous brine solution provided in step (1).

The crystallization step (a) can be conducted via forced circulation evaporative crystallization.

The water evaporated during forced circulation evaporative crystallization can be used as at least a portion of the aqueous solution of at least one redissolving step (c).

The water evaporated during forced circulation evaporative crystallization can be recovered via mechanical vapor recompression (MVR).

The weight-ratio of the amount of organic compound to the amount of sodium chloride present in the first purified brine solution obtained in the first redissolution step can be less than about one-tenth of the weight-ratio of the amount of organic compound to the amount of sodium chloride present in the aqueous brine solution provided in step (1).

The weight-ratio of the amount of organic compound to the amount of sodium chloride present in the second purified brine solution obtained in the second redissolution step can be less than about one-hundredth of the weight-ratio of the amount of organic compound to the amount of sodium chloride present in the aqueous brine solution provided in step (1).

The aqueous brine solution provided in step (1) can comprise aniline, methylene dianiline and/or phenol and is produced by sodium hydroxide neutralization of hydrogen chloride used to catalyze the reaction of aniline with formaldehyde to make methylene dianiline (MDA).

The aqueous brine solution produced by sodium hydroxide neutralization of hydrogen chloride can be subjected to azeotropic distillation to remove at least about 50 weight-percent of aniline and/or methylene dianiline present in the aqueous brine solution prior to providing the aqueous brine solution in step (1).

The aqueous brine solution provided in step (1) can not be subjected to a stripping operation to remove aniline and/or methylene dianiline prior to the first redissolution operation.

The total organic carbon concentration (TOC) of the aqueous brine solution provided in step (1) can be at least about 200 ppm.

Less than about 5 weight-percent of the inorganic salt of the aqueous brine solution provided in step (1) can be salt having carbonate and/or sulfate anions.

The purified brine solution obtained in step (2) can have a total organic carbon concentration less than about 10 ppm.

The purified brine can be introduced into the anode side of an electrolytic cell as at least a portion of brine starting material for making (a) sodium hydroxide and (b) chlorine gas or hypochlorite via the chlor-alkali process.

The process can be a continuous process.

The present invention also provides an apparatus for purifying brine comprising:

(1a) a first forced circulation evaporative crystallizer;
(1b) a second forced circulation evaporative crystallizer;
(2a) a first separation device for separating solids from liquids;
(2b) a second separation device for separating solids from liquids;
(3a) a first dilution vessel; and
(3b) a second dilution vessel, wherein the first forced circulation evaporative crystallizer is connected to the first separation device for conducting a slurry stream comprising an aqueous liquid and crystals from the first forced circulation evaporative crystallizer to the first separation device;

the first separation device is connected to the first dilution vessel for conducting crystals from the first separation device to the first dilution vessel;

the first dilution vessel is connected to a source of aqueous liquid for redissolving crystals received from the first separation device;

the first dilution vessel is connected to the second forced circulation evaporative crystallizer for conducting a brine comprising redissolved crystals from the first dilution vessel to the second forced circulation evaporative crystallizer;

the second forced circulation evaporative crystallizer is connected to the second separation vessel for conducting a slurry stream comprising an aqueous liquid and crystals from the second forced circulation evaporative crystallizer to the second separation device;

the second separation device is connected to the second dilution vessel for conducting crystals from the second separation device to the second dilution vessel;

the second dilution vessel is connected to a source of aqueous liquid for redissolving crystals received from the second separation device; and the second dilution vessel is connected to the first separation device for conducting a brine comprising redissolved crystals from the second dilution vessel to the first separation device for washing the crystals separated by the first separation device.

The apparatus can further comprise:
(1c) a third forced circulation evaporative crystallizer;
(2c) a third separation device; and
(3c) a third dilution vessel, wherein the first separation device and/or the second separation device is/are connected to the third forced circulation evaporative crystallizer for conducting the separated aqueous liquid from the first separation device and/or the second separation device to the third forced circulation evaporative crystallizer;

the third forced circulation evaporative crystallizer is connected to the third separation device for conducting a slurry stream comprising an aqueous liquid and crystals from the third forced circulation evaporative crystallizer to the third separation device for separating the crystals from the aqueous liquid; and the third separation device is connected to the third dilution vessel for the first forced circulation evaporative crystallizer for conducting crystals from the third separation device to the third dilution vessel;

the third dilution vessel is connected to a source of aqueous liquid for redissolving crystals received from the third separation device; and the third dilution vessel is connected to the first forced circulation evaporative crystallizer for conducting a brine comprising redissolved crystals from the third dilution vessel to the first forced circulation evaporative crystallizer The first separation device can be connected to the first forced circulation evaporative crystallizer for conducting at least some of the separated aqueous liquid from the first separation device to the first forced circulation evaporative crystallizer The second separation device can be connected to the second forced circulation evaporative crystallizer for conducting at least some of the separated aqueous liquid from the second separation device to the second forced circulation evaporative crystallizer.

The third separation device can be connected to the third forced circulation evaporative crystallizer for conducting at least some of the separated aqueous liquid from the third separation device to the third forced circulation evaporative crystallizer.

The apparatus can further comprise a first mechanical vapor recompression device and a first heat exchanger in heat exchanging association with the first forced circulation evaporative crystallizer, wherein the first mechanical vapor recompression device is connected to the first forced circulation evaporative crystallizer for conducting aqueous vapor from the first forced circulation evaporative crystallizer to the first mechanical vapor recompression device, the first mechanical vapor recompression device is connected to the first heat exchanger for conducting compressed aqueous vapor from the first mechanical vapor recompression device to the first heat exchanger for condensing the aqueous vapor to form an aqueous liquid, and the first heat exchanger is connected to the first dilution vessel for conducting condensed aqueous liquid from the first heat exchanger to the first dilution vessel.

The apparatus can further comprise a second mechanical vapor recompression device and a second heat exchanger in heat exchanging association with the second forced circulation evaporative crystallizer, wherein the second mechanical vapor recompression device is connected to the second forced circulation evaporative crystallizer for conducting aqueous vapor from the second forced circulation evaporative crystallizer to the second mechanical vapor recompression device, the second mechanical vapor recompression device is connected to the second heat exchanger for conducting compressed aqueous vapor from the second mechanical vapor recompression device to the second heat exchanger for condensing the aqueous vapor to form an aqueous liquid, and the second heat exchanger is connected to the second dilution vessel for conducting condensed aqueous liquid from the second heat exchanger to the second dilution vessel.

The apparatus can further comprise a third mechanical vapor recompression device and a third heat exchanger in heat exchanging association with the third forced circulation evaporative crystallizer, wherein the third mechanical vapor recompression device is connected to the third forced circulation evaporative crystallizer for conducting aqueous vapor from the second forced circulation evaporative crystallizer to the second mechanical vapor recompression device, the second mechanical vapor recompression device is connected to the second heat exchanger for conducting compressed aqueous vapor from the second mechanical vapor recompression device to the second heat exchanger for condensing the aqueous vapor to form an aqueous liquid, and the second heat exchanger is connected to the third dilution vessel for conducting condensed aqueous liquid from the third heat exchanger to the third dilution vessel.

The at least one connection for a liquid or slurry can comprise at least one pump for applying pressure to the liquid or slurry in the specified conducting direction.

Each separation device can be a centrifuge and/or a hydrocyclone.

The present invention is also directed to a chemical process apparatus for producing purified brine comprising a chemical reaction apparatus suitable for reacting a chlorine-atom containing compound with sodium hydroxide to make an aqueous brine solution and a brine purification apparatus, wherein the chemical reaction apparatus is connected to the brine purification apparatus for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus.

The chemical reaction apparatus can be suitable for converting chlorohydrins to epichlorohydrin.

The chemical process apparatus can further comprise a hydrochlorination apparatus suitable for making chlorohydrin(s) and the hydrochlorination apparatus is connected to the chemical reactor apparatus for conducting a stream comprising chlorohydrin(s) from the apparatus for making chlorohydrin(s) to the chemical reactor apparatus.

The chemical reactor apparatus can be an apparatus suitable for making epoxy resin(s).

The chemical reactor apparatus can be an apparatus suitable for making methylene dianiline.

The present invention also provides a chemical process apparatus for producing purified brine comprising a chemical reaction apparatus suitable for reacting a chlorine-atom containing compound with sodium hydroxide to make an aqueous brine solution and a brine purification apparatus according to the present invention, wherein the chemical reaction apparatus is connected to the brine purification apparatus for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus.

The TOC content of a brine by-product stream having a high TOC content of from about 200 ppm to about 20,000 ppm, preferably from about 500 ppm to about 10,000 ppm is reduced in a plurality of stages under relatively mild temperature and reaction conditions to avoid formation of chlorate and chlorinated organic compounds while achieving a recyclable brine stream having a total organic carbon content of less than about 10 ppm. The low levels of TOC may be obtained even with brine recycle streams containing substantial amounts of difficult to remove organic compounds such as glycerin. The sodium chloride content of the brine by-product stream may be from about 15% by weight to about 23% by weight, based upon the weight of the brine by-product stream. The methods of the present invention may be employed for substantially reducing the TOC content of a brine by-product stream produced in the production of epichlorohydrin from glycerin, which may have a glycerin content of at least about 50% by weight, generally at least about 70% by weight by weight, based upon the weight of the total organic carbon content.

In embodiments of the invention, in a first stage treatment, a brine byproduct stream having a high total organic carbon content, may be subjected to chlorinolysis at a temperature of less than about 125° C., but generally higher than about 60° C., for example from about 85° C. to about 110° C., preferably from about 90° C. to about 100° C., to obtain a chlorinolysis product stream having a TOC content of less than about 100 ppm. The chlorinolysis product stream may be treated in a second stage treatment with activated carbon to obtain a recyclable brine stream with a content of less than about 10 ppm.

The chlorinolysis of the total organic carbon (TOC) of the brine byproduct stream may be achieved by treatment of the brine by-product stream with sodium hypochlorite or bleach directly, or by treatment of the brine by-product stream with chlorine gas, $Cl_2$, and sodium hydroxide which form sodium hypochlorite in situ for the chlorinolysis.

For the chlorinolysis, the molar ratio of the sodium hypochlorite to the total organic carbon in the brine by-product stream may be from about 0.5 to about 5 times the stoichiometric ratio of sodium hypochlorite to total organic carbon content of the brine by-product stream. In preferred embodiments, the chlorinolysis may be conducted at a molar ratio of sodium hypochlorite to the total organic carbon content in the brine by-product stream which is in excess of the stoichiometric ratio of sodium hypochlorite to total organic carbon content of the brine by-product stream. A preferred stoichiometric excess may be a molar ratio of sodium hypochlorite to the total organic carbon content in the brine by-product stream of from about 1.1 to about 2 times the stoichiometric ratio of sodium hypochlorite to total organic carbon content of the brine by-product stream.

The chlorinolysis may be conducted at a pH of about 3.5 to about 11.8 with or without the addition of a pH controlling or pH adjusting agent. Exemplary of pH controlling agents which may be employed are HCl and NaOH or other inorganic acids and bases. Atmospheric pressure or slightly elevated pressure sufficient to prevent boiling may be employed for the chlorinolysis. A residence time or reaction time for the chlorinolysis may be at least about 10 minutes, for example from about 30 minutes to about 60 minutes.

In preferred embodiments of the invention, the pH of the chlorinolysis product stream may be adjusted to a pH of about 2 to about 3 to protonate organic acids in the chlorinolysis product stream for the treatment with the activated carbon, and the activated carbon is acidified activated carbon obtained by washing activated carbon with hydrochloric acid.

In other embodiments of the invention, a brine by-product stream a brine recycle stream, or a chlorinolysis product stream, may be subjected to: (1) a Fenton oxidation with hydrogen peroxide and iron (II) catalyst in two stages; (2) an activated carbon treatment followed by a Fenton oxidation with hydrogen peroxide and iron (II) catalyst; or (3) a Fenton oxidation with hydrogen peroxide and iron (II) catalyst followed by an activated carbon treatment; to obtain a recyclable brine stream with a TOC content of less than about 10 ppm.

The present invention provides a method for reducing the total organic carbon content of a brine by-product stream comprising:

(a) subjecting a brine by-product stream having a high total organic carbon content to chlorinolysis at a temperature of less than about 125° C. to obtain a chlorinolysis product stream, and (b) treating the chlorinolysis product stream with activated carbon to obtain a recyclable brine stream.

The chlorinolysis can comprise treatment of the brine by-product stream with sodium hypochlorite.

The molar ratio of the sodium hypochlorite to the total organic carbon in the brine by-product stream can be a stoichiometric excess of the sodium hypochlorite.

The chlorinolysis can comprise treatment of the brine by-product stream with chlorine gas and sodium hydroxide to obtain sodium hypochlorite for reaction with the total organic carbon content of the brine by-product stream.

The molar ratio of the sodium hypochlorite to the total organic carbon in the brine by-product stream can be a stoichiometric excess of the sodium hypochlorite.

The chlorinolysis can be conducted at a pH of about 3.5 to about 11.8.

The molar ratio of the sodium hypochlorite to the total organic carbon in the brine by-product stream can be from about 0.5 to about 5 times the stoichiometric ratio of sodium hypochlorite to total organic carbon content of the brine by-product stream.

The chlorinolysis can be conducted at a temperature of from about 85° C. to about 110° C. to obtain the chlorinolysis product stream.

The total organic carbon content of the brine by-product stream can comprise glycerin in an amount of at least about 50% by weight, based upon the weight of the total organic carbon content.

The brine by-product stream can be produced in the production of epichlorohydrin from glycerin.

The total organic carbon content of the brine by-product stream subjected to the chlorinolysis can be at least about 500 ppm by weight, the chlorinolysis reduces the total organic carbon content of the brine by-product stream to less than about 100 ppm by weight, and the treatment of the chlorinolysis product stream with the activated carbon can further reduce the total organic carbon content of the chlorinolysis product stream to less than about 10 ppm by weight to obtain the recyclable brine stream The pH of the chlorinolysis product stream can be adjusted to a pH of about 2 to about 3 for the treatment with the activated carbon.

The recyclable brine stream can be recycled to a chlor-alkali process.

The chlorinolysis can be conducted at about atmospheric pressure, a residence time of about 30 minutes to about 60 minutes, and a temperature of about 90° C. to about 100° C.

The sodium chloride content of the brine by-product stream can be s from about 15% by weight to about 23% by weight, based upon the weight of the brine by-product stream.

The pH of the chlorinolysis product stream can be adjusted to a pH of about 2 to about 3 to protonate organic acids in the chlorinolysis product stream for the aid treatment with the activated carbon, and the aid activated carbon can be acidified activated carbon obtained by washing activated carbon with hydrochloric acid.

The present invention also provides a method for reducing the total organic carbon content of a brine by-product stream comprising:

(a) subjecting a brine by-product stream produced in the production of epichlorohydrin from glycerin to chlorinolysis by admixing the brine by-product stream with chlorine gas and sodium hydroxide at a pH of about 3.5 to about 11.8 and a temperature of less than about 125° C., said brine by-product stream having a total organic carbon content of at least about 500 ppm by weight and a sodium chloride content of about 15% by weight to about 23% by weight, based upon the weight of the brine by-product stream, wherein the chlorinolysis reduces the total organic carbon content of the brine by-product stream to less than about 100 ppm by weight, based upon the weight of the resulting chlorinolysis product stream, (b) adjusting the pH of the chlorinolysis product stream to a pH of from about 2 to about 3, and (c) treating the chlorinolysis product stream with acidified activated carbon to obtain a recyclable brine stream, wherein treatment of the chlorinolysis product stream with the activated carbon further reduces the total organic carbon content of the chlorinolysis product stream to less than about 10 ppm by weight.

The amount of chlorine gas and the amount of sodium hydroxide employed in the chlorinolysis can provide a molar ratio of sodium hypochlorite to the total organic carbon content in the brine by-product stream of from about 0.5 to about 5 times the stoichiometric ratio of sodium hypochlorite to total organic carbon content of the brine by-product stream.

The chlorinolysis can be conducted at a molar ratio of sodium hypochlorite to the total organic carbon content in the brine by-product stream which is in excess of the stoichiometric ratio of sodium hypochlorite to total organic carbon content of the brine by-product stream.

The chlorinolysis can be conducted at about atmospheric pressure, a residence time of about 30 minutes to about 60 minutes, a temperature of about 90° C. to about 100° C., and a molar ratio of sodium hypochlorite to the total organic carbon content in the brine by-product stream of from about 1.1 to about 2.

Other features and advantages of the present invention will be set forth in the description of invention that follows, and will be apparent, in part, from the description or may be learned by practice of the invention. The invention will be realized and attained by the compositions, products, and methods particularly pointed out in the written description and claims hereof.

In all aspects of the present invention, the brine may be optionally used in a chlor-alkali plant to produce sodium hydroxide solution, including, perhaps, the source of sodium hydroxide used to produce the brine itself.

BRIEF DESCRIPTION OF THE DRAWINGS

The present invention is further described in the detailed description which follows, in reference to the figures of drawings by way of non-limiting example of exemplary embodiments of the present invention, wherein.

DETAILED DESCRIPTION OF THE PRESENT INVENTION

Figure 1:
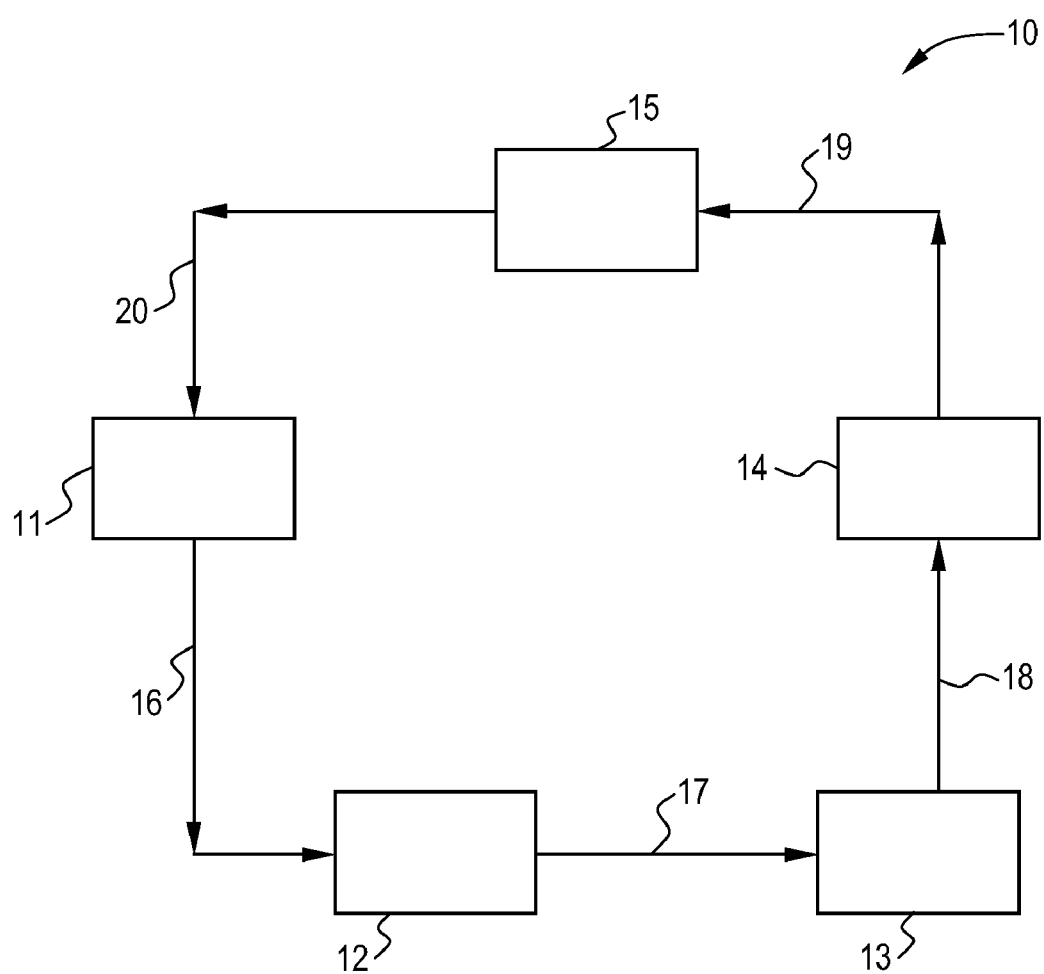
FIG. 1 illustrates a block flow diagram of one embodiment of the present invention wherein electrochemical advanced oxidation and optional chlorate removal are illustrated for a glycerin to epichlorohydrin conversion process wherein the treated brine is recycled to a C/A cell.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The present invention can be employed for purification of brine in general, independent of the use of the purified brine.

The present invention can purify brine at least to reduce the organic carbon content thereof utilizing at least one treatment method. The at least one treatment method can comprise a combination of multiple treatments methods, such as combinations of two or more treatment methods, three or more treatment methods, four or more treatment methods, etc. Thus, any of the treatment methods disclosed herein can be used individually as well as in any combination to purify brine for any use of the purified brine. For example, biological treatment, chemoelectrical treatment, chlorinolysis and crystallization, such as disclosed herein can be individually used or used in any combination to provide purified brine.

Definitions

As used herein, the term "microbes" refers to microorganisms capable of aerobic respiration and organics degradation.

The abbreviation "ATCC" refers to the "American Type Culture Collection". The ATCC is an internationally recognized biological depository institution under the Budapest Treaty.

As used herein, the term "immobilize" in reference to the microbes refers to adhering or adsorbing a substantial number, preferably a predominant number, of the total number of microbes on a substantially solid support. Examples of microbe immobilization include capture in a porous support, such as a filter medium, and adhesion of microbes to a solid support via a biofilm.

As used herein, the term "biofilm" refers to an aggregation of microbes in a matrix of extracellular polymer substances (EPS) adhered to a substantially solid support. The EPS may be generated by the microbes and/or provided or supplemented by natural and/or synthetic polymers not generated by the microbes. When the EPS is generated by the microbes, the EPS may comprise exopolysaccharide(s). The exopolysaccharide(s) play a significant role in adhering the biofilm to the solid support. Microbial EPS production generally increases when the concentration of sources of caloric cell energy is reduced to the minimum concentration required for cellular activity.

The term, "BOD" refers to "five day biological oxygen demand".

The term, "COD" refers to "chemical oxygen demand".

As used herein, the term "nutrient" refers to substances that provide nitrogen, phosphorus, and/or trace elements required by living microbes, including the microbes capable of organic compound degradation in the aqueous brine solution. Examples include yeast extract, urea (N), phosphoric acid (P), Fe, Mn, Se, etc. The nutrients may be comprised in the organic compound and/or inorganic salt components of the aqueous brine solution and/or may be added to the aqueous brine solution as additional components. The nutrients are preferably present in a concentration sufficient to provide an average of about 5 parts-by-weight nitrogen and about 1 part-by-weight phosphorus per 100 parts-by-weight BOD.

As used herein, the expression "total organic carbon" abbreviated hereafter as ("TOC") refers to the concentration of organic compounds in a given composition expressed in terms of the total weight of carbon atoms present in the organic compound molecules present in that composition. In other words, TOC excludes the contribution of atoms in organic molecules other than carbon to the total weight of the organic molecules when calculating the concentration of the organic compounds in terms of weight-percent or parts-per-million (ppm). TOC also excludes carbon atoms that are not present in organic compounds, such as the carbon atoms present in carbon dioxide.

As used herein, the term "multihydroxylated-aliphatic hydrocarbon compound" abbreviated hereafter as ("MAHC") refers to a compound that contains at least two hydroxyl groups covalently bonded to two separate vicinal carbon atoms and no ether linking groups. They contain at least two sp3 hybridized carbons each bearing an OH group. The MAHCs include any vicinal-diol (e.g., 1,2-diol) or triol (e.g., 1,2,3-triol) containing hydrocarbon including higher orders of contiguous or vicinal repeat units. The definition of MAHC also includes for example one or more 1,3- 1,4-, 1,5- and 1,6-diol functional groups as well. Geminal-diols, for example, are precluded from this class of MAHCs.

The MAHCs contain at least about 2, preferably at least about 3, up to about 60, preferably up to about 20, more preferably up to about 10, even more preferably up to about 4, and yet more preferably up to about 3, carbon atoms and can contain, in addition to aliphatic hydrocarbon, aromatic moieties or heteroatoms including for example halide, sulfur, phosphorus, nitrogen, oxygen, silicon, and boron heteroatoms; and mixtures thereof. The MAHCs may also be a polymer such as polyvinyl alcohol.

The terms "glycerin", "glycerol" and "glycerine", and esters thereof, may be used as synonyms for the compound 1,2,3-trihydroxypropane, and esters thereof.

As used herein, the term "chlorohydrin" means a compound containing at least one hydroxyl group and at least one chlorine atom covalently bonded to two separate vicinal aliphatic carbon atoms and no ether linking groups. Chlorohydrins are obtainable by replacing one or more hydroxyl groups of MAHCs with covalently bonded chlorine atoms via hydrochlorination. The chlorohydrins contain at least 2, and preferably at least 3, up to about 60, preferably up to 20, more preferably up to 10, even more preferably up to 4, and yet more preferably up to 3, carbon atoms and, in addition to aliphatic hydrocarbon, can contain aromatic moieties or heteroatoms including for example halide, sulfur, phosphorus, nitrogen, oxygen, silicon, and boron heteroatoms, and mixtures thereof. A chlorohydrin that contains at least two hydroxyl groups is also a MAHC.

The term "epoxide" means a compound containing at least one oxygen bridge on a carbon-carbon bond. Generally, the carbon atoms of the carbon-carbon bond are contiguous and the compound can include other atoms than carbon and oxygen atoms, like hydrogen and halogens, for example. Preferred epoxides are ethylene oxide, propylene oxide, glycidol and epichlorohydrin, or their derivatives.

The term "TAFFY process" refers to a popular industrial process for preparing solid epoxy resin polymers where bisphenol-A and epichlorohydrin are reacted in presence of sodium hydroxide.

The term "LER" stands for liquid epoxy resin and refers to a lower molecular weight epoxy resin, including its oligomers, formed from the reaction of bisphenol A, epichlorohydrin and sodium hydroxide with sodium chloride as a reaction by-product.

As used herein, the term "hetero atom" refers to an atom of the Periodic Table of Elements other than a carbon atom or a hydrogen atom.

As used herein, the expression, "liquid phase" refers to a continuous intermediate phase between gas phase and a solid phase that may optionally comprise a minor amount of gas and/or solid discrete phase(s). The liquid phase may comprise one or more immiscible liquid phases and may contain one or more dissolved solids, such as one or more acids, bases, or salts.

As used herein, the expression "vapor phase" refers to a continuous gaseous phase that may optionally comprise a minor amount of liquid and/or solid discrete phase(s) (e.g., aerosol). The vapor phase may be a single gas or a mixture, such as a mixture of two or more gases, two or more liquid discrete phases, and/or two or more solid discrete phases.

As used herein, the term "aerated" means that the referenced liquid-phase substance or composition contains molecular oxygen, alone or mixed with one or more other gases, dissolved and/or dispersed in the substance or composition. The oxygen may be introduced to the substance or composition as a pure gas, as a gas admixed with other gases, such as nitrogen, e.g., air or air enriched with oxygen gas, or via chemical decomposition, such as through the introduction of hydrogen peroxide. The introduction of oxygen may be carried out by injecting oxygen-containing gas into the referenced liquid-phase substance or composition, agitation at the liquid surface interface, and/or via an oxygen-permeable membrane, for example.

Standard test methods commonly accepted in the industry are used for parameters (such as BOD, TOC, etc) discussed in the present invention.

Aqueous Brine Solution

The aqueous brine solution treated according to the present invention comprises one or more inorganic salts and one or more organic compounds.

The one or more inorganic salts can comprise at least about 80, at least about 90, at least about 95, even at least about 99, and also at least about 99.9, weight-percent sodium chloride.

The aqueous brine solution can comprise at least about 10, at least about 14, at least about 17, up to saturation, more preferably up to about 23, weight-percent inorganic salt(s).

In embodiments, the aqueous brine solution can comprise at least about 10, at least about 14, at least about 17, up to saturation, more preferably up to about 23, weight-percent sodium chloride.

Brine can comprise a salt solution, such as a potassium chloride and/or sodium chloride salt solution, and most commonly comprises a sodium chloride salt solution. The brine can comprise any brine solution, and can comprise brine solutions having a salt concentration as low as the concentration of salt in sea water and as high as saturation of the salt in solution, and can even be present in a concentration over saturation. The brine usually comprises salt concentrations, such as concentration of sodium chloride, of up to about 22 wt %. For example, the brine can be a salt solution comprising sodium chloride at a concentration of about 1 wt % to saturation, about 5 wt % to saturation, about 8 wt % to saturation, with ranges including about 8 wt % to about 12 wt %, or about 15 wt % to about 22 wt %.

The aqueous brine solution can contain less than about 100, less than about 10, and less than about 1 ppm of each inorganic salt comprising a cation other than an element belonging to Group I of the Periodic Table of Elements i.e., the alkali metal(s). Examples of such cations include elements belonging to Group II of the Periodic Table of Elements such as Ca, Mg, Sr, and Ba, transition elements such as Cr, Mn, Fe, Ni, Cu, Zn, and Mo, other elements such as Al and Si, and $NH_4^+$. The total amount of inorganic salt comprising a cation other than an element belonging to Group I of the Periodic Table of Elements in the aqueous brine solution can be less than about 100, less than about 10, and less than about 1 ppm.

The aqueous brine solution preferably can contain less than about 100, less than about 10, and less than about 1 ppm of each inorganic salt comprising an anion other than $Cl^-$. Examples of such anions include $CO_3^-$, $SO_4^{2-}$, $NO_3^-$, and $ClO_4^{2-}$. The total amount of inorganic salt in the aqueous brine solution comprising anions other than $Cl^-$ is preferably less than about 100, more preferably less than about 10, even more preferably less than about 5, and yet more preferably less than about 1 ppm.

The one or more organic compounds may be selected from any known organic compounds. The organic compounds are preferably compounds that contain moieties amenable to forming volatile oxidation fragments and/or carbon dioxide via biological oxidation. The organic compounds can be hydrocarbon compounds comprising one or more, such as multiple, carbon atoms, one or more, such as multiple, hydrogen atoms, and optionally one or more, such as multiple, hetero atoms. The hetero atom(s) can be selected from O, N, and halogens, such as Cl.

The organic compounds can be hydrocarbon compounds having one or more functional groups. Functional groups can include hydroxy, ester, acid, glycidyl, and amine groups, combinations thereof, and salts of salt-forming functional groups, such as salts of acid and amine groups.

The organic compounds can have a number average molecular weight, $MW_n$, of at least about 40, more preferably at least about 60, preferably up to about 500, more preferably up to about 300, grams per mole (g/mole).

Examples of organic compounds include (a) one or more multihydroxylated-aliphatic hydrocarbon compounds, esters thereof and/or monoepoxides thereof, and/or dimers, trimers and/or oligomers thereof, and/or halogenated and/or aminated derivatives thereof, (b) one or more organic acids preferably having from 1 to about 10 carbon atoms, esters thereof, monoepoxides thereof and/or salts thereof, (c) one or more ketols such as 1-hydroxy-2-propanone (d) one or more alkylene bisphenol compound(s) and/or epoxide(s), diols and/or chlorohydrins thereof, and/or (e) aniline, toluene, methylene dianiline, and/or phenol.

Multihydroxylated-aliphatic hydrocarbon compounds can include, for example, 1,2-ethanediol; 1,2-propanediol; 1,3-propanediol; 3-chloro-1,2-propanediol; 2-chloro-1,3-propanediol; 1,4-butanediol; 1,5-pentanediol; cyclohexanediols; 1,2-butanediol; 1,2-cyclohexanedimethanol; 1,2,3-propanetriol (also known as, and used herein interchangeable as, "glycerin", "glycerine", or "glycerol"); and mixtures thereof. The MAHCs in the effluents treated according to the present invention can include, for example, 1,2-ethanediol; 1,2-propanediol; 1,3-propanediol; and 1,2,3-propanetriol; with 1,2,3-propanetriol being most preferred.

Examples of esters of MAHCs include ethylene glycol monoacetate, propanediol monoacetates, glycerin monoacetates, glycerin monostearates, glycerin diacetates, and mixtures thereof.

Examples of monoepoxides of MAHCs include glycidol, dichloropropyl glycidyl ethers and epichlorohydrin, and mixtures thereof.

Examples of organic acids include formic acid, acetic acid, propionic acid, lactic acid and glycolic acid, and mixtures thereof.

Examples of alkylene bisphenol compounds include bisphenol A and bisphenol F, as well as derivatives of these compounds perhaps also containing epoxide groups.

The organic compounds are can be present in a total organic carbon (TOC) concentration greater than about 100 ppm, greater than about 500 ppm, greater than about 1,000 ppm, and even greater than about 5,000 ppm.

Amounts of certain organic compounds are presented below in Table 1 based on the total weight of the respective organic compound in the aqueous brine solution.

TABLE 1

Preferred Concentrations of Organic Compounds in Parts-per-Million (ppm)

| Organic Compound | Preferred Minima | | | Preferred Maxima | | |
|---|---|---|---|---|---|---|
| Glycerine | 0 | 500 | 2,000 | 5,000 | 10,000 | 50,000 |
| Glycidol | 0 | 50 | 200 | 500 | 1,000 | 5,000 |
| Hydroxy-2-propanone | 0 | 10 | 40 | 100 | 300 | 1,000 |
| Bis-Ethers | 0 | 0.01 | 0.1 | 1 | 5 | 10 |
| Dichloropropyl glycidyl ethers | 0 | 0.01 | 0.1 | 11 | 22 | 33 |
| Epichlorohydrin | 0 | 0.01 | 0.1 | 1 | 10 | 100 |
| Bisphenol A | 0 | 100 | 500 | 5,000 | 10,000 | 50,000 |
| Bisphenol F | 0 | 100 | 500 | 5,000 | 10,000 | 50,000 |
| Diglycidyl ether of bisphenol A | 0 | 100 | 500 | 5,000 | 10,000 | 50,000 |
| Aniline | 0 | 100 | 500 | 5,000 | 10,000 | 50,000 |
| Methylene dianiline | 0 | 100 | 500 | 5,000 | 10,000 | 50,000 |
| Phenol | 0 | 100 | 500 | 5,000 | 10,000 | 50,000 |
| Formate | 0 | 1 | 5 | 75 | 400 | 1000 |
| Acetate | 0 | 1 | 5 | 75 | 400 | 1000 |
| Lactate | 0 | 1 | 5 | 75 | 400 | 1000 |
| Glycolate | 0 | 1 | 5 | 75 | 400 | 1000 |

The aqueous brine solution can be the product of a process wherein a base comprising sodium hydroxide is reacted with a compound having at least one chlorine atom per molecule to form one or more inorganic salts comprising at least about 80, more preferably at least about 90, even more preferably at least about 95, and yet more preferably at least about 99, yet more preferably at least about 99.9, and yet even more preferably at least about 99.99, weight-percent sodium chloride.

The aqueous brine solution can be is produced by epoxidation of chlorohydrin(s) by reacting chlorohydrins with sodium hydroxide. The chlorohydrins can be produced by contacting a reaction mixture comprising multihydroxylated-aliphatic hydrocarbon compounds and/or ester(s) thereof with at least one chlorinating feed stream comprising at least one chlorinating agent, optionally in the presence of water and one or more catalysts, in a reaction vessel under hydrochlorination conditions. The multihydroxylated-aliphatic hydrocarbon compounds preferably comprise glycerol. At least about 50 weight-percent or at least about 70 weight-percent of the multihydroxylated-aliphatic hydrocarbon compounds can be glycerol. The glycerol can be sourced from the production of oleochemicals or biodiesel. Such processes are disclosed, for example, in WO 2006/020234, WO 2005/05147, WO 2006/100318, EP-A-1687248, and EP-A-1762556. The relevant disclosure of each of the above documents is incorporated herein by reference.

The brine sourced from the above dehydrochlorination process generally comprises one or more multihydroxylated-aliphatic hydrocarbon compounds, esters thereof and/or monoepoxides thereof, and/or dimers, trimers and/or oligomers thereof, and/or halogenated and/or aminated derivatives thereof. Amounts of such compounds that may be present in the aqueousbrine solution are specified in the Table 1 above.

The aqueous brine solution can also be produced by epoxidation of at least one polyphenol compound in the presence of an aqueous base comprising sodium hydroxide. In a preferred embodiment, the polyphenol compound comprises bisphenol A and the brine is preferably sourced from a TAFFY process for making higher molecular weight solid epoxy resins. In another preferred embodiment, the polyphenol compound comprises bisphenol A and the brine is preferably sourced from a process for making lower molecular weight liquid epoxy resins. In another embodiment, the polyphenol compound is bisphenol F and/or one or more resols obtainable as a reaction product of diphenols with an aldehyde, such as formaldehyde and the brine is sourced from a process for making liquid epoxy novolac (LEN). The epoxidation can be carried out by reacting at least one polyphenol with epichlorohydrin in the presence of an aqueous base comprising sodium hydroxide. The epichlorohydrin can be sourced from a process for making epichlorohydrin such as described herein.

The brine sourced from the above epoxidation process generally comprises one or more polyphenol compounds and/or glycidyl ethers of the one or more polyphenol compounds. Amounts of polyphenol compounds and epoxidized polyphenol compounds that may be present in the aqueous brine solution are specified in the Table 1 above.

The aqueous brine solution can also be produced by contacting a vapor phase effluent comprising a chlorinating agent and one or more organic compounds with an aqueous base comprising sodium hydroxide for removing the chlorinating agent from the vapor phase effluent. In a preferred embodiment, the source of the vapor phase effluent is a chemical reactor. The chlorinating agent is preferably hydrogen chloride. The reaction mixture is preferably a liquid phase reaction mixture. The contacting can be carried out using a vapor-liquid contacting device.

The aqueous brine solution can be produced by neutralization of hydrogen chloride used to catalyze the reaction of aniline with formaldehyde to make methylene dianiline (MDA), which is useful for the production of (poly)isocyanates. Aniline, toluene and other suitable solvents may also be used extraction of MDA and other desirable products. The removal of hydrogen chloride can be carried out by a process described in the previous paragraph. The brine sourced from the neutralization step generally comprises aniline, toluene (if used as solvent), methylene dianiline and/or phenol.

The aqueous brine solution containing aniline, toluene and/or methylene dianiline can be subjected to stripping or azeotropic distillation to remove aniline, toluene and/or methylene dianiline present in the aqueous brine solution prior to providing the aqueous brine solution. At least about 50, more preferably at least about 80, and most preferably at least about 90 weight-percent of aniline, toluene and/or methylene dianiline may be removed from the aqueous brine solution prior to providing the aqueous brine solution to the purification step in the process of the present invention. The aqueous brine solution provided to the purification step in the process of the present invention is a solution that preferably has not been subjected to a stripping unit operation to remove aniline, toluene and/or methylene dianiline prior to the first redissolution operation according to the present invention.

Amounts of aniline, methylene dianiline and other chemicals that may be present in the aqueous brine solution are specified above in the Table 1.

The present invention provides simple processes that can be utilized, such as in one step, to achieve efficient brine mineralization to provide brine having reduced organic content. Thus, the present invention provides for the treatment of brine to permit use of brine in which the organic content has been reduced to be used as process feed and/or recycle streams. For example, as discussed above, brine obtained from various processes can contain high concentrations of organic components. For example, in the recovery of brine from conversion of glycerin to epichlorohydrin process for use in chlorine/alkali processes, such as using a chlor/alkali cation exchange membrane, the brine cannot contain a high concentration of organics, such as glycerin. The hydrolyser bottoms stream from a glycerin to epichlorohydrin (GTE) process contains common salt (sodium chloride) in a concentration of over about 16% by weight. The stream is worth recycling to chlorine/alkali process, such as a chlor/alkali membrane process (Membrane C/A). The present invention provides for the efficient use of such process streams by providing a simple and efficient technique for freeing the contaminated brine from the organic contamination, essentially from glycerin which is present in a concentration of usually over about 0.10% by weight (1000 ppm) and from other organic contaminants which may be present in low to trace concentrations.

The present invention relates to purified brine, particularly brine having reduced organic content, and even more preferably reduced chlorate content. The present invention also relates to processes and apparatus for obtaining brine having reduced organic content, and even more preferably reduced chlorate content, and can relate to mineralization of brine. The present invention also relates to improvement of processes and apparatus wherein brine is used in the processes or apparatus so as to include brine therein having reduced organic content, and preferably reduced chlorate content, in brine used therein or brine obtained therefrom. The present invention is useful in various processes and technologies, such as processes involving water, waste water and brine purification, and particularly useful in chlorine/alkali processes, and processes involving conversion of glycerin to epichlorohydrin.

Electrochemical Oxidation

This invention provides a process for reduction of organic contamination in brine, usually having a sodium chloride concentration of about 5 wt % or greater by electrochemical oxidation, and preferably subsequent post-treatment. Electrochemical oxidation is performed in a vessel equipped with electrodes which are part of an electrical circuit. The electrodes can be constructed of various materials, and the process can be practiced with addition of substances to improve process efficiency. Conditions of electrical current and tension as well as retention time in the treatment vessel, and temperature and pH of the brine that is to be decontaminated can be adjusted to achieve the decontamination. Yet further, the present invention provides a procedure for optional post-treatment of the brine that has been treated in the electrochemical process so as to reduce chlorate content to an appropriately low level, if desired.

Reduction of organic contamination by electrochemical advanced oxidation where the raw (organic contaminated) brine which has been treated by electrochemical oxidation can lead to an increased concentration of chlorate and/or hypochlorite in the treated brine. If desired, the chlorate and/or hypochlorite can be removed from the treated brine, especially in instances where their presence will be constitute an interferent to process conditions and/or be deleterious to the process environment. Thus, a reducing agent such as one or more alkali metal sulfites, such as sodium sulfite, can be added to the treated brine to decrease the chlorate and hypochlorite concentration. The pH of the treated brine can be reduced to a pH of about 1 to about 3, such as about 1.5, to convert hypochlorite to chlorine, and the chlorine can be stripped, such as with steam, or air, or nitrogen. Additionally, a combination of these techniques can be used to obtain combined benefits of using a reducing agent and pH reduction. For example, chlorate removal is needed where the brine will be used in a diaphragm or membrane chlor/alkali processes; wherein the chlorate is an interferent. Moreover, acid treatment will be useful in processes wherein the brine should be acidic.

The present invention process differs from other processes in that the present invention process can reduce organic contamination in a one-step electrochemical process, optionally combined with a one-step chemical process for mitigation of chlorate and/or hypochlorite.

The present invention process differs from the other alternative processes in that the present invention process can reduce organic contamination in a one-step process to acceptably low levels such as, for example, the brine purified in this manner can be directly used in various processes, such as feed in chlor/alkali processes. The process provided by the present invention is particularly suitable where electrical energy is economically cost competitive. The present invention enables a high degree of automation and a low level of supervision. Thus, the present invention provides various advantages including simplicity, durability and potential lower cost.

The present invention permits the reduction of total organic carbon (TOC) content of a brine by-product stream to produce a brine stream, such as a recyclable brine stream, having a total organic carbon content of less than about 10 ppm. The brine recycle streams which may be treated in accordance with the present invention may have varying sodium chloride contents as discussed above, and can include sodium chloride from about 15% by weight to about 23% by weight, based upon the weight of the brine by-product stream, a high TOC content of from about 200 ppm to about 20,000 ppm, or from about 500 ppm to about 10,000 ppm, or from about 500 ppm to about 5,000 ppm, and a pH of from about 7 to about 14, or from about 8 to about 13, or from about 10 to about 12.5.

The purified or recyclable brine stream containing a TOC of less than about 10 ppm and a sodium chloride content of about 15% by weight to about 23% by weight, based upon the weight of the recyclable brine stream obtained in the present invention, may be used in a variety of on-site, local, or off-site processes. Exemplary of such processes are chlor/alkali processes, electrochemical processes, such as for the production of chlorine and caustic, production of epoxides, a chlorine alkali membrane process, and the like.

The brine by-product stream treated in accordance with the present invention may be any stream where water, sodium chloride, and TOC is present in a waste, recycle, or by-product stream. Exemplary of brine streams to which the TOC reduction process of the present invention may be applied are brine feed streams, or brine streams produced in processes, such as a recycle or by-product brine stream obtained in the production of epichlorohydrin from glycerin, a liquid epoxy resin (LER) or other epoxy resin brine/salt recycle stream, other chlorohydrin brine recycle streams, an isocyanate brine recycle stream, sea water, reject streams from water purification streams, such as reject streams from reverse osmosis units, waste brine streams from chemical processes, feed brine streams for chlor/alkali processes, and especially feed streams in chlor/alkali processes which are sensitive to organics. The low levels of TOC may be obtained even with brine recycle streams containing substantial amounts of difficult to remove organic compounds such as glycerin.

For example, the methods of the present invention are eminently applicable to the treatment of a brine by-product stream produced in the production of epichlorohydrin from glycerin. A brine by-product stream from a glycerin to epichlorohydrin (GTE) process which may be treated in accordance with the present invention may have an average TOC content of at least about 200 ppm, generally at least about 500 ppm, for example from about 1000 ppm to about 2500 ppm, and can be about 1500 ppm. The GTE brine by-product stream subjected to the TOC reduction of the present invention may have a glycerin content of at least about 50% by weight, generally at least about 70% by weight by weight, based upon the weight of the total organic carbon content, and a sodium chloride content of from about 15% by weight to about 23% by weight, based upon the weight of the brine by-product stream. The other organic compounds contributing to TOC in the GTE by-product stream include glycidol, acetol, bis-ethers, dichloro propyl glycidyl ethers, 1,3-dichloro-2-propanol, 2,3-dichloro-1-propanol, 1-chloro-2,3-propanediol, or 2-chloro-1,3-propanediol, epichlorohydrin, diglycerol, triglycerol, other oligomeric glycerols, chlorohydrins of oligomeric glycerols, acetic acid, formic acid, lactic acid, glycolic acid, and other aliphatic acids.

The electrodes utilized in the electrochemical oxidation can be constructed of various materials to permit the reduction of organic content of the brine. Preferably, titanium anode coated with boron doped diamond is used to achieve anodic oxidation. Using a Ti-Diamond-B anode, excellent results are possible with the present invention especially due to a high over-potential for generation of $O_2$ and $Cl_2$ (water and sodium chloride electrolysis). Such electrodes are commercially available from Adamant—CH, Magneto—NL, Condias—D [DIACHEM®]. In this manner, the organic carbon content of the brine can be lowered while not generating significant amounts of $O_2$ and $Cl_2$, and is selective for lowering the organic content.

Without wishing to be bound by any theory, OH radicals are generated in the electrochemical oxidation having an exceptionally high oxidation potential ~2.7 V, usable for oxidation of organic compounds.

The oxidation of organics according to the present invention is especially useful in glycerin to epichlorohydrin conversion wherein organics, such as glycerin, can be mineralized (and thereby reduced) such as to form carbon dioxide. The present invention is particularly useful in treating brine useful in chemical processes as there is a highly efficient oxidation of the organics to carbon dioxide without detrimental side-reactions. A low TOC content may be achieved while not obtaining detrimental side-reactions even when reducing difficult to remove organics, such as glycerin.

Without wishing to be bound by any theory, the chemoelectrical oxidation according to the present invention is a procedure involving oxidation by removing electrons from one substance to form another substance which has a lower free energy. The electrical oxidation is simpler than chemical oxidation which involves production and purification of a reagent and then use of the reagent. In the present invention, the reagent is generated "in situ" or the oxidation is directly on the electrode surface.

Figure 2:
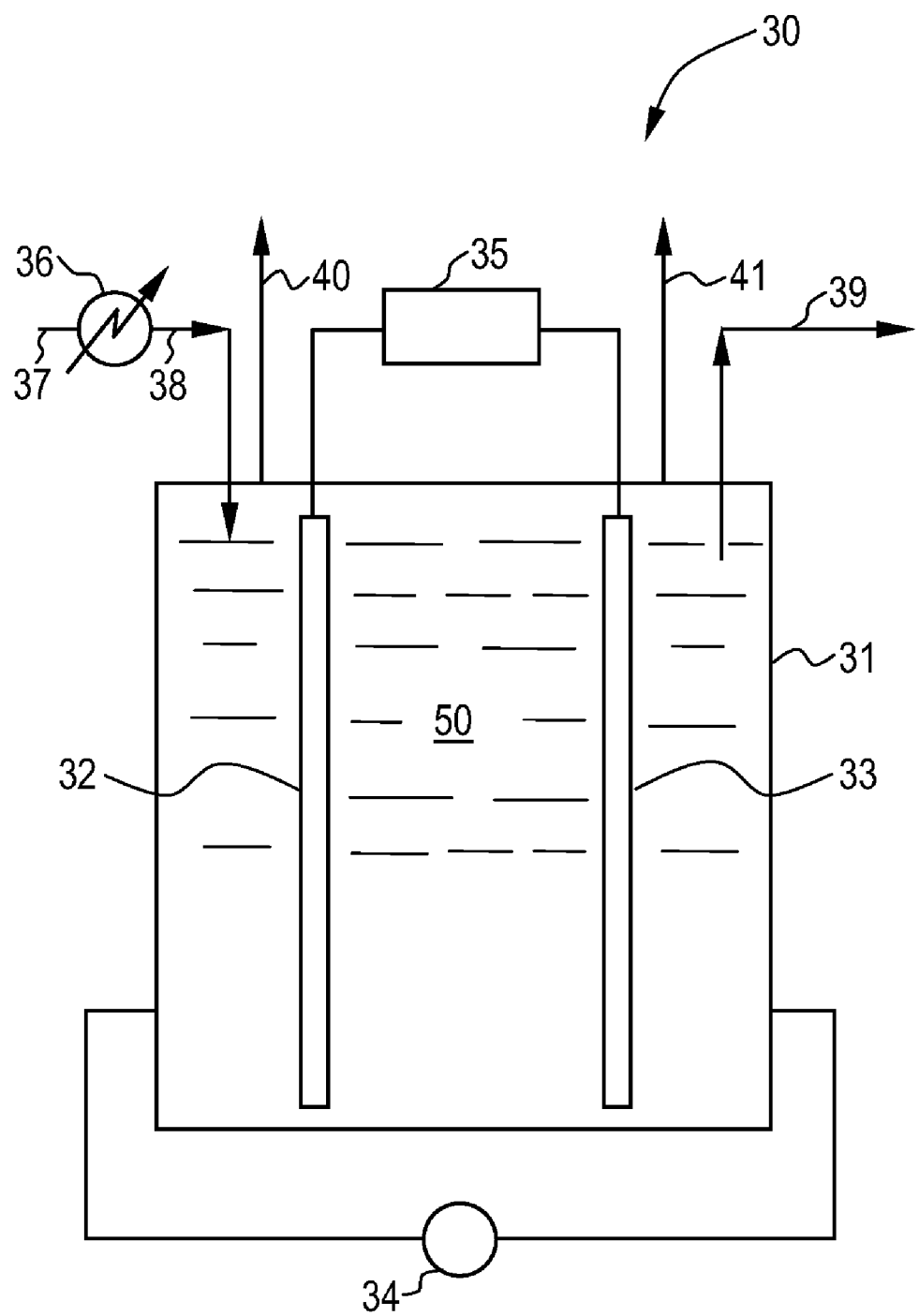
FIG. 2 illustrates an embodiment of a cell for electrochemical advanced oxidation.

As illustrated in FIG. 1, there is shown one embodiment of the process of the present invention, generally indicated by numeral 10. The process 10 is especially useful for providing process water recycle in a glycerin to epichlorohydrin (GTE) process 11. As illustrated, in FIG. 1, the contaminated process water 16 from the GTE process at 11 can be sent through an optional heat exchanger 12 to raise or lower the temperature of the contaminated process water 16. The contaminated process water 17 from the heat exchanger 12 is forwarded to an electrochemical advanced oxidation cell 13 an embodiment thereof (of which is illustrated in FIG. 2) wherein the organic content of the contaminated process water 17 is reduced. From the electrochemical advanced oxidation cell 13, the reduced organic content water 18 is forwarded to apparatus 14 for optional adjustment of pH for carbon dioxide removal and/or treatment to remove chlorate, such as by addition of sodium sulfite. The reduced organic content/reduced chlorate water 19 is then forwarded to the C/A cell 15 as recycle process water to be used in the process. A brine stream 20 from the C/A cell 15 can be used as the feed stream to the GTE process 11.

FIG. 2 illustrates an exemplary electrochemical advanced oxidation cell, generally indicated by numeral 30, according to the present invention. The electrochemical reactor 30 comprises a housing 31 containing a brine solution 50 to be treated. The electrochemical cell 30 also is equipped with an anode 32 and a cathode 33, such as but not limited to titanium coated with boron-doted diamond. A circulation pump 34 provides agitation of the brine contents 50 of the electrochemical reactor 30. Adjustment of current through the electrical circuit is achieved with the power supply 35. Adjustment of temperature in the electrochemical reactor can be obtained using a heat exchanger 36, which can be located anywhere respect to the electrochemical reactor 30. In FIG. 2, the heat exchanger 36 may be for example, in the feed stream to the electrochemical cell 30 between lines 37 and 38. The heated stream 38 may comprise for example water, NaCl and organics from a GTE process. A treated brine product stream 39 may comprise for example water and NaCl which may be sent to a C/A process. A carbon dioxide gas stream and a hydrogen gas stream may exit the electrochemical reactor via streams 40 and 41 respectively.

The temperature of the electrochemical reactor 30, may be, for example, at around room temperature or elevated temperature, such as about 20° C. or greater, about 30° C. or greater, about 40° C. or greater, and can include temperatures in the range of about 20° C. to 70° C. Adjustment of pH of the contents of the electrochemical reactor can be achieved by adjustment of the pH of the feed or of the reactor bulk contents 50. For example, the pH can be neutral to alkaline, with a non-limiting range being from about 7 to about 10. Also, the hydraulic residence time of the contents 50 of the reactor 30 can be adjusted.

Residence time, electrical potential and temperature can be adjusted to obtain desired reduction of organic content. The electrochemical oxidation can be operated in constant voltage or constant current mode.

Optionally, as discussed above, sodium sulfite can be added to the brine in sufficient quantity to reduce chlorate and/or hypochlorite to a desired level, such as at a concentration of from about 500 milligrams per liter (mg/L) to about 50,000 mg/L. The optional post-treatment of the electrochemically treated brine achieves mitigation of chlorate which is often co-produced in the electrochemical oxidation.

Also, as discussed above, there can also be an optional post-treatment of the electrochemically treated brine for mitigation of hypochlorite by acidification, and stripping, such as with steam, or air, or nitrogen.

The optional post-treatment can be is performed at various temperatures included elevated temperatures, and is preferably performed above about 40° C.

Optionally, complimentary to reduction of chlorate is removal of sulfate by addition of alkaline earth metal carbonate, such as calcium carbonate followed by removal of the precipitated alkaline earth metal sulfate.

Biological Treatment
Microbes:

The present invention comprises microbes capable of biodegradation of one or more of the above organic compounds in the presence of an aqueous brine solution having a high sodium chloride concentration and a process for isolating and adapting such microbes.

A process for obtaining salt-tolerant living microbes capable of biologically oxidizing hydrocarbon compounds in an aqueous brine composition comprising sodium chloride according to the present invention comprises:

(1) providing an aqueous composition comprising living microbes, one or more hydrocarbon compounds, oxygen, an osmotically acceptable concentration of two or more inorganic salts comprising sodium chloride and, optionally, one or more nutrients for the living microbes as required for the respiration, growth and/or propagation of the living microbes;

(2) introducing into the aqueous composition provided in step (1) one or more substances comprising hydrocarbon compounds, oxygen, two or more inorganic salts comprising sodium chloride and, optionally, water and/or one or more nutrients for the living microbes as required for the respiration, growth and/or propagation of the living microbes; and (3) increasing the sodium chloride concentration of the aqueous composition at a rate that allows at least some microbes to survive and adapt to the change in sodium chloride concentration, wherein step (3) comprises increasing the weight-percent sodium chloride relative to the total amount of inorganic salt(s) in the aqueous composition. The weight-percent sodium chloride based on the total amount of inorganic salt(s) in the aqueous composition is preferably increased by at least about 1, more preferably at least 5, even more preferably at least about 10, and yet even more preferably at least about 15, weight-percent.

The process of selecting and/or adapting the microbes is preferably conducted at a temperature of at least about 15° C., more preferably at least about 30° C., more preferably at least about 40° C., up to preferably about 60° C., more preferably up to about 50° C., and even more preferably up to about 46° C.

The aqueous brine solution contacted in step (a) is preferably adjusted to and/or maintained at a pH of at least about 6.5, more preferably at least about 7, up to preferably about 8.5, more preferably up to about 8.

The brine is preferably a brine stream have a flow rate relative to the living microbes during contacting of the brine with the microbes. The contacting is preferably conducted in a bioreactor vessel having at least one inlet and at least one outlet for the brine stream. The flow rate of the brine stream is such that the hydraulic residence time in the vessel is preferably less than about 100 hours, more preferably less than about 24 hours, even more preferably less than about 12 hours and preferably greater than about 6 hours, and more preferably greater than about 10 hours.

Oxygen may be provided to the living microbes by various means. Examples include aeration of the aqueous brine solution, such as by injection of an oxygen-containing gas, such as air, into the aqueous brine solution or exposing the microbe-containing brine solution to an oxygen-containing gas such as air, such as by spraying the brine solution through an oxygen-containing gas or contacting the brine solution with an oxygen-containing gas via a vapor-liquid contacting device; immobilization of the microbes on a solid support and repeatedly conveying the immobilized microbes from immersion in the aqueous brine solution into an oxygen-containing atmosphere such as air and re-immersing the immobilized microbes in the aqueous brine solution; and/or immobilizing the microbes on an oxygen-permeable membrane, exposing the surface of the oxygen-permeable membrane having the immobilized microbes to the aqueous brine solution to be treated and exposing the opposite surface of the oxygen-permeable membrane to an oxygen-containing gas such as air. Oxygen is provided at a rate at least sufficient to maintain aerobic microbial respiration in the living microbes.

The sodium chloride concentration is preferably increased at a rate not greater than about 10, more preferably not greater than about 6, and even more preferably not greater than about 1, percent per four hydraulic residence times. The sodium chloride concentration may preferably be increased at a rate of at least about 0.4 percent per four hydraulic residence times.

The sodium chloride concentration is preferably increased according to step (3) of the process above until the sodium chloride concentration of the aqueous composition is at least about 15, more preferably at least about 17, and yet more preferably at least about 19, and even yet more preferably at least about 20, weight-percent. The aqueous composition provided in step (1) of the process above preferably has a sodium chloride concentration less than about 10, more preferably less than about 6, and even more preferably less than about 4, weight-percent, and preferably has a sodium chloride concentration of at least about 1, preferably at least about 2, and even more preferably at least about 3, weight-percent.

The living microbes are preferably a population of diverse microbes capable of organic compound degradation. An example of such a population is microbes from activated sludge in a wastewater treatment plant, particularly microbes used to treat brackish or salty wastewater. Another example of such a population is microbes isolated from natural bodies of highly saline water, such as from the Dead Sea or from the Great Salt Lake in Utah, U.S.A.

In a preferred embodiment, the living microbes comprise bacteria. In a particularly preferred embodiment, the microbes comprise bacteria belonging to the genus *Vibrio* and/or *Halomonas*. In particular, the microbes comprise bacteria belonging to the species *Vibrio alginolyticus, Halomonas salina* and/or *Halomonas campaniensis*. Such microbes may be naturally present in the microbe population or may be obtained, or innoculated, from a culture of such microbes.

Some or all of the microbes adapted according to the above process may be cultured and/or obtained from a deposit maintained by a biological depository institution, such as the ATCC. In particular, *Vibrio alginolyticus* may be obtained under ATCC No. 17749 and *Halomonas salina* may be obtained under ATCC No. 49509. *Halomonas campaniensis* has been isolated from a mineral pool near the Campania region of Southern Italy, characterized in Romano et al., Int. J. Syst. Evol. Microbiol. 55:2236 (2005), and registered under ATCC No. BAA-966 and DSM No. 15293, which is incorporated by reference herein in its entirety.

Another aspect of the present invention is microbes adapted to grow in the presence of oxygen and a brine solution comprising one or more organic compounds, one or more nutrients other than the one or more organic compounds as required for growth of the microbes, and at least about 17, preferably at least about 18, more preferably at least about 20, and even more preferably at least about 22, weight-percent sodium chloride. The adapted microbes may comprise one or more microbes of the above microbes adapted according to the above process and/or microbes cultured and/or obtained from a biological depository institution.

Another aspect of the present invention is an aqueous composition comprising one or more organic compounds, a population of living microbes immersed in the aqueous composition in the presence of oxygen, one or more nutrients other than the one or more organic compounds as required for growth of the microbes, and at least about 17, preferably at least about 18, more preferably at least about 20, and even more preferably at least about 22, weight-percent sodium chloride. The living microbes may comprise one or more of the above microbes adapted according to the above process and/or microbes cultured and/or obtained from a biological depository institution.

Another aspect of the present invention is an aqueous composition comprising at least about 15, preferably at least 1 about 8, even more preferably at least about 20, and yet even more preferably at least about 22, weight-percent of one or more inorganic salts, one or more organic compounds, a population of living microbes immersed in the aqueous composition in the presence of oxygen, and one or more nutrients other than the one or more organic compounds as required for growth of the microbes, wherein the one or more inorganic salts comprise at least about 80 weight-percent sodium hydroxide. The living microbes may comprise one or more of the above microbes adapted according to the above process and/or microbes cultured and/or obtained from a biological depository institution.

Another aspect of the present invention is a composition comprising particles having a preferred average particle size of at least about 1, more preferably at least about 10, even more preferably at least about 60, and yet even more preferably at least about 100, up to about 300, more preferably up to about 200, μm and/or a preferred density greater than about 1.5, more preferably at least about 2, even more preferably at least about 2.4, g/cm$^3$ coated with microbes adhered to the surface of the particles. The particles are preferably substantially nonflocculated and more preferably not flocculated. The microbes are preferably adhered to the surface of the particles via biofilm comprising microbes and extracellular polymer substances. The microbes may comprise one or more of the above microbes adapted according to the above process and/or microbes cultured and/or obtained from a biological depository institution.

The present invention provides a process for purifying concentrated industrially produced aqueous brine solutions via biodegradation of organic compounds through biochemical oxidation. The process produces volatile oxidation products, such as carbon dioxide, which are released from the aqueous brine solution. The purified aqueous brine solution recovered from the process may be subjected to further unit operations and/or electrolyzed to form chlorine gas and/and sodium hydroxide or hypochlorite via the well-known chlor-alkali process.

The process for purifying brine comprises:

(1) providing an aqueous brine solution comprising one or more inorganic salts, one or more organic compounds, and optionally one or more microbial nutrients other than microbial nutrients comprised in the one or more inorganic salts and the one or more organic compounds; and (2) conducting at least one unit operation for removing organic compounds from the aqueous brine solution provided in step (1) to obtain a first purified brine solution;

wherein the aqueous brine solution contains at least about 10, more preferably at least about 15, even more preferably at least about 18, yet more preferably at least about 20, and even yet more preferably at least about 22, weight-percent up to saturation, and preferably up to about 22 weight-percent, of the one or more inorganic salts; at least about 80, more preferably at least about 90, even more preferably at least about 95, yet more preferably about 98, yet even more preferably at least about 99, weight-percent of the one or more inorganic salts is sodium chloride; the one or more organic compounds comprises organic compounds; and the at least one unit operation comprises:

(a) contacting the aqueous brine solution with living microbes capable of oxidizing the organic compounds in the presence of oxygen, (b) optionally adding biological nutrients to the aqueous brine solution proportional to microbial demand for biological nutrients not satisfied by the aqueous brine solution and (c) separating the microbes and from the aqueous brine solution to obtain the first purified brine solution.

The living microbes are preferably one or more species of microbes selected from the microbes described in the previous section above.

The contacting step (a) is preferably is preferably conducted at a temperature of at least about 15° C., more preferably at least about 30° C., more preferably at least about 40° C., up to preferably about 60° C., more preferably up to about 50° C., and even more preferably up to about 46° C.

The aqueous brine solution contacted in step (a) is preferably adjusted to and/or maintained at a pH of at least about 6.5, more preferably at least about 7, up to preferably about 8.5, and more preferably up to about 8.

The brine is preferably a brine stream have a flow rate relative to the living microbes during contacting (a). The contacting (a) is preferably conducted in a bioreactor vessel having at least one inlet and at least one outlet for the brine stream. The flow rate of the brine stream is such that the hydraulic residence time in the vessel is preferably less than about 100 hours, more preferably less than about 24 hours, even more preferably less than about 12 hours and preferably greater than about 6 hours, and more preferably greater than about 10 hours.

The vessel may actually be more than one physical vessel. It may be two or more vessels in series, or two or more vessels in parallel, or some combination of the two, in order to accommodate the required flow rate of brine to be treated.

Oxygen may be provided to the living microbes by various means. Examples include aeration of the aqueous brine solution, such as by injection of an oxygen-containing gas, such as air, into the aqueous brine solution or exposing the microbe-containing brine solution to an oxygen-containing gas such as air, such as by spraying the brine solution through an oxygen-containing gases or contacting the brine solution with an oxygen-containing gas via a vapor-liquid contacting device; immobilization of the microbes on a solid support and repeatedly conveying the immobilized microbes from immersion in the aqueous brine solution into an oxygen-containing atmosphere such as air and re-immersing the immobilized microbes in the aqueous brine solution; and/or immobilizing the microbes on an oxygen-permeable membrane, exposing the surface of the oxygen-permeable membrane having the immobilized microbes to the aqueous brine solution to be treated and exposing the opposite surface of the oxygen-permeable membrane to an oxygen-containing gas such as air. Oxygen is provided at a rate sufficient to maintain aerobic microbial respiration in the living microbes.

When the microbes are dispersed within the bioreactor, they may be separated from the aqueous brine solution by filtration, straining, centrifugal separation, hydrocyclone separation and/or gravity settling. Each of these separation processes is preferably facilitated by immobilizing the microbes on substantially solid particles having a preferred average particle size of at least about 1, more preferably at least about 20, more preferably at least about 60, and even more preferably at least about 100, μm and preferably up to about 300, more preferably up to about 180, and even more preferably up to about 150, μm and/or a particle density of at least about 1.5, more preferably at least about 2, even more preferably at least about 2.4, g/cm$^3$. The substantially solid particles preferably have a particle size distribution not greater than about 4, more preferably not greater than about 3, even more preferably not greater than about 2, and even more preferably not greater than about 1.5. The particles preferably have a rough surface to facilitate adhesion of the microbes to the surface. The particles preferably also have a substantially hydrophobic surface for the same reason.

An example of suitable particles is microsand, such as ACTISAND™, a quartz sand having a nominal average particle size of about 150 μm and a particle density (specific gravity) of about 2.65 g/cm$^3$, available from Veolia Water Solutions & Technologies of Saint Maurice-Cedex, France.

The microbes are immobilized on the surface of the particles by adhering them to their surface. Microbes capable of forming biofilms may be adhered to the particles by contacting the living microbes with the particles under gentle agitation and conditions suitable to support microbial BOD reduction/consumption while facilitating EPS production for a time period sufficient to develop biofilms on the particles and colonize the biofilms with the microbes. Microbes not capable of forming stable adherent biofilms on the particles may be immobilized on the surface of the particles by adding a natural and/or synthetic adhesive polymer to a mixture of the microbes with the particles to adhere the microbes to the particles. An example of a suitable natural polymer is albumin. An example of a suitable synthetic polymer is a polyacrylamide, such as LT22S cationic polyacrylamide available from Ciba Specialty Chemicals, Basal, Switzerland.

Immobilizing the microbes on particles having a preferred average particle size facilitates separation via filtration and/or straining, because the filter medium may have a larger average pore size than the size that would otherwise be required to filter out the microbes per se and, thereby reduces the pressure required for filtration and the rate at which the filter medium becomes clogged with fine particles.

Immobilizing the microbes on particles having a preferred density provides ballast to the particles to accelerate separation via centrifugal separation, hydrocyclone separation, and/or gravity settling.

The microbes may also be separated from the treated aqueous brine solution by contacting the aqueous brine solution with a device that permits the flow of aqueous brine solution while maintaining the microbes relatively stationary relative to the flow of aqueous brine solution. The device may, for example, be microbes immobilized on a filter medium having a pore size sufficient to allow passage of the aqueous brine solution through the filter medium, such as by forming a biofilm comprising the microbes on the filter medium. The device can also be a surface in contact with the brine solution, such as a bank of tubes or a corrugated surface, having microbes adhered to the surface, such as via a biofilm. The device may comprise a polymeric support known in the field of bioreactors having a porous surface, which may optionally contain activated carbon.

The immobililization of microbes on particles or filter media may be carried out before or after adaptation of the microbes to the salt concentration of the aqueous brine solution to be treated. If immobilization is via biofilm formation, formation of the biofilm prior to adaptation may be desired to facilitate rapid biofilm formation and to provide a protective environment for the microbes as the microbes are adapted to higher salt concentrations.

Since microbial populations tend to diminish during selection of the microbes via the survival of the fittest approach to selection of microbes capable of adapting to brine solutions containing high concentrations of sodium chloride, immobilization is preferably carried out after the microbial species diversity of the microbes contacting the brine solution remains relatively stable per 0.5 weight-percent increase in sodium chloride concentration.

The microbes may be separated from the aqueous brine solution by passing the aqueous brine solution through a membrane that is permeable to the liquid components of the aqueous brine solution and impermeable to the microbes. Suitable bioreactors are known as membrane bioreactors (MBR). Membranes suitable for this purpose, known as ultra- and nanofiltration membranes, are commercially available from various sources, such as Dow Water Solutions (The Dow Chemical Company, Midland, Mich., U.S.A.) under the trademark FILMTEC® and Berghof (Eningen, Germany) under the trademark HYPERM™ AE. The membranes preferably have a pore size in the nanofiltration range and are preferably made of polymers based on poly(vinylidene fluoride) (PVDF). The membrane preferably has an anti-fouling coating, such as the amphiphilic graft copolymer poly(vinylidene fluoride)-graft-polyoxyethylene methacrylate (PVDF-g-POEM).

The purified brine recovered from such further unit operations may be used to make chlorine gas and sodium hydroxide or hypochlorite via a conventional chlor-alkali process and/or may recycled as an aqueous brine washing solution for washing crystalline salts recovered from brine purification via crystallization.

Each process step may be carried out in a batch, semi-batch or continuous mode. Each process step is preferably carried out in a continuous mode. The total process from providing the initial source aqueous brine solution to production of the purified brine solution according to the present invention is preferably carried out in a continuous mode.

In order to achieve any desired effluent quality of the treated brine from the biological treatment process of the present invention, further purification steps may be used. These further purification steps may include filtration, adsorption and other commonly used physical-chemical unit operations.

The process and apparatus according to this invention may preferably be operated to yield at least about 90, more preferably at least about 95, and even more preferably at least about 98, weight-percent of the amount of sodium chloride per unit volume of the source aqueous brine solution provided in the process of the present invention. The aqueous brine solution is preferably treated according to the present invention to provide a sodium chloride purity of at least about 80, more preferably at least about 95, and even more preferably at least about 99, percent.

In a preferred embodiment, the weight-ratio of the amount of organic compound to the amount of sodium chloride present in the aqueous brine solution treated according to the process of the present invention is preferably less than about one-tenth, more preferably less than about one-hundredth, and even more preferably less than about one-thousandth, of the weight-ratio of the amount of organic compound to the amount of sodium chloride present in the source aqueous brine solution.

The above-described process may be conducted using an apparatus according to the present invention. The above-described process preferably includes a bioreactor for brine purification according to the present invention.

In one embodiment, the bioreactor comprises at least one bioreactor vessel containing salt-tolerant living microbes, wherein the salt-tolerant living microbes are the microbes according to the present invention described above.

In another embodiment, the bioreactor comprises a bioreactor vessel containing a composition comprising an aqueous brine solution comprising one or more inorganic salts, one or more organic compounds, optionally one or more microbial nutrients, and the substantially nonflocculated particles coated with microbes adhered to the surfaces of the particles described in the previous section.

Another aspect of the present invention is a chemical process apparatus for producing purified brine comprising a chemical reaction apparatus suitable for reacting a chlorine-atom containing compound with sodium hydroxide to make an aqueous brine solution and a brine purification apparatus according to the present invention, wherein the chemical reaction apparatus is connected to the brine purification apparatus and/or process for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus. The chemical reaction apparatus may be an apparatus suitable for making epichlorohydrin, epoxy resin(s) or methylene dianiline.

When the chemical reaction apparatus is suitable for making epichlorohydrin by reacting chlorohydrin(s) with sodium hydroxide (i.e., via dehydrochlorination), the chemical process apparatus may further comprise a hydrochlorination apparatus suitable for making chlorohydrin. The hydrochlorination apparatus is then preferably connected to the chemical reactor apparatus for conducting a stream comprising chlorohydrin(s) from the apparatus for making chlorohydrin(s) to the chemical reactor apparatus.

Crystallizing Treatment

As noted above, the present invention can provide a process for purifying brine comprising:

(1) providing an aqueous brine solution comprising one or more inorganic salts and one or more organic compounds and (2) conducting at least one unit operation for removing organic compounds from the brine solution to obtain a purified brine solution, wherein at least about 80 weight-percent of the one or more inorganic salts of the aqueous brine solution provided in step (1) is sodium chloride and the at least one unit operation comprises a first redissolution operation comprising:

(a) crystallizing sodium chloride in the aqueous brine solution to form sodium chloride crystals and a first mother liquor, (b) separating the sodium chloride crystals from the first mother liquor, and (c) redissolving the separated sodium chloride crystals in an aqueous solution having an organic compound concentration substantially less than the organic compound concentration in the aqueous brine solution provided in step (1) to obtain a first purified brine solution.

The brine purification process according to the present invention preferably comprises further brine purification steps downstream from the first redissolution operation.

In a preferred embodiment, the at least one unit operation further comprises a second redissolution operation comprises:

(a) crystallizing sodium chloride in the first purified brine solution to form sodium chloride crystals and a second mother liquor, (b) separating the sodium chloride crystals from the second mother liquor, and (c) redissolving the separated sodium chloride crystals in an aqueous solution having an organic compound concentration substantially less than the organic compound concentration in the first purified brine solution to obtain a second purified brine solution having a total organic carbon (TOC) concentration less than the TOC concentration of the first purified brine solution.

The process of the present invention preferably comprises a second dissolution operation for further treating the aqueous brine solution treated via the first dissolution operation.

In further preferred embodiment, the process comprises treating the mother liquor separated in step (b) of the first redissolution operation and/or any second redissolution operation in a concentrating operation comprising:

(a) crystallizing sodium chloride in the first mother liquor and/or the second mother liquor to form sodium chloride crystals and a third mother liquor, (b) separating the sodium chloride crystals from the third mother liquor, and (c) redissolving the separated sodium chloride crystals in an aqueous solution having an organic compound concentration substantially less than the organic compound concentration in the aqueous brine solution provided in step (1) to obtain a third purified brine solution.

The third purified brine solution is preferably recycled to the first redissolution operation by combining the third brine solution with a sourced aqueous brine solution to form the aqueous brine solution provided in step (1).

The third dissolution operation preferably treats mother liquor from the first redissolution operation and the second redissolution operation.

The amount of third mother liquor produced by the third redissolution operation is preferably not greater than about 10, more preferably not greater than about 5, weight-percent of the amount of aqueous brine solution provided in step (1).

The mother liquor purged from the process may be subjected to further unit operations. The further unit operations may comprise operations for reducing the concentration of organic compounds in the remaining mother liquor, such as operations for converting and/or removing the organic compounds present in the remaining mother liquor.

In a preferred embodiment, the remaining mother liquor may be treated via a biological oxidation process to convert the organic compounds in the mother liquor into more volatile oxidation fragments that may be separated from the mother liquor.

In another preferred embodiment, the remaining mother liquor may be subjected to chlorinolysis to oxidize the organic compounds in the mother liquor into more volatile oxidation fragments that may be separated from the mother liquor.

In yet another preferred embodiment, the remaining mother liquor may be subjected to carbon adsorption or extraction into a different solvent to remove the organic compounds from the mother liquor.

Two or more of the foregoing conversion and/or removal operations may be combined with each other or with other known unit operations in parallel or sequentially to further reduce the concentration of organic compounds in the mother liquor.

The purified brine recovered from such further unit operations may be used to make chlorine gas and/or hypochlorite and sodium hydroxide via a conventional chlor-alkali process and/or may recycled to the process according to the present invention as an aqueous brine washing solution as described above.

The sodium chloride crystals separated in step (b) of each redissolution operation are preferably washed with an aqueous brine washing solution containing at least about 15, more preferably at least about 17, even more preferably at least about 20, and even more preferably at least about 23, weight-percent sodium chloride and having a total organic carbon (TOC) concentration substantially less than the TOC concentration in the aqueous brine solution provided in step (1). In a preferred embodiment, the weight ratio of the aqueous brine washing solution TOC concentration to the TOC concentration of the aqueous brine solution provided in step (1) is preferably about 1:10, more preferably about 1:100, and even more preferably about 1:1000. The TOC concentration of the aqueous brine washing solution is preferably less than about 50, and more preferably less than about 10 ppm. The aqueous brine washing solution is preferably a portion of the purified aqueous brine solution produced by the process according to the present invention. The amount of aqueous brine washing solution used in each unit operation of the process is preferably less than about 15, more preferably less than about 10, and even more preferably less than about 5, weight-percent of the total purified aqueous brine solution produced by the process. The total amount of aqueous brine washing solution used the brine purification process is preferably less than about 50, more preferably less than about 30, even more preferably less than about 15, weight-percent of the total purified aqueous brine solution produced by the process.

Washing the sodium chloride crystals separated in step (b) with aqueous brine washing solution is preferably carried out simultaneously with the separation step (b). Washing is preferably carried out continuously during step (b).

The washed sodium chloride crystals of the present invention contains such low amounts of organic compounds that they may be further processed to make salts for other commercial or industrial uses.

In a preferred embodiment, the separation step (b) is carried out via centrifuging the slurry of sodium chloride crystals and aqueous brine solution from an upstream crystallization operation and/or treating the slurry of sodium chloride crystals and aqueous brine solution from an upstream crystallization operation in a hydrocyclone. In a preferred embodiment, the aqueous brine washing solution is introduced into the centrifuge and/or hydrocyclone device used to conduct the separation operation during the separation operation.

The crystallization operation is preferably conducted via forced circulation evaporative crystallization. Apparatus for conducting forced circulation evaporative crystallization are well-known in the industry.

In a preferred embodiment, water evaporated during forced circulation evaporative crystallization is used as at least a portion of the aqueous solution of redissolving step (c) in one or more redissolution operations. The water evaporated during forced circulation evaporative crystallization is preferably recovered via mechanical vapor recompression (MVR).

Each process step may be carried out in a batch, semi-batch or continuous mode. Each process step is preferably carried out in a continuous mode. The total process from providing the aqueous brine solution in step (1) to production of the purified brine solution according to the present invention is preferably carried out in a continuous mode.

The process and apparatus according to this invention may preferably be operated to yield at least about 90, more preferably at least about 95, and even more preferably at least about 98, weight-percent of the amount of sodium chloride per unit volume of the aqueous brine solution provided in step (1). The aqueous brine solution is preferably treated according to the present invention to provide a sodium chloride purity of at least about 80, more preferably at least about 95, and even more preferably at least about 99, percent.

In a preferred embodiment, the weight-ratio of the amount of organic compound to the amount of sodium chloride present in the first purified brine solution obtained in the first redissolution step is preferably less than about one-tenth, more preferably less than about one-hundredth, and even more preferably less than about one-thousandth, of the weight-ratio of the amount of organic compound to the amount of sodium chloride present in the aqueous brine solution provided in step (1).

Figure 3:
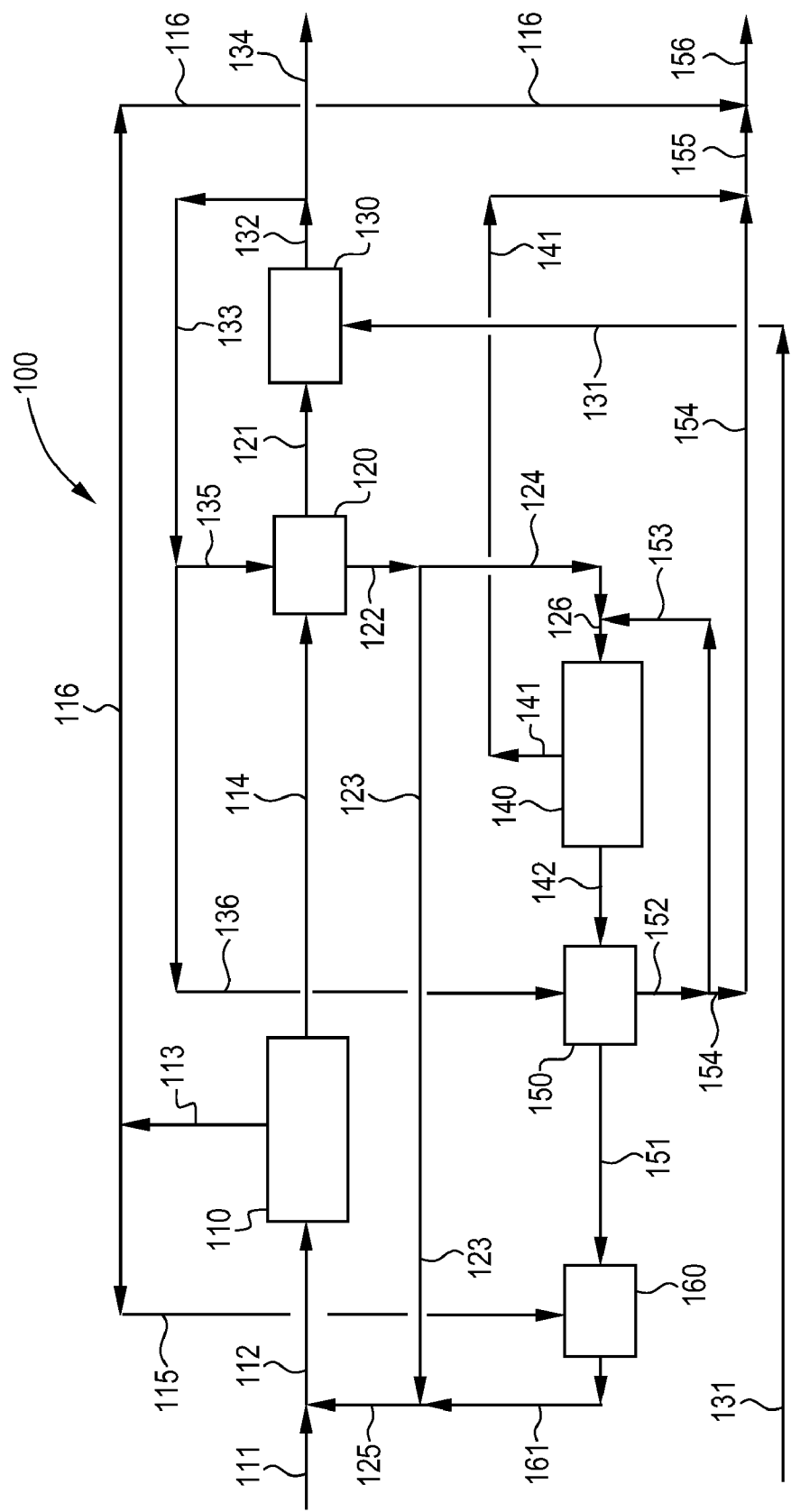
FIG. 3 is a process block flow diagram illustrating an embodiment of a one-stage evaporative crystallization process of the present invention.
Figure 4:
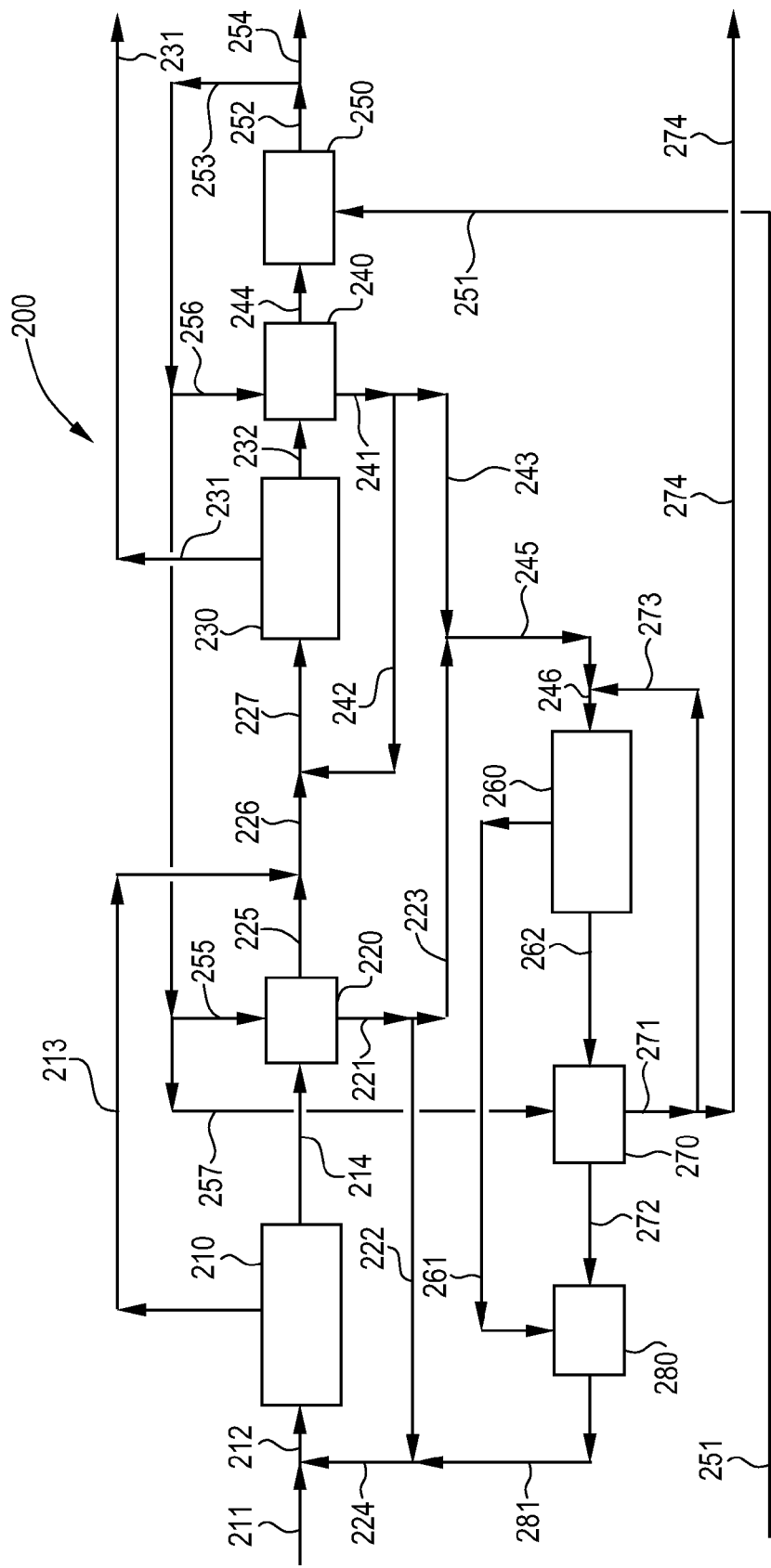
FIG. 4 is a process block flow diagram illustrating an embodiment of a two-stage evaporative crystallization process of the present invention.

The above-described process may be conducted using an apparatus according to the present invention. The apparatus is now described in more detail in reference to FIG. 3 for a one-stage evaporative crystallization process and FIG. 4 for a two-stage evaporative crystallization process. FIG. 3 and FIG. 4 are schematic diagrams showing the main features of illustrative apparatus that may be used and their respective feed streams.

As shown in FIG. 3, a one-stage evaporative crystallization process, generally indicated by numeral 100, is shown comprising a first forced circulation evaporative crystallizer 110, a first separation device 120, a first dilution vessel 130, a second forced circulation evaporative crystallizer 140, a second separation device 150, and a second dilution vessel 160. FIG. 3 shows a feed brine 111 and a recycle stream 125 forming a combined stream feed 112 is introduced into a first forced circulation evaporative crystallizer 110 where water is evaporated from the feed brine forming an overhead aqueous stream 113 while the feed brine undergoes agitation until the feed brine becomes supersaturated with inorganic salts, so that a slurry of brine and inorganic salt crystals is formed in crystallizer 110.

The slurry is conducted to a first separation device 120 via a first treated brine stream 114 for separating solids from liquids. The first separation device 120 separates the inorganic salt crystals from the aqueous liquid brine solution to form a first concentrated inorganic salt stream 121 rich in inorganic salt crystals leaving the device 120 and a first mother liquor stream 122, representing the remainder of the slurry 121, which is preferably substantially free of inorganic salt crystals leaving the device 120. The device 120 is preferably a centrifuge or hydrocyclone; or other separation device well known to those skilled in the art. The device 120 preferably performs continuous separation.

A portion of the first mother liquor stream 122 is preferably recycled to the first forced circulation evaporative crystallizer 110 as a first recycle stream 123 to provide additional water for suspending the inorganic salt crystals in the first crystallizer 110 and in the first slurry stream 114 to transport the crystals to the first separation device 120.

The inorganic salt crystals isolated by the first separation device 120 are preferably washed with a first brine wash stream 135 having an inorganic salt concentration close to, or equal to, saturation and an organic compound concentration substantially less than the organic compound concentration of the first mother liquor 122. The first brine wash 135 removes residual organic compounds on the surface of the inorganic salt crystals isolated by the first separation device 120 and conveys the residual organic compounds to the first mother liquor 122. The first brine wash 135 is preferably a portion 133 of the final treated brine 132. Another portion 124 of the first mother liquor 122 is described below.

The inorganic salt crystals of the first concentrated inorganic salt stream 121 exiting the first separation device 120 are conducted to a first dilution vessel 130 connected to a source of water 131 for dissolving the inorganic salt crystals in the first concentrated inorganic salt stream 121 to form treated brine solution 132. The source of water 131 is preferably a fresh water feed optionally purified to remove trace contaminants, or a purified process water stream.

A first aqueous stream 113 having a relatively low inorganic salt concentration and a relatively low organic compound concentration. The first dilution vessel 130 may be a stirred tank or merely a conduit; or other vessel well known to those skilled in the art. The first aqueous stream 113 is preferably water condensed from the first forced circulation evaporative crystallizer 110. The aqueous stream 113 is preferably produced by mechanical vapor recompression MVR to increase the temperature of the vapor stream and heat-exchanging the compressed vapor stream with the first crystallizer 110 to provide heat to the first crystallizer and simultaneously liquefy the vapor stream. In this way, the combination of the first crystallizer 110, MVR (not shown) and heat-exchanger (not shown) functions as a multiple-effect evaporator. Excess heat in the liquefied vapor stream provides additional evaporative heat to downstream evaporative crystallizers.

A portion 124 of the first mother liquor 122 and a recycle stream 153 forming a combined feed stream 126 is preferably fed to a second forced circulation evaporative crystallizer 140 where water is evaporated from the mother liquor forming an overhead aqueous stream 142 while the mother liquor undergoes agitation until the mother liquor becomes supersaturated with inorganic salts, so that a slurry of concentrated mother liquor and inorganic salt crystals is formed in the crystallizer 140.

The slurry from the second crystallizer 140 is conducted to a second separation device 150 via a second treated mother liquor stream 142 for separating solids from liquids. The second separation device 150 separates the inorganic salt crystals from the concentrated mother liquor to form a second concentrated inorganic salt stream 151 rich in inorganic salt crystals leaving the device 150 and a second mother liquor stream 152, representing the remainder of the slurry 142, which is preferably substantially free of inorganic salt crystals leaving the device 150. The device 150 is preferably a centrifuge or hydrocyclone; or other separation device well known to those skilled in the art. The device 150 preferably performs continuous separation.

A portion 153 of the second mother liquor stream 152 is preferably recycled to the second forced circulation evaporative crystallizer 140 as a second recycle stream 153 to provide additional water for suspending the inorganic salt crystals in the third crystallizer 140 and in the second slurry stream 143 to transport the crystals to the second separation device 150. Another portion 154 of the second mother liquor stream 152 is preferably purged out of the process.

The inorganic salt crystals isolated by the second separation device 150 and present in the device 150 are preferably washed with a second brine wash stream 136 having an inorganic salt concentration close to, or equal to, saturation and an organic compound concentration substantially less than the organic compound concentration of the second mother liquor 152. The second brine wash stream 136 removes residual organic compounds on the surface of the inorganic salt crystals isolated by the second separation device 150 and conveys the residual organic compounds to the second mother liquor 152. The second brine wash stream 136 is preferably a portion 133 of the final treated brine 132.

The inorganic salt crystals of the second concentrated inorganic salt stream 151 exiting the second separation device 150 are redissolved in water in a second dilution vessel 160 to form a second treated brine stream 161 by combining, in vessel 160, the stream 151 with a portion 115 of the first aqueous stream 113 having a relatively low inorganic salt concentration and a relatively low organic compound concentration. A second portion 116 of the first aqueous stream 113 is purged from the process. The second treated brine stream 161 is combined with recycle stream 123 to form stream 125 which is combined with stream 111 to form feed stream 112 to the first forced circulation evaporative crystallizer 110. The second dilution vessel 160 may, for example, be a stirred tank or merely a conduit; or other vessel well known to those skilled in the art.

A second aqueous stream 141 is water condensed from the second crystallizer 140. The aqueous stream 141 is preferably produced by mechanical vapor recompression MVR of the vapor stream to increase the temperature of the vapor stream and heat-exchanging the compressed vapor stream with the second crystallizer 140 to provide heat to the second crystallizer 140 and simultaneously liquefy the vapor stream. In this way, the combination of the second crystallizer 140, MVR and heat-exchanger functions as a multiple-effect evaporator. Excess heat in the liquefied vapor stream provides additional evaporative heat to downstream evaporative crystallizers. The second aqueous stream 141 is preferably purged from the process by first combining with stream 154 to form stream 155. Then stream 155 is combined with stream 116 to form the purge stream 156.

The second and first crystallizers 140, 110 preferably function as multiple effect evaporators connected in series.

In the process of the present invention, devices capable of generating flow of the respective streams, such as pumps for liquid streams and/or MVRs for vapor streams, are provided in each stream in which energy is required to obtain the desired flow direction and flow rate. Such pumps and MVRs are well known and readily available in the industry.

To reduce energy and capital investment for heating the first and second crystallizers 110 and 140, the first crystallizer 110 shown in FIG. 3 is preferably operated at a pressure which is less than the operating pressure of the second crystallizer 140. This may be accomplished by creating a pressure differential between the mother liquor stream 124 entering the second crystallizer 140 and restricting the flow of the second treated brine stream 161 into the first crystallizer 110. By operating the second and first crystallizers 140, 110 at successively lower pressures in the order second crystallizer 140 pressure>first crystallizer 110 pressure, the heat of evaporation introduced into the second crystallizer 140 may be used to evaporate water in the first crystallizer 110 due to the successively lower temperature required to evaporate water in the respective second and first crystallizers, which is due to the successively lower vapor pressure in the second and first crystallizers, respectively. Heat energy utilization is optimized and the need for expensive heating elements for the second and first crystallizers is minimized or eliminated.

The portion 133 of the treated brine 132 solution is preferably conducted to the first and second separation devices 120 and 150 for use as the first and second brine wash streams 135 and 136.

The remainder 134 of the treated brine solution 132 is recovered for further purification, if necessary, or further processing. Such further processing may involve conducting the second treated brine solution to an electrolytic cell for conversion to chlorine gas or hypochlorite and sodium hydroxide via a conventional chlor-alkali process. Sodium hydroxide and/or chlorine or hypochlorite may be used in other industrial chemical processes, including processes upstream from the brine purification process according to this invention.

Preferred stream compositions for the process illustrated in FIG. 3 are presented below in Table 3.

TABLE 3

Preferred Stream Compositions

| Stream | Component | Preferred Minimum | | Preferred Maximum | | Units |
|---|---|---|---|---|---|---|
| 111[1] | TOC | 50 | 1,000 | 5,000 | 20,000 | ppm |
| | NaCl | 10 | 17 | 23 | saturated | wt % |
| 124[1] | TOC | 160 | 1600 | 8,000 | 50,000 | ppm |
| | NaCl | 10 | 17 | 23 | saturated | wt % |
| 156[2] | TOC | 1,500 | 8,000 | 60,000 | 80,000 | ppm |
| | NaCl | 10 | 17 | 23 | saturated | wt % |
| 134[3] | TOC | 0 | 4 | 10 | 50 | ppm |
| | NaCl | 10 | 17 | 23 | saturated | wt % |

Notes for Table 3:
[1]Brine;
[2]Purge;
[3]Treated source

Preferred operating conditions for each crystallizer brine stream feed during the brine purification process according to FIG. 3 are summarized below in Table 4.

TABLE 4

Preferred Brine Stream Operating Conditions

| Stream | Parameter | Preferred Minimum | | Preferred Maximum | | Units |
|---|---|---|---|---|---|---|
| 111[1] | T[2] | 10 | 25 | 60 | 100 | ° C. |
| | P[3] | 50 | 300 | 500 | 800 | kPa |
| 124[1] | T[2] | 10 | 25 | 60 | 100 | ° C. |
| | P[3] | 50 | 300 | 500 | 800 | kPa |

Notes for Table 4:
[1]Brine;
[2]Temperature;
[3]Pressure

Preferred conditions in each of the evaporative crystallizers during the brine purification process according to FIG. 3 are summarized below in Table 5.

TABLE 5

| Preferred Crystallizer Pressure Conditions in kPa | | | | |
|---|---|---|---|---|
| Crystallizer | Preferred Minimum | | Preferred Maximum | |
| 110[1] | 40 | 50 | 100 | 200 |
| 140[2] | 80 | 90 | 100 | 200 |

Notes for Table 5:
[1]First crystallizer;
[2]Second crystallizer

The pressure in the second crystallizer 140 is preferably at least about 5, more preferably at least about 10, even more preferably at least about 20, and yet more preferably at least about 30, kPa greater than the pressure in the first crystallizer 110.

As shown in FIG. 4, a two-stage evaporative crystallization process, generally indicated by numeral 200, is shown comprising a first forced circulation evaporative crystallizer 210, a first separation device 220, a second forced circulation evaporative crystallizer 230, a second separation device 240, a first dilution vessel 250, a third forced circulation evaporative crystallizer 260, a third separation device 270, and a third dilution vessel 280. FIG. 4 shows a feed brine 211 and a recycle stream 224 forming a combined stream 212 is introduced into the first forced circulation evaporative crystallizer 210 where water is evaporated from the feed brine forming a first overhead aqueous stream 213 while the feed brine undergoes agitation until the feed brine becomes supersaturated with inorganic salts, so that a slurry of brine and inorganic salt crystals is formed in the crystallizer 210.

The slurry is conducted to a first separation device 220 via a first treated brine stream 214 for separating solids from liquids. The first separation device 220 separates the inorganic salt crystals from the aqueous liquid brine solution to form a first concentrated inorganic salt stream 225 rich in inorganic salt crystals leaving the device 220, and a first mother liquor stream 221, representing the remainder of the slurry 214, which is preferably substantially free of inorganic salt crystals leaving the device 220. The device 220 is preferably a centrifuge or hydrocyclone; or other separation device well known to those skilled in the art. The device 220 preferably performs continuous separation.

A portion 222 of the first mother liquor stream 221 is preferably recycled to the first forced circulation evaporative crystallizer 210 as a first recycle stream 222 to provide additional water for suspending the inorganic salt crystals in the first crystallizer 210 and in the first slurry stream 212 to transport the crystals to the first separation device 220. Another portion 223 of the first mother liquor stream 221 is described below.

The inorganic salt crystals isolated by the first separation device 220 and present in device 220 are preferably washed with a first brine wash stream 255 having an inorganic salt concentration close to, or equal to, saturation and an organic compound concentration substantially less than the organic compound concentration of the first mother liquor 221. The first brine wash 255 removes residual organic compounds on the surface of the inorganic salt crystals isolated by the first separation device 220 and conveys the residual organic compounds to the first mother liquor 221. The first brine wash 255 is preferably a portion 253 of the final treated brine 252 described below.

The inorganic salt crystals of the first concentrated inorganic salt stream 225 exiting the first separation device 220 are redissolved in water in a first dilution vessel not shown to form a first treated brine stream 226 by combining the stream 225 with a first aqueous stream 213 having a relatively low inorganic salt concentration and a relatively low organic compound concentration. The first dilution vessel may be a stirred tank or merely a conduit; or other vessel well known to those skilled in the art. The first aqueous stream 213 is preferably water condensed from the first forced circulation evaporative crystallizer 210. The aqueous stream 213 is preferably produced by mechanical vapor recompression (MVR) to increase the temperature of the vapor stream and heat-exchanging the compressed vapor stream with the first crystallizer 210 to provide heat to the first crystallizer and simultaneously liquefy the vapor stream. This way, the combination of the first crystallizer 210, MVR (not shown) and heat-exchanger (not shown) functions as a multiple-effect evaporator. Excess heat in the liquefied vapor stream provides additional evaporative heat to downstream evaporative crystallizers.

The first treated brine stream 226 and recycle stream 242 forming a combined stream 227 is fed to a second forced circulation evaporative crystallizer 230 where water is again evaporated from the first treated brine stream 227 forming an overhead stream 231 while the first treated brine undergoes agitation until the first treated brine becomes supersaturated with inorganic salts, so that a slurry of brine and inorganic salt crystals is formed in crystallizer 230.

The slurry is conducted to a second separation device 240 via a second treated brine stream 232 for separating solids from liquids. The second separation device 240 separates the inorganic salt crystals from the aqueous liquid brine solution to form a second concentrated inorganic salt stream 244 rich in inorganic salt crystals leaving the device 240 and a second mother liquor stream 241, representing the remainder of the slurry 232, which is preferably substantially free of inorganic salt crystals leaving the device 240. The second separation device 240 is again preferably a centrifuge or hydrocyclone; or other separation device well known to those skilled in the art. The second separation device 240 preferably performs continuous separation.

A portion 242 of the second mother liquor stream 241 is preferably recycled to the second forced circulation evaporative crystallizer 230 as a second recycle stream 242 to provide additional water for suspending the inorganic salt crystals in the second crystallizer 230 and in the second slurry stream 232 to transport the crystals to the second separation device 240. Another portion 243 of the second mother liquor stream 241 is described below.

The inorganic salt crystals isolated by the second separation device 240 and present in device 240 are preferably washed with a second brine wash stream 256 having an inorganic salt concentration close to, or equal to, saturation and an organic compound concentration substantially less than the organic compound concentration of the second mother liquor 241. The second brine wash 256 removes residual organic compounds on the surface of the inorganic salt crystals isolated by the second separation device 240 and conveys the residual organic compounds to the second mother liquor 241. The second brine wash 256 is preferably a portion 253 of the final treated brine 252 described below.

A portion 223 of the first mother liquor 221 and/or a portion 243 of the second mother liquor 241 is/are preferably fed to a third forced circulation evaporative crystallizer 260 where water is evaporated from the mother liquor forming an overhead stream 261 while the mother liquor undergoes agitation until the mother liquor becomes supersaturated with inorganic salts, so that a slurry of concentrated mother liquor and inorganic salt crystals is formed in crystallizer 260. The portion 223 and portion 243 may be combined into one mother liquor stream 245 prior to introducing them into the third crystallizer 260. Stream 245 may be combined with a recycle stream 273 to form a combined stream feed 246 as shown in FIG. 4.

The slurry from the third crystallizer 260 is conducted to a third separation device 270 via a third treated mother liquor stream 262 for separating solids from liquids. The third separation device 270 separates the inorganic salt crystals from the concentrated mother liquor to form a third concentrated inorganic salt stream 272 rich in inorganic salt crystals leaving device 270 and a third mother liquor stream 271, representing the remainder of the slurry 262, which is preferably substantially free of inorganic salt crystals leaving the device 270. The device 270 is preferably a centrifuge or hydrocyclone; or other separation device well known to those skilled in the art. The device 270 preferably performs continuous separation.

A portion 273 of the third mother liquor stream 271 is preferably recycled to the third forced circulation evaporative crystallizer 270 as a third recycle stream 273 to provide additional water for suspending the inorganic salt crystals in the third crystallizer 260 and in the third slurry stream 262 to transport the crystals to the third separation device 270. The remaining portion 274 of the third mother liquor 271 may be purged out of the process.

The inorganic salt crystals isolated by the third separation device 270 are preferably washed with a third brine wash stream 257 having an inorganic salt concentration close to, or equal to, saturation and an organic compound concentration substantially less than the organic compound concentration of the third mother liquor 271. The third brine wash stream 257 removes residual organic compounds on the surface of the inorganic salt crystals isolated by the third separation device 270 and conveys the residual organic compounds to the third mother liquor 271. The third brine wash stream 257 is preferably a portion 253 of the final treated brine 252.

The inorganic salt crystals of the third concentrated inorganic salt stream 272 exiting the third separation device 270 are redissolved in water in a third dilution vessel 280 to form a third treated brine stream 281 by combining, in vessel 280, the stream 272 with a third aqueous stream 261 having a relatively low inorganic salt concentration and a relatively low organic compound concentration. The third dilution vessel 280 may, for example, be a stirred tank or merely a conduit; or other vessel well known to those skilled in the art. The third aqueous stream 261 is preferably water condensed from the third crystallizer 260. The aqueous stream 261 is preferably produced by mechanical vapor recompression MVR of the vapor stream to increase the temperature of the vapor stream and heat-exchanging the compressed vapor stream with the third crystallizer 260 to provide heat to the third crystallizer 260 and simultaneously liquefy the vapor stream. In this way, the combination of the third crystallizer 260, MVR (not shown) and heat-exchanger (not shown) functions as a multiple-effect evaporator. Excess heat in the liquefied vapor stream provides additional evaporative heat to downstream evaporative crystallizers.

The third and first crystallizers 260, 210 respectively, preferably function as multiple effect evaporators connected in series.

In the process of the present invention, devices capable of generating flow of the respective streams, such as pumps for liquid streams and/or MVRs for vapor streams, are provided in each stream in which energy is required to obtain the desired flow direction and flow rate. Such pumps and MVRs are well known and readily available in the industry.

To reduce energy and capital investment for heating the first and second crystallizers 210, 230, respectively, the first crystallizer 210 shown in FIG. 4 is preferably operated at a pressure which is less than the operating pressure of the third crystallizer 260 and the second crystallizer 230 is preferably operated at a pressure which is less than the operating pressure of the first crystallizer 210. This may be accomplished by creating a pressure differential between the mother liquor stream 245 entering the third crystallizer 260 in stream 246 and second treated brine stream 262 greater than required to maintain minimum flow rates, restricting the flow of the third treated brine stream 281 into the first crystallizer 210 and restricting the flow of the first treated brine stream 226 into the second crystallizer 230 in stream 227. By operating the third, first and second crystallizers 260, 210, 230 respectively, at successively lower pressures in the order third crystallizer 260 pressure>first crystallizer 210 pressure>second crystallizer 230 pressure, the heat of evaporation introduced into the third crystallizer 260 may be used to evaporate water in the first crystallizer 210 and in the second crystallizer 230 due to the successively lower temperature required to evaporate water in the respective first and second crystallizers, which is due to the successively lower vapor pressure in the first and second crystallizers, respectively. Heat energy utilization is optimized and the need for expensive heating elements for the first and second crystallizers is minimized or eliminated.

The second concentrated inorganic salt stream 244 is conducted to a second dilution vessel 250 connected to a source of water 251 for dissolving the inorganic salt crystals in the second concentrated inorganic salt stream 244 to form a second treated brine solution 252. The source of water 251 is preferably a fresh water feed optionally purified to remove trace contaminants, or a purified process water stream.

A portion 253 of the second treated brine solution 252 is preferably conducted to the first, second and third separation devices 220, 240 and 270 respectively for use as the first, second and third brine wash streams 255, 256, and 257, respectively.

The remainder 254 of the second treated brine solution 252 is recovered for further purification, if necessary, or further processing. Such further processing may involve conducting the second treated brine solution 252 to an electrolytic cell for conversion to chlorine gas or hypochlorite and sodium hydroxide via a conventional chlor-alkali process. Sodium hydroxide and/or chlorine or hypochlorite may be used in other industrial chemical processes, including processes upstream from the brine purification process according to this invention.

Preferred stream compositions for the process illustrated in FIG. 4 are presented below in Table 6.

TABLE 6

Preferred Stream Compositions

| Stream | Component | Preferred Minimum | | Preferred Maximum | | Units |
|---|---|---|---|---|---|---|
| 211[1] | TOC | 50 | 1,000 | 5,000 | 20,000 | ppm |
| | NaCl | 10 | 17 | 23 | saturated | wt % |
| 226[1] | TOC | 10 | 20 | 1,000 | 2,000 | ppm |
| | NaCl | 10 | 17 | 23 | saturated | wt. % |
| 245[1] | TOC | 156 | 1,560 | 8,000 | 50,000 | ppm |
| | NaCl | 10 | 17 | 23 | saturated | wt % |
| 274[2] | TOC | 1,560 | 7,800 | 62,600 | 78,000 | ppm |
| | NaCl | 10 | 17 | 23 | saturated | wt % |
| 254[3] | TOC | 0 | 4 | 10 | 50 | ppm |
| | NaCl | 10 | 17 | 23 | saturated | wt % |

Notes for Table 6:

TABLE 6-continued

Preferred Stream Compositions

| Stream | Component | Preferred Minimum | Preferred Maximum | Units |
|---|---|---|---|---|

[1]Brine;
[2]Purge;
[3]Treated source

Preferred operating conditions for each crystallizer brine stream feed during the brine purification process according to FIG. 4 are summarized below in Table 7.

TABLE 7

Preferred Brine Stream Operating Conditions

| Stream | Parameter | Preferred Minimum | | Preferred Maximum | | Units |
|---|---|---|---|---|---|---|
| 211[1] | T[2] | 10 | 25 | 60 | 100 | ° C. |
| | P[3] | 50 | 300 | 500 | 800 | kPa |
| 226[1] | T[2] | 10 | 25 | 60 | 100 | ° C. |
| | P[3] | 50 | 300 | 500 | 800 | kPa |
| 245[1] | T[2] | 10 | 25 | 60 | 100 | ° C. |
| | P[3] | 50 | 300 | 500 | 800 | kPa |

Notes for Table 7:
[1]Brine;
[2]Temperature;
[3]Pressure

Preferred conditions in each of the evaporative crystallizers during the brine purification process according to FIG. 4 are summarized below in Table 8.

TABLE 8

Preferred Crystallizer Pressure Conditions in kPa

| Crystallizer | Preferred Minimum | | Preferred Maximum | |
|---|---|---|---|---|
| 210[1] | 40 | 50 | 100 | 200 |
| 230[2] | 10 | 20 | 100 | 200 |
| 260[3] | 80 | 90 | 100 | 200 |

Notes for Table 8:
[1]First crystallizer;
[2]Second crystallizer;
[3]Third crystallizer The pressure in the first crystallizer 210 is preferably at least about 5, more preferably at least about 10, and even more preferably at least about 20, kPa greater than the pressure in the second crystallizer 230. The pressure in the third crystallizer 260 is preferably at least about 5, more preferably at least about 10, even more preferably at least about 20, and yet more preferably at least about 30, kPa greater than the pressure in the first crystallizer 210.

Another aspect of the present invention is a chemical process apparatus for producing purified brine comprising a chemical reaction apparatus suitable for reacting a chlorine-atom containing compound with sodium hydroxide to make an aqueous brine solution and a brine purification apparatus according to the present invention, wherein the chemical reaction apparatus is connected to the brine purification apparatus for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus. The chemical reaction apparatus may be an apparatus suitable for making epichlorohydrin, epoxy resin(s) or methylene dianiline.

When the chemical reaction apparatus is suitable for making epichlorohydrin by reacting chlorohydrin(s) with sodium hydroxide (i.e., via dehydrochlorination), the chemical process apparatus may further comprise a hydrochlorination apparatus suitable for making chlorohydrin. The hydrochlorination apparatus is then preferably connected to the chemical reactor apparatus for conducting a stream comprising chlorohydrin(s) from the apparatus for making chlorohydrin(s) to the chemical reactor apparatus.

Chlorinolysis Treatment

A plurality of stages is employed in the present invention to reduce the total organic carbon (TOC) content of a brine by-product stream to produce a recyclable brine stream having a total organic carbon content of less than about 10 ppm. Employing a plurality of stages rather than a single stage permits the use of relatively mild conditions to reach a very low TOC content while avoiding any significant production of undesirable chlorinated organic compounds or chlorates, and any significant precipitation of sodium chloride. The first stage generally reduces a substantial portion, for example at least about 60% by weight, preferably at least about 75% by weight, most preferably at least about 85% by weight of the TOC content of the brine by-product stream, with the remainder of the reduction being performed in one or more additional stages. The brine recycle streams which may be treated in accordance with the present invention may have a sodium chloride content of from about 15% by weight to about 23% by weight, based upon the weight of the brine by-product stream, a high TOC content of from about 200 ppm to about 20,000 ppm, preferably from about 500 ppm to about 10,000 ppm, and most preferably from about 500 ppm to about 5,000 ppm, and a pH of from about 7 to about 14, preferably from about 8 to about 13, and most preferably from about 10 to about 12.5. In preferred embodiments of the present invention, the TOC of the brine recycle stream is reduced to less than about 100 ppm in the first stage, and then is reduced to less than about 10 ppm in the second or final stage.

The purified or recyclable brine stream containing a TOC of less than about 10 ppm and a sodium chloride content of about 15% by weight to about 23% by weight, based upon the weight of the recyclable brine stream obtained in the present invention may be used in a variety of on-site, local, or off-site processes. Exemplary of such processes are chloro-alkali processes, electrochemical processes, such as for the production of chlorine and caustic, production of epoxides, a chlorine alkali membrane process, and the like.

The brine by-product stream treated in accordance with the present invention may be any stream where water, sodium chloride, and TOC is present in a waste, recycle, or by-product stream. Exemplary of brine streams to which the TOC reduction process of the present invention may be applied are a recycle or by-product brine stream obtained in the production of epichlorohydrin from glycerin, a liquid epoxy resin (LER) or other epoxy resin brine/salt recycle stream, other chlorohydrin brine recycle streams, and an isocyanate brine recycle stream. The low levels of TOC may be obtained even with brine recycle streams containing substantial amounts of difficult to remove organic compounds such as glycerin.

For example, the methods of the present invention are eminently applicable to the treatment of a brine by-product stream produced in the production of epichlorohydrin from glycerin. A brine by-product stream from a glycerin to epichlorohydrin (GTE) process which may be treated in accordance with the present invention may have an average total organic carbon (TOC) content of at least about 200 ppm, generally at least about 500 ppm, for example from about 1000 ppm to about 2500 ppm, and preferably up to about 1500 ppm. The GTE brine by-product stream subjected to the TOC reduction of the present invention may have a glycerin content of at least about 50% by weight, generally at least about 70% by weight by weight, based upon the weight of the total organic carbon content, and a sodium chloride content of from about 15% by weight to about 23% by weight, based upon the weight of the brine by-product stream. The other organic compounds contributing to TOC in the GTE by-product stream include glycidol, acetol, bis-ethers, dichloro propyl glycidyl ethers, 1,3-dichloro-2-propanol, 2,3-dichloro-1-propanol, 1-chloro-2,3-propanediol, or 2-chloro-1,3-propanediol, epichlorohydrin, diglycerol, triglycerol, other oligomeric glycerols, chlorohydrins of oligomeric glycerols, acetic acid, formic acid, lactic acid, glycolic acid, and other aliphatic acids.

Components, their ranges, and quantification of brine bypass streams and their pH's which may be treated in accordance with the present invention are shown in Table 3.

Figure 5:
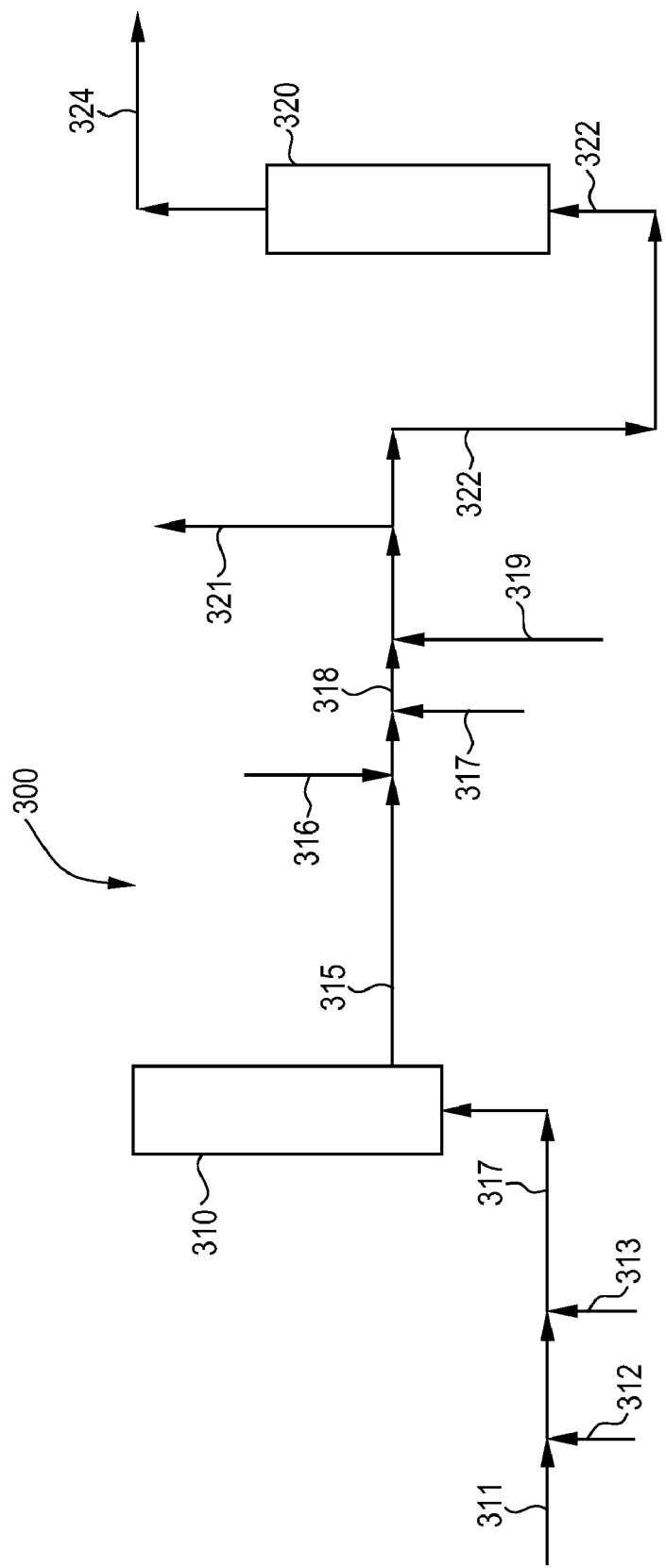
FIG. 5 schematically shows a process for reducing the total organic carbon content of a brine by-product stream according to another embodiment of the present invention.

A first stage treatment of a brine by-pass stream to reduce the TOC content in accordance with embodiments of the present invention may be chlorinolysis to obtain a chlorinolysis product stream, which in turn may be treated in a second stage treatment with activated carbon as shown in FIG. 5. The chlorinolysis may be a reaction with chlorine gas and sodium hydroxide, or a reaction with sodium hypochlorite to decompose, destroy, or remove organic carbon compounds. The reaction with chlorine gas and sodium hydroxide may produce sodium hypochlorite in situ, or sodium hypochlorite or bleach may be admixed with or added directly to the brine by-product stream for chlorinolysis. Subjecting the brine by-pass stream to chlorinolysis with chlorine gas and sodium hydroxide is preferred with sodium hypochlorite being formed in-situ in accordance with equation (I):

$$2NaOH + Cl_2 = NaOCl + NaCl + H_2O \quad (I)$$

The chlorinolysis with direct addition of sodium hypochlorite or with in situ formation of sodium hypochlorite by the addition of chlorine gas and sodium hydroxide may be conducted at a temperature of less than about 125° C., but generally higher than about 60° C., for example from about 85° C. to about 110° C., preferably from about 90° C. to about 100° C., to obtain a chlorinolysis product stream having a TOC content of less than about 100 ppm.

For the chlorinolysis, the molar ratio of the sodium hypochlorite added directly or produced in situ to the total organic carbon in the brine by-product stream may be from about 0.5 to about 5 times the stoichiometric ratio of sodium hypochlorite to total organic carbon content of the brine by-product stream. For example, for glycerin as a major component of the TOC in a GTE brine by-pass stream, the stoichiometric ratio of sodium hypochlorite to the glycerin component of the TOC is about 7:1 as shown in equation (II):

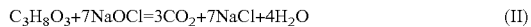

$$C_3H_8O_3 + 7NaOCl = 3CO_2 + 7NaCl + 4H_2O \quad (II)$$

In preferred embodiments, the chlorinolysis may be conducted at a molar ratio of sodium hypochlorite to the total organic carbon content in the brine by-product stream which is in excess of the stoichiometric ratio of sodium hypochlorite to total organic carbon content of the brine by-product stream. A preferred stoichiometric excess may be a molar ratio of sodium hypochlorite to the total organic carbon content in the brine by-product stream of from about 1.1 to about 2 times the stoichiometric ratio of sodium hypochlorite to total organic carbon content of the brine by-product stream.

In embodiments where the chlorinolysis is conducted by treatment of a brine by-product stream with chlorine gas and sodium hydroxide, the amount of chlorine gas and the amount of sodium hydroxide which is employed in the chlorinolysis is sufficient to produce sodium hypochlorite according to equation (I) in a sufficient quantity so that the molar ratio of sodium hypochlorite produced to the total organic carbon content in the brine by-product stream is from about 0.5 to about 5 times, preferably greater than one time, most preferably from about 1.1 to about 2 times the stoichiometric ratio of sodium hypochlorite to total organic carbon content of the brine by-product stream.

The chlorinolysis may be conducted at a pH of about 3.5 to about 11.8, with a preferred acidic pH being from about 3.5 to about 5.5, and a preferred alkaline or basic pH being from about 8.5 to about 11.8. The use of a lower acidic pH, such as a pH of less than about 3, such as about 1 or about 2 may lower the TOC to less than about 10. However, such harsh, low pH's during chlorinolysis tends to result in the deleterious production of chlorinated carbon compounds. The chlorinolysis may be conducted with or without the addition of a pH controlling or pH adjusting agent such as HCl and NaOH or other inorganic acids and bases. In embodiments where a pH adjusting agent is not added for the chlorinolysis, the reaction may begin at an alkaline pH of the brine by-product stream and may be permitted to drop as the reaction proceeds within the pH range of about 3.5 to about 11.8.

The chlorinolysis may be conducted at atmospheric pressure or slightly elevated pressure sufficient to prevent boiling and evaporation of water which may cause precipitation of the sodium chloride. As the reaction temperature is increased above the boiling point of the brine by-product stream, higher pressures are employed to prevent substantial boiling and evaporation of the water present in the stream. A residence time or reaction time for the chlorinolysis may be at least about 10 minutes, for example from about 30 minutes to about 60 minutes.

The chlorinolysis product stream from the chlorinolysis reactor may have a TOC content of less than about 100 ppm and may be treated in a second stage treatment with activated carbon to obtain a recyclable brine stream with a TOC content of less than about 10 ppm. The treatment with the activated carbon may be conducted at a temperature of less than about 100° C., preferably less than about 60° C., most preferably at about room temperature. In preferred embodiments of the invention, the pH of the chlorinolysis product stream may be adjusted using an acid and/or a base such as sodium hydroxide and/or hydrochloric acid for treatment in the second or subsequent stages. For example, it is preferred to adjust the pH of the chlorinolysis product stream to a pH of about 2 to about 3 to protonate organic acids in the chlorinolysis product stream for the treatment with the activated carbon. The activated carbon employed is preferably an acidified activated carbon obtained by washing activated carbon with hydrochloric acid.

In embodiments of the invention, the chlorinolysis product stream may be treated with hydrogen peroxide prior to treatment in the second stage with the activated carbon. The treatment with the hydrogen peroxide may be employed to eliminate or substantially eliminate any excess bleach or sodium hypochlorite present in the chlorinolysis product stream.

As schematically shown in FIG. 5, a chlorinolysis process, generally indicated by numeral 300, is shown comprising a primary chlorinolysis reactor 310 and a treatment vessel such as an activated carbon bed or column 330. As shown in FIG. 5, a brine by-product stream 311, for example from the production epichlorohydrin from glycerin ("GTE Brine" stream 311), having a TOC of about 1470 ppm and a pH of about 8 to about 9 may be admixed with a stream of chlorine gas 312 and a stream of sodium hydroxide 313 to obtain a chlorinolysis reaction mixture 314 having a pH of about 3.5 to about 9. The reaction mixture 314 is fed to the primary chlorinolysis reactor 310.

The outlet stream 315 from the chlorinolysis reactor 310, or the chlorinolysis product stream 315, may have a TOC of less than about 100 ppm. The carbon dioxide, sodium chloride and water reaction products resulting from the destruction of the TOC may be present in the chlorinolysis product stream 315, with the carbon dioxide being removable as a gas and/or being capable of forming a weak carbonic acid. The chlorinolysis product stream 315 may be admixed with a stream of sodium hydroxide 316 and/or a stream of hydrochloric acid 317 forming a pH adjusted product stream 318. The stream of sodium hydroxide 316 and/or a stream of hydrochloric acid 317 is used to adjust or maintain a pH of about 2 for the second stage treatment of the chlorinolysis product stream with acidified activated carbon.

In addition, prior to treatment in the activated carbon column 330, the chlorinolysis pH adjusted product stream 318 may alternatively be treated with a minimal amount of hydrogen peroxide via stream 319 to form stream 320. The hydrogen peroxide stream 319 may be used to remove any excess sodium hypochlorite in the chlorinolysis product stream 318. Also, any volatile compounds may be removed from stream 320 for sparging via a sparging line 321 forming stream 322. For the second stage treatment, the pH adjusted product stream 322 is preferably fed into an activated carbon bed or column 330 containing the acidified activated carbon. A purified or recyclable brine product stream 331 exits from the activated carbon column 330. The purified or recyclable brine product stream 331 from the activated carbon column 330 may have a TOC of less than about 10 ppm.

In other embodiments of the invention, where a plurality of stages are employed for reducing the TOC of a brine by-product stream, a brine recycle stream, or a chlorinolysis product stream, the stream may be subjected to an activated carbon treatment followed by a Fenton oxidation with hydrogen and iron (II) catalyst to obtain a recyclable brine stream with a TOC content of less than about 10 ppm.

For example, the hydrolyser bottoms stream from a glycerin to epichlorohydrin process (GTE) may contain common salt (sodium chloride) in a concentration of over about 16% by weight. The stream is worth recycling to a chlorine/alkali membrane process (Membrane C/A). For this purpose, it must be freed from organic contamination, essentially from glycerin which is present in a concentration of usually over about 0.10% by weight (1000 ppm) and from other organic contaminants which may be present in low to trace concentrations.

In accordance with an embodiment of the present invention, purification of the brine contaminated with organic compounds may be achieved by carbon adsorption of organic components and subsequent post-treatment (polishing) for mitigation of remaining organics by treatment with a Fenton Oxidation process to an appropriate level such that the purified brine can be fed to the Membrane C/A cells. The adsorption may be performed in several vessels equipped with fixed carbon beds to allow for adsorption and regeneration at the same time. The feed may be adjusted to a pH of from about 3 to about 7. The regeneration may be performed with hot water, and if a total regeneration is required from time to time with an organic solvent. The regenerate may be sent to a biological treatment facility or recovered by distillation. The adsorption may be followed by a Fenton Oxidation unit. The pH of the feed may be adjusted to 3 before hydrogen peroxide and iron-II catalyst are added to the feed before the mixture enters a reactor which is operated at elevated temperature and pressure to ensure the chemical oxidation of remaining traces of organic compounds from the adsorption. After leaving the reactor, the catalyst may be removed via precipitation due to change of pH. The precipitate may be removed after some conditioning in a filter unit.

In accordance with another embodiment of the present invention, purification of the brine contaminated with organic compounds may be achieved by extraction of these organic compounds into a different solvent or solvents.

The process where adsorption is combined with a one-step chemical process for mitigation of traces of organics does not require strong oxidants to remove the organics and is therefore economical. Also, both process steps are easy to control and enable a high degree of automation and low level of supervision. The adsorption may be setup as a temperature swing adsorption which allows easy regeneration of the resin. For the Fenton stage, the oxidation with peroxide does not impure the brine because it decomposes to water and oxygen and the iron catalyst can be removed via easy precipitation. The combination of a specific way of treatment (adsorption) with an unspecific (Fenton Oxidation) allows for adaptation for swings in the feed, and adjustment to a pH of about 3 for the Fenton oxidation supports the desired reactions.

In other embodiments of the invention, where a plurality of stages are employed for reducing the TOC of a brine by-product stream, a brine recycle stream, or a chlorinolysis product stream, the stream may be subjected to a Fenton oxidation with hydrogen peroxide and iron (II) catalyst in two stages.

For example, in a double or two stage Fenton oxidation, purification of the brine contaminated with organic compounds, may be achieved by using a Fenton Oxidation process to an appropriate level such that the purified brine can be fed to chlorine/alkali membrane process (Membrane C/A) cells. The hydrolyser bottoms stream from a glycerin to epichlorohydrin process (GTE) containing common salt (sodium chloride) in a concentration of over about 16% by weight and organic contamination, essentially from glycerin which may be present in a concentration of usually over about 0.10% by weight (1000 ppm) may be subjected to Fenton oxidation in two separate stages. In the double Fenton oxidation process, the pH of the brine byproduct feed is adjusted to 3 before hydrogen peroxide and iron-II catalyst are added to the feed before the mixture enters the first reactor. The first reactor performs the biggest part of destruction of the TOC content of the brine by-product feed. Before the outlet stream of the first reactor enters the second reactor additional catalyst and peroxide are added. In the second reactor the remaining TOC is destroyed down to a level of less than about 10 ppm. Both reactors may be operated at elevated temperatures and pressures to ensure the chemical oxidation of organic compounds from the GTE plant. After leaving the reactor the catalyst may be removed via precipitation due to change of pH. The precipitate may be removed after some conditioning in a filter unit.

The two stage Fenton oxidation process of the present invention does not impure the brine by using strong oxidants because the iron from the catalyst may be easily removed in a filter unit and the peroxide decomposes to water and oxygen. Adjustment to a pH of about 3 for the Fenton oxidation supports the desired reactions, the Fenton oxidation process steps are easy to control, enable a high degree of automation and low level of supervision. It employs low cost reactants and can be applied to a wide range of operating parameters.

All references cited herein are specifically incorporated by reference herein.

The following examples are for illustrative purposes only and are not intended to limit the scope of the present invention.

EXAMPLE 1

The equipment used in this Example 1 consisted of a jacketed glass reactor of 0.32 liter effective volume, equipped with a holder to which an anode and cathode were attached; a magnetic agitator; a short pipe inlet piece connected to a peristaltic pump for feed supply from a storage vessel; a short pipe outlet piece for overflow of the reactor effluent into a collecting vessel; and a thermostat connected to the inlet and outlet pipe pieces of the reactor jacket. The electrodes were connected to the appropriate poles of a rectifier operated with 220 V power supply. The reactor jacket was further connected to a cryostat which was adjusted to maintain the temperature of the reactor contents at constant 40° C.

The reactor was filled with raw brine with a sodium chloride content of 18% and an organic content corresponding to 1700 mg/l dissolved organic carbon (DOC), adjusted to a pH of 10. The feed storage vessel contained the same material. After starting the agitator and the cryostat, the feed pump was started at a rate of 1.8 ml/min corresponding to a hydraulic mean residence time of approximately 180 minutes in the reactor. The rectifier was then adjusted to deliver a DC current of 20 A. Current and tension were monitored at regular intervals, the latter on a voltmeter connected directly to the electrode clamps. Temperature of the reactor contents was also monitored; the pH of the effluent was measured at regular intervals using pH color stripes Merck(™). The energy uptake was 0.238 kWh on an average during the 10 hour duration of the experiment. The organic contamination of the effluent as DOC was found to be 6.3 mg/l+/−1 mg/l. The concentration of sodium hypochlorite, which was below detection limits in the untreated brine, had increased to 6005 mg/l, and the chlorate concentration, which was negligible in the raw brine, was found to have increased to 34 g/l on an average. 100 ml of the collected effluent were acidified to pH 1.5 by addition of 32% aqueous hydrochloric acid and then placed in a round-bottom glass flask equipped with an electrical heating jacket, a magnetic agitator, a reflux condenser connected to cold water supply, and a dropping funnel. A solution of 15.4 g sodium sulfite in 30 ml distilled water was placed in the dropping funnel. The contents of the round-bottom flask were heated to 100° C. and thereafter the contents of the dropping funnel were added to the flask all at once. The reaction mixture was agitated for 30 minutes at the same temperature, the heating stopped and the flask contents allowed to cool to ambient temperature and analyzed for chlorate by ionic chromatography with electrochemical detection. The chlorate concentration had decreased to 100 mg/l.

EXAMPLE 2

0.32 l of brine containing 19.8% sodium chloride and 1900 mg/l DOC content was placed in the reactor and about 1000 ml of the same material in the feed storage vessel. The reaction was carried out under otherwise same conditions as described in Example 1 above but at a current adjusted to constant 10 A. The energy uptake was 0.145 kWh, the feed rate was 1.3 ml/min corresponding to a mean hydraulic residence time of 4 hours in the reactor. The effluent was collected as before and analyzed. The DOC content was 35 mg/l, the chlorate content was 5850 mg/l and the sodium hypochlorite content was 7550 mg/l. 100 ml of this material were placed in a round-bottom flask as in the previous experiment and acidified to pH 1.5 by addition of 32% hydrochloric acid. The contents were heated to 100° C. and agitated at this temperature for 60 minutes. A sample was then withdrawn and analyzed for sodium hypochlorite by iodine titration with potentiometric endpoint recognition. The sodium hypochlorite content had decreased to a level below the detection limit of the method, which is 5 mg/l. Thereafter the pH was readjusted to 1.0 by addition of 32% aqueous hydrochloric acid, transferred to the round-bottom flask, heated under agitation to 100° C. and a solution of 2.65 g sodium sulfite dissolved in 5 ml distilled water added all at once. The flask contents were agitated at this temperature for 30 minutes, thereafter allowed to cool to ambient temperature and finally analyzed for chlorate by ionic chromatography. The chlorate content had decreased to 100 mg/l.

EXAMPLE 3

In this Example 3, microbes are selected and adapted according to the present invention.

3.5 g/liter of a diverse microbial population comprising the species *Vibrio alginolyticus, Halomonas salina*, and/or *Halomonas campaniensis* is introduced into a bioreactor vessel containing an aqueous brine solution containing 3.5 wt % sodium chloride and 500 mg/liter glycerol. The aqueous brine solution is fed at a rate in the range from 0.1 to 1.5 kg glycerol per kg microbes per day so as to maintain a 50 mg/liter glycerol concentration at the bioreactor outlet. A comparable outflow of the mixture in the bioreactor is provided to maintain a constant unit volume within the bioreactor. Sufficient nutrients are added to the aqueous brine stream to maintain the $NH_4$—N concentration at the bioreactor outlet at 10 mg/liter and the orthophosphate concentration at the bioreactor outlet at 5 mg/liter. The sodium chloride concentration is raised at a rate of about 0.5 wt % per 4 hydraulic residence times while monitoring microbial health and adjusting the nutrient concentration to maintain the $NH_4$—N concentration at the bioreactor outlet at 10 mg/liter and the orthophosphate concentration at the bioreactor outlet at 5 mg/liter until a microbe population adapted to a brine solution containing 18.5 wt % sodium chloride is obtained. The adapted microbe population comprises the species *Vibrio alginolyticus, Halomonas salina*, and/or *Halomonas campaniensis*.

EXAMPLE 4

This Example 4 illustrates the brine purification process according to the present invention.

A culture of 17.5 wt % brine and 3 g/liter of suspended microbes adapted according to Example 1 is introduced into a laboratory aerobic bioreactor having a liquid holdup volume of ~1.7 liter and maintained at a temperature of 44° C. The culture is fed with a brine stream containing 18 wt % sodium chloride, and a concentration of 413 ppm TOC, and sufficient water to keep the bioreactor at 17.5% brine. The flow rate of the incoming brine is maintained at ~170 ml/hr. A comparable outflow of the mixture in the bioreactor is provided to maintain a constant unit volume within the bioreactor. Sufficient nutrients are added to the aqueous brine stream to maintain the $NH_4$—N concentration at the bioreactor outlet at 10 mg/liter and the orthophosphate concentration at the bioreactor outlet at 5 mg/liter.

The composition of the clarified outflow, after gravity separation of the microbes from the brine, is 17.5 wt % NaCl and a concentration of 80 ppm TOC. A further physical-chemical treatment may be utilized to further reduce the TOC concentration of the outflow to below 10 ppm.

As can be seen from the foregoing, the present invention is capable of obtaining a recovery of aqueous brine having very low TOC concentrations while minimizing the amount of brine requiring further treatment. The process according to the present invention also minimizes consumption and contamination of fresh water and does not introduce chemicals requiring further treatment or resulting in a net reduction of chlorine gas or hypochlorite production.

EXAMPLE 5

In this Example 5, brine purification is carried out according to the present invention via a semi-batch crystallization process.

Laboratory scale evaporative crystallizer equipment is configured using a 9 liter jacketed round-bottom glass kettle, equipped with a stirrer, a glass draft-tube, heating-mantle controlled by a thermocouple. Hot oil is circulated in the jacketed vessel to help maintain process temperature at approximately 95° C. The heating mantle contributes the additional heat required to boil off the water and concentrate the brine solution to saturation point.

An initial charge of 2.98 kg of a synthetic brine solution containing of 29.98 weight-percent NaCl, 3.11 weight-percent glycerol, and 66.91 weight-percent water is introduced into the glass kettle of the evaporative crystallizer. The brine solution is heated in the evaporative crystallizer to 110° C. to evaporate the water from the solution. The water vapor is vented, cooled to 15° C. with a chilled-water atmospheric condenser, condensed and collected in a separated vessel.

A synthetic brine feed solution containing 18.77 weight-percent NaCl, 0.51 weight-percent glycerol, and 80.72 weight-percent water, is continuously added to the brine solution in the glass kettle of the evaporative crystallizer to maintain liquid level in the evaporative crystallizer as the water is evaporated. The brine feed rate is based on measurement of the water removed by evaporation, condensed and collected in a graduated vessel. The process is closely watched to maintain a constant level of one to two inches above the draft tube.

During this process, the brine solution becomes supersaturated with NaCl and NaCl crystals begin forming in the solution. The process is continued to allow the crystals to grow to an observable size in the brine solution so that a slurry of crystals in brine is formed. Approximately 265 minutes run time after the onset of water condensation is required to form the slurry.

At the end of the run time, the brine feed is stopped, all heating is removed, and the vessel is allowed to cool to ambient temperature. The agitator remains running to keep the salt slurry in suspension. The contents of the kettle were emptied and vacuum filtered to separate the crystallized salt from the mother liquor. The weight of each separated component is recorded for mass balance calculation and all components are analyzed.

The mass balance calculations show that the above process evaporates 3.98 kg condensate containing 0.0077 weight-percent glycerol, is fed 5.07 kg brine, and produces 4.07 kg slurry, which consists of 0.89 kg NaCl crystals and 3.18 kg of mother liquor. The crystals, separated from the mother liquor using slight-vacuum filtration, contain 95.78 weight-percent NaCl and 0.30 weight-percent glycerol. The mother liquor contains 31.17 weight-percent NaCl and 3.61 weight-percent glycerol. The crystals are further washed with equal weight purified brine containing no glycerol. This salt wash process reduces the glycerol in the washed NaCl crystals to 0.041 weight-percent. In terms of 20 weight-percent NaCl treated brine solution, the glycerol concentration is 0.0082 weight-percent or 32 ppm of total organic carbon (TOC).

EXAMPLE 6

In this Example 6 according to the present invention, a semi-batch crystallization process is conducted according to Example 5 with the following exceptions:

Instead of washing the salt crystals with purified brine containing no glycerol to remove remaining impurities from the crystals, the unwashed salt crystals collected in Example 5 are re-diluted with purified water and re-used as a second start-up brine solution in a second semi-batch crystallization process using the same lab evaporative crystallizer equipment as that used in Example 5. The second start-up brine solution weighs 4.81 kg and contains of 14.80 weight-percent NaCl, 0.038 weight-percent glycerol, and 85.33 weight-percent water.

The start-up brine solution is heated in the evaporative crystallizer to 110° C. to evaporate the water from the solution. The water vapor is vented, cooled to 15° C. with a chilled-water atmospheric condenser, condensed and collected in a separate vessel. In contrast to Example 5, no brine feed is added during this re-crystallization process.

During this process, the brine solution becomes supersaturated with NaCl and NaCl crystals begin forming in the solution. The process is continued to allow the crystals to grow to an observable size in the brine solution so that a slurry of crystals in brine is formed. Approximately 200 minutes run time after the onset of water condensation is required to form the slurry.

At the end of the run time, heating is removed and the vessel is allowed to cool to ambient temperature. The agitator remained running to keep the salt slurry in suspension. The contents of the kettle are emptied and vacuum filtered to separate the crystallized salt from the mother liquor. The weight of each separated component is recorded for mass balance calculation and all components are analyzed.

The mass balance calculations show that the above process evaporates 3.49 kg condensate containing of 0.002 weight-percent glycerol and produces 1.32 kg slurry, which consists of 0.53 kg NaCl crystals and 0.79 kg mother liquor. The NaCl crystals, separated from the mother liquor using slight-vacuum filtration, contain 92.36 weight-percent NaCl and 0.031 weight-percent glycerol. The mother liquor contains 27.16 weight-percent NaCl and 0.21 weight-percent glycerol.

The crystals filtered from the mother liquor are washed with an equal weight of purified brine containing no glycerol. This salt wash process reduces the glycerol in the washed crystals to 0.0056 weight-percent. In terms of 20 weight-percent NaCl treated brine solution, the glycerol concentration is 0.0011 weight-percent or 4 ppm TOC.

EXAMPLE 7

In this Example 7 according to the present invention, a continuous brine purification process is simulated via computer modeling software based on data obtained in Examples 5 and 6 and data generated by the computer model for simulation of continuous processing equipment. The process simulation is based on the process flow diagram shown in FIG. 4 described above. The computer-generated data for each stream identified in FIG. 4 is presented below in Table 9.

TABLE 9

Computer-Generated Data Based on Example 7

| Stream | Rate (kg/hour) | TOC (ppm) | Glycerol (wt %) | NaCl (wt %) | Water (wt %) |
|---|---|---|---|---|---|
| 211[1] | 1.00 | 1450 | 0.37 | 17.70 | 81.93 |
| 214[2] | 0.96 | 20440 | 5.22 | 42.37 | 52.41 |
| 221[3] | 0.79 | 24722 | 6.32 | 26.70 | 66.98 |
| 222[4] | 0.74 | 24722 | 6.32 | 26.70 | 66.98 |
| 223[5] | 0.06 | 22150 | 5.66 | 26.89 | 67.45 |
| 225[6] | 0.21 | 200 | 0.05 | 97.00 | 2.95 |
| 213[7] | 0.90 | 50 | 0.01 | 0.00 | 99.99 |
| 226[1] | 0.99 | 79 | 0.02 | 19.03 | 80.95 |
| 232[2] | 0.93 | 1165 | 0.30 | 44.31 | 55.40 |
| 241[3] | 0.76 | 1417 | 0.36 | 28.40 | 71.24 |
| 242[4] | 0.71 | 1417 | 0.36 | 28.40 | 71.24 |
| 243[5] | 0.05 | 1417 | 0.36 | 28.40 | 71.24 |
| 244[6] | 0.21 | 22 | 0.01 | 97.00 | 2.99 |
| 231[7] | 0.89 | 8 | 0.00 | 0.00 | 100.00 |
| 251[8] | 0.84 | 0 | 0.00 | 0.00 | 100.00 |
| 255[9] | 0.04 |  | 3.26 | 20.00 | 80.00 |
| 256[9] | 0.04 |  | 3.25 | 20.00 | 80.00 |
| 253[10] | 0.96 | 4 | 0.00 | 20.00 | 80.00 |
| 245[1] | 0.11 | 11686 | 2.99 | 27.65 | 69.40 |
| 262[2] | 0.14 |  | 32.83 | 34.42 | 32.70 |
| 271[3] | 0.12 |  | 39.74 | 17.18 | 43.09 |
| 273[4] | 0.11 |  | 39.74 | 17.18 | 43.09 |
| 272[6] | 0.03 | 178 | 0.05 | 97.00 | 2.95 |
| 261[7] | 0.08 | 50 | 0.01 | 0.00 | 99.99 |
| 281[11] | 0.11 | 87 | 0.01 | 28.00 | 71.97 |
| 274[5] | 0.01 |  | 39.74 | 17.18 | 43.09 |

Notes for Table 9:
[1]Brine;
[2]Crystallizer Bottoms;
[3]Mother liquor;
[4]Recycle;
[5]Purge;
[6]Solids;
[7]Overheads;
[8]Water;
[9]Wash brine;
[10]Treated source;
[11]Brine recycle The crystallization conditions in each of the evaporative crystallizers is provided in Table 10.

TABLE 10

Crystallization Conditions in Each Crystallizer According to Example 7

| Crystallizer | 210 (First) | 230 (Second) | 260 (Third) |
|---|---|---|---|
| Wt % Solids | 21.0 | 21.7 | 20.9 |
| Wt % Liquids | 79.0 | 78.3 | 79.1 |
| Recycling Ratio | 0.93 | 0.93 | 0.92 |

Mother liquor purge streams from the first and second crystallizer are combined and fed to the third crystallizer. The third crystallizer serves as a mother liquor concentrator to reduce the overall brine purge stream and minimize NaCl yield loss. The final brine purge stream is concentrated to 39.37% glycerol so that the overall purged rate can be reduced to 1 weight-percent of the brine feed rate as shown in stream 274.

The salt crystals and condensate produced in this third crystallizer are combined and clean enough to be recycled back to the first crystallizer as shown by stream 281. Recycling the NaCl crystals and condensate increases the NaCl recovery to 94% as shown in stream 254.

The data for the overall brine purification process according to this Example 7 is summarized below in Table 11

TABLE 11

Net Process Stream Data for Purification According to Example 7

| Stream | Rate (kg/hour) | TOC (ppm) | Glycerol (wt %) | NaCl (wt %) |
|---|---|---|---|---|
| Fresh water feed | 0.82 | 0 | 0.00 | 0.00 |
| Process water reuse | 0.87 | 8 | <0.01 | 0.00 |
| Brine feed | 1.00 | 1450 | 0.37 | 17.70 |
| Treated Brine | 0.94 | 4 | <0.01 | 17.28 |
| Purged brine | 0.01 | 154,161 | 39.37 | 17.28 |

Although this process requires freshwater intake for diluting the crystal produced by the second crystallizer by as much as 82% of the brine feed as shown in stream 251, a similar quantity of condensate is also produced by the second crystallizer (re-crystallization step). This condensate contains low enough TOC (8 ppm), as shown by stream 231, and can be re-used as process water. The overall process water demand is therefore minimized.

EXAMPLE 8

In this Example 8 according to the present invention, a semi-batch crystallization process is conducted according to Example 5 with the following exceptions:

1. Instead of a synthetic brine solution as described in Example 5, an actual brine solution, generated from epichlorohydrin process, is used as an initial charge and feed solution to the laboratory scale evaporative crystallizer equipment; and 2. The crystallization process is stopped when the total organic carbon (TOC) concentration in the mother liquor reaches about 5000 ppm.

An initial charge of 2.25 kg of the actual containing 20.86 weight-percent NaCl, 1220 ppm (0.312 weight-percent glycerol equivalent) TOC concentration and 78.83 weight-percent water. The brine solution is heated in the evaporative crystallizer to 110° C. to evaporate the water from the solution. The water vapor is vented, cooled to 15° C. with a chilled-water atmospheric condenser, condensed and collected in a separated vessel.

The same actual brine solution is also used as feed solution and is continuously added to the brine solution in the glass kettle of the evaporative crystallizer to maintain liquid level in the evaporative crystallizer as the water is evaporated. The brine feed rate is based on measurement of the water removed by evaporation, condensed and collected in a graduated vessel. The process is closely watched to maintain a constant level of one to two inches above the draft tube.

During this process, the brine solution becomes supersaturated with NaCl and NaCl crystals begin forming in the solution. The process is continued to allow the crystals to grow to an observable size in the brine solution so that a slurry of crystals in brine is formed. Approximately 245 minutes run time after the onset of water condensation is required to form the slurry.

At the end of the run time, the brine feed is stopped, all heating is removed, and the vessel is allowed to cool to ambient temperature. The agitator remains running to keep the salt slurry in suspension. The contents of the kettle were emptied and vacuum filtered to separate the crystallized salt from the mother liquor. The weight of each separated component is recorded for mass balance calculation and all components are analyzed.

The mass balance calculations show that the above process evaporates 3.09 kg condensate containing 21 ppm TOC concentration, is fed 2.56 kg brine, and produces 1.72 kg slurry, which consists of 0.74 kg NaCl crystals and 0.988 kg of mother liquor. The crystals, separated from the mother liquor using slight-vacuum filtration, contain 93.89 weight-percent NaCl and 626 ppm TOC concentration. The mother liquor contains 31.57 weight-percent NaCl and 5400 ppm TOC concentration. The crystals are further washed with equal weight purified brine containing no glycerol. This salt wash process reduces the glycerol in the washed NaCl crystals to 35 ppm TOC concentration. In terms of 20 weight-percent NaCl treated brine solution, the TOC concentration is 7 ppm.

This example shows that treated brine with TOC concentration below 10 ppm is obtainable from a one-step evaporative-crystallization process of the actual brine solution from epichlorohydrin process when the TOC concentration in the NaCl crystallization process mother liquor is kept low in this care about 5400 ppm.

EXAMPLE 9

Example 8 above shows that treated brine with TOC concentration below 10 ppm is obtainable from a one-step evaporative-crystallization process of the actual brine solution from epichlorohydrin process when the TOC concentration in the NaCl crystallization process mother liquor is kept low in this care about 5400 ppm.

In this Example 9 according to the present invention, a continuous brine purification process simulation via computer modeling software based on data obtained in Examples 8 and data generated by the computer model for simulation of continuous processing equipment. The process simulation is based on the process flow diagram shown in FIG. 3 described above. The computer-generated data for each stream identified in FIG. 3 is presented below in Table 12.

TABLE 12

Computer-Generated Data Based on Example 8

| Stream | Rate (kg/hour) | TOC (ppm) | Glycerol equivalent (wt %) | NaCl (wt %) | Water (wt %) |
|---|---|---|---|---|---|
| 111[1] | 1.00 | 1000 | 0.26 | 20.00 | 79.74 |
| 114[2] | 1.01 | 3109 | 0.79 | 42.63 | 56.57 |
| 122[3] | 0.84 | 3708 | 0.95 | 28.23 | 70.82 |
| 123[4] | 0.57 | 3708 | 0.95 | 28.23 | 70.82 |
| 124[1] | 0.27 | 3708 | 0.95 | 28.23 | 70.82 |
| 121[6] | 0.21 | 40 | 0.01 | 97.00 | 2.99 |
| 113[7] | 0.81 | 8 | 0.00 | 0.00 | 100.00 |
| 131[8] | 0.83 | 0 | 0.00 | 0.00 | 100.00 |
| 135[19] | 0.04 | 8 | 0.00 | 20.00 | 80.00 |
| 136[9] | 0.02 | 8 | 0.00 | 20.00 | 80.00 |
| 134[10] | 0.98 | 8 | 0.00 | 20.00 | 80.00 |
| 115[7] | 0.19 | 8 | 0.00 | 0 | 100.00 |
| 142[2] | 0.36 | 40547 | 10.36 | 40.35 | 49.28 |
| 152[3] | 0.30 | 48730 | 12.45 | 24.95 | 62.60 |
| 153[4] | 0.28 | 48730 | 12.45 | 24.95 | 62.60 |
| 151[6] | 0.08 | 178 | 0.05 | 97.00 | 2.95 |
| 141[7] | 0.19 | 150 | 0.04 | 0.00 | 99.96 |
| 116[7] | 0.62 | 8 | 0.00 | 0.00 | 100.00 |
| 161[11] | 0.24 | 57 | 0.02 | 28.03 | 72.05 |
| 156[5] | 0.83 | 1197 | 0.31 | 0.59 | 99.10 |
| 154[5] | 0.02 | 48730 | 12.45 | 24.95 | 62.60 |

Notes for Table 12:
[1]Brine;
[2]Crystallizer Bottoms;
[3]Mother liquor;
[4]Recycle;
[5]Purge;
[6]Solids;
[7]Overheads;

TABLE 12-continued

Computer-Generated Data Based on Example 8

| Stream | Rate (kg/hour) | TOC (ppm) | Glycerol equivalent (wt %) | NaCl (wt %) | Water (wt %) |
|---|---|---|---|---|---|

[8]Water;
[9]Wash brine;
[10]Treated source;
[11]Brine recycle

The crystallization conditions in each of the evaporative crystallizers is provided in Table 13.

TABLE 13

Crystallization Conditions in Each Crystallizer According to Example 8

| Crystallizer | 110 (First) | 140 (Second) |
|---|---|---|
| Wt % Solids | 19.9 | 20.2 |
| Wt % Liquids | 80.1 | 79.8 |
| Recycling Ratio | 0.68 | 0.94 |

Mother liquor purge streams from the first separator 120 is fed to the second crystallizer 140. The second crystallizer serves as a mother liquor concentrator to reduce the overall brine purge stream and minimize NaCl yield loss. The final brine purge stream is concentrated to 12.5% glycerol so that the overall purged rate can be reduced to 2.5 weight-percent of the brine feed rate as shown in stream 154.

Final purged brine stream 154 can be diluted to meet wastewater discharge specification by mixing the access condensate from the first crystallizer 116 and the condensate from the second crystallizer The salt crystals and condensate produced in this second crystallizer are clean enough to be recycled back to the first crystallizer as shown by stream 161. Recycling the NaCl crystals and condensate increases the NaCl recovery to 97.5% as shown in stream 134.

The data for the overall brine purification process according to this Example 9 is summarized below in Table 14.

TABLE 14

Net Process Stream Data for Purification According to Example 9

| Stream | Rate (kg/hour) | TOC (ppm) | Glycerol (wt %) | NaCl (wt %) |
|---|---|---|---|---|
| Fresh water feed | 0.83 | 0 | 0.00 | 0.00 |
| Process water reuse 1 | 0.62 | 8 | <0.01 | 0.00 |
| Process water reuse 2 | 0.19 | 150 | 0.04 | 0.00 |
| Brine feed | 1.00 | 1000 | 0.26 | 20.00 |
| Treated Brine | 0.98 | 8 | <0.01 | 17.28 |
| Purged brine | 0.01 | 154,161 | 39.37 | 17.28 |

Although this process requires freshwater intake for diluting the crystal produced by the second crystallizer by as much as 83% of the brine feed as shown in stream 131, a similar quantity of condensate is also produced by the second crystallizer (re-crystallization step). Most of this condensate contain low enough TOC (8 ppm), as shown by stream 116, and can be re-used as process water. The overall process water demand is therefore minimized.

As can be seen from the foregoing Examples 5-9, the present invention is capable of obtaining a recovery of aqueous brine having very low TOC concentrations while minimizing the amount of brine requiring further treatment. The process according to the present invention also minimizes consumption and contamination of fresh water and does not introduce chemicals requiring further treatment or resulting in a net reduction of chlorine gas or hypochlorite production.

The advantages of the present invention using the above processes of Examples 5-9 include 1. High NaCl recovery, where more than 90 weight-percent of the brine feed may be recovered as treated brine with TOC below 10 ppm;

2. Process water re-use, where most of the freshwater used in the process can be replaced by the condensate produced in the second crystallizer; and 3. Low brine purge, with the purge as low as 1 weight-percent of the brine feed.

EXAMPLE 10

Small scale proof of concept laboratory experiments for the destruction of organic compounds in a brine by-product stream from the production of epichlorohydrin from glycerin (GTE brine) were conducted under low or acidic pH of about 3.5 to about 5.5 and under high or alkaline pH of about 11.8 to about 8.5 chlorinolysis conditions. The demonstration of proof of concept and kinetics studies experiments were conducted in an NMR tube or reacti-vials using about 1 to about 2 gram samples. The samples tested were either pure glycerin dissolved in water or a GTE brine having a total organic carbon (TOC) content of about 1470 ppm and a starting pH of about 11.8. The sodium chloride content of the GTE brine was about 23% by weight. The synthetic glycerin samples or the GTE brine samples were heated with excess bleach, which is an about 6.5% by weight aqueous solution of sodium hypochlorite, at temperatures ranging from about 90° C. to about 100° C., and glycerin destruction was monitored by NMR. The samples tested, chlorinolysis reaction temperature, and stoichiometric excess of sodium hypochlorite, assuming the stoichiometry of equation (II) were:

1. pure glycerin at a concentration of about 2,500 ppm, treated at about 90° C. with about a 4-fold sodium hypochlorite excess, 2. pure glycerin at a concentration of about 5,000 ppm, treated at about 110° C. with about a 2-fold sodium hypochlorite excess, 3. GTE brine with a starting TOC content of about 1470 ppm, treated at about 90° C. with about a 3.3-fold sodium hypochlorite excess, 4. GTE brine with a starting TOC content of about 1470 ppm, treated at about 110° C. with about a 3.3-fold sodium hypochlorite excess, and 5. GTE brine with a starting TOC content of about 1470 ppm, treated at about 110° C. with about an 8.2-fold sodium hypochlorite excess.

Figure 6:
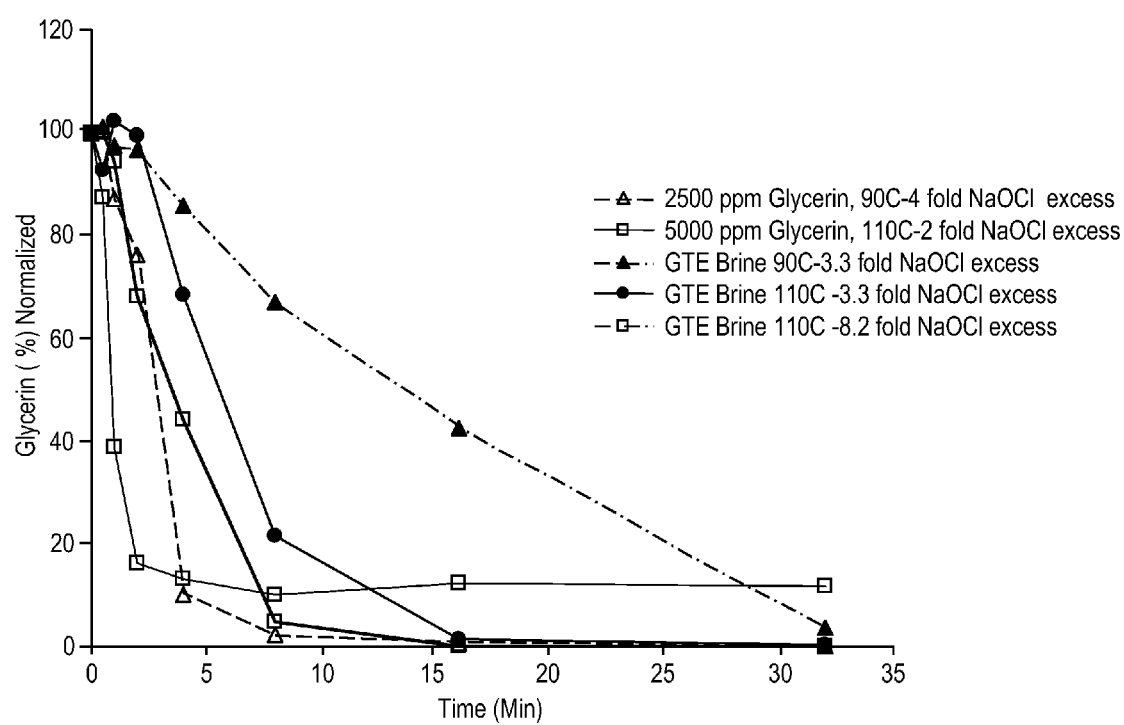
FIG. 6 is a graph showing proof of concept destruction of glycerin in various brine streams by chlorinolysis with sodium hypochlorite at various conditions according to the present invention.

As shown in FIG. 6, the glycerin destruction data for the above five samples tested indicates that a majority of glycerin, which is a major component contributing to the TOC in GTE brine was destroyed under a variety of chlorinolysis conditions.

EXAMPLE 11

After demonstration of the proof of concept in Example 10, experiments were conducted on a larger scale and in addition to monitoring of glycerin destruction by NMR, the total organic carbon (TOC) was also monitored in a chlorinolysis reaction under acidic or low pH conditions. The brine by-product stream subjected to the chlorinolysis was a brine by-product stream from the production of epichlorohydrin from glycerin (GTE brine) having a TOC content of about 1470 ppm, a sodium chloride content of about 23% by weight, based upon the weight of the GTE brine, and a pH of about 9. A 133 g sample of the GTE brine was admixed with about 66 g of commercial bleach in a flask. The commercial bleach had a sodium hypochlorite content of about 6.5% by weight, with the balance being water.

Upon dilution of the GTE brine with the bleach, the calculated TOC content of the mixture of GTE brine and bleach is about 982 ppm. On a calculated basis, assuming all of the TOC is glycerin, the amount of glycerin in the GTE brine sample is about 5.06 mmoles. The amount of sodium hypochlorite supplied by the bleach is about 57.5 mmole of sodium hypochlorite. The molar ratio of sodium hypochlorite to glycerin is about 11.36 (57.5 mmole/5.06 mmole=11.36). Thus, the excess sodium hypochlorite over stoichiometry, or the molar ratio of the sodium hypochlorite to the total organic carbon (calculated as all glycerin) in the brine byproduct stream may be about 1.62 times the stoichiometric ratio (7:1) of sodium hypochlorite to total organic carbon content calculated as all glycerin according to equation (II)) of the brine by-product stream (11.36/7=1.62).

Figure 7A:
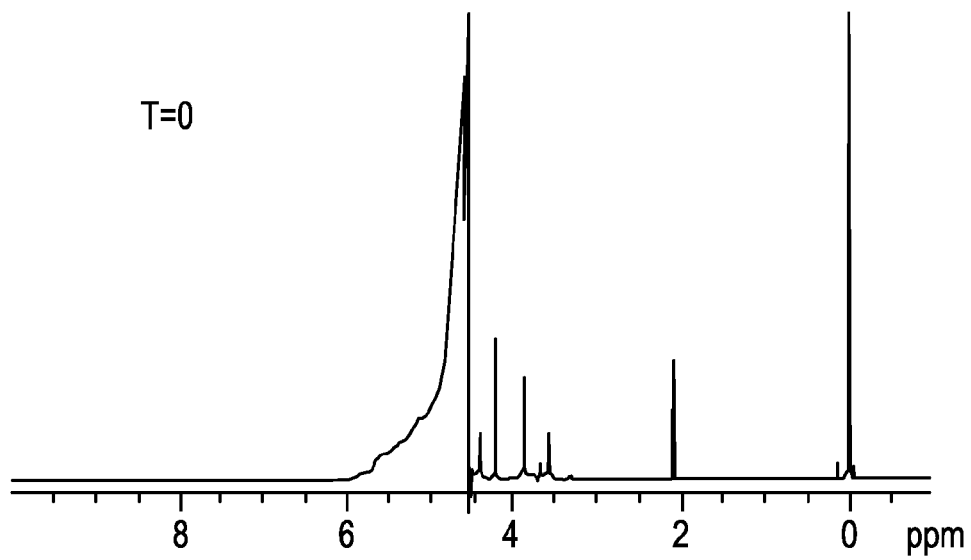
FIG. 7A shows destruction of glycerin in a brine stream as monitored by Nuclear Magnetic Resonance (NMR) by chlorinolysis at an acidic pH, at time equal to zero minutes.
Figure 7B:
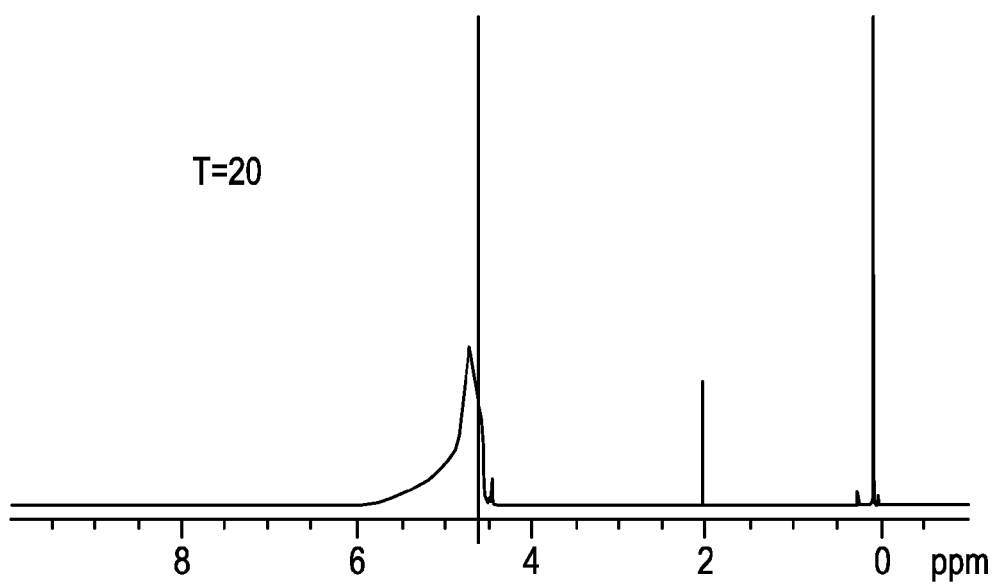
FIG. 7B shows destruction of glycerin in a brine stream as monitored by NMR by chlorinolysis at an acidic pH, at time equal to 20 minutes.

The mixture of GTE brine and bleach is admixed with hydrochloric acid (HCl) in the flask to adjust the pH of the reaction mixture to about 3.5 to about 5.5. The reaction mixture is mixed and heated in the flask at a temperature of about 100° C. for 20 minutes at atmospheric pressure. During the reaction, a reaction mixture pH of about 3.5 to about 5 is maintained by adding HCl or sodium hydroxide (NaOH) for pH adjustment as needed. Glycerin destruction achieved with the chlorinolysis is monitored using NMR. The reaction mixture is cooled down to about room temperature, and the TOC is measured to be about 55 ppm. The NMR spectrum at the start of the chlorinolysis (Time=0) is shown in FIG. 7A, and after the chlorinolysis (Time=60 minutes) is shown in FIG. 7B. As shown in FIGS. 7A and 7B, the NMR spectrum indicates that the chlorinolysis results in very substantial destruction of glycerin and no peaks for any new organic compounds.

The cooled reaction mixture is admixed with hydrochloric acid to adjust the pH of the chlorinolysis reaction product to about 2 for treatment with acidified activated carbon. About 15 g of acidified activated carbon is placed in a 50 ml burette, and conditioned with hydrochloric acid having a pH of about 2 to remove any impurities. The chlorinolysis reaction product is then added to the burette and the effluent is analyzed for TOC using a TOC analyzer. The acidified activated carbon reduces the TOC of the chlorinolysis reaction product from about 55 ppm down to less than 10 ppm as measured by the TOC analyzer.

EXAMPLE 12

After demonstration of the proof of concept in Example 10, experiments were conducted on a larger scale and in addition to monitoring of glycerin destruction by NMR, the total organic carbon (TOC) was also monitored in a chlorinolysis reaction under basic or high pH conditions. The brine by-product stream subjected to the chlorinolysis was a brine by-product stream from the production of epichlorohydrin from glycerin (GTE brine) having a TOC content of about 1470 ppm, a sodium chloride content of about 23% by weight, based upon the weight of the GTE brine, and a pH of about 11.8. A 133 g sample of the GTE brine was admixed with about 56 g of commercial bleach in a flask. The commercial bleach had a sodium hypochlorite content of about 6.5% by weight, with the balance being water.

Upon dilution of the GTE brine with the bleach, the calculated TOC content of the mixture of GTE brine and bleach is about 1040 ppm. On a calculated basis, assuming all of the TOC is glycerin, the amount of glycerin in the GTE brine sample is about 5.139 mmoles. The amount of sodium hypochlorite supplied by the bleach is about 48.772 mmole of sodium hypochlorite. The molar ratio of sodium hypochlorite to glycerin is about 9.49 (48.772 mmole/5.139 mmole=9.49). Thus, the excess sodium hypochlorite over stoichiometry, or the molar ratio of the sodium hypochlorite to the total organic carbon (calculated as all glycerin) in the brine byproduct stream may be about 1.35 times the stoichiometric ratio (7:1) of sodium hypochlorite to total organic carbon content (calculated as all glycerin according to equation (II)) of the brine by-product stream (9.49/7=1.35).

Figure 8A:
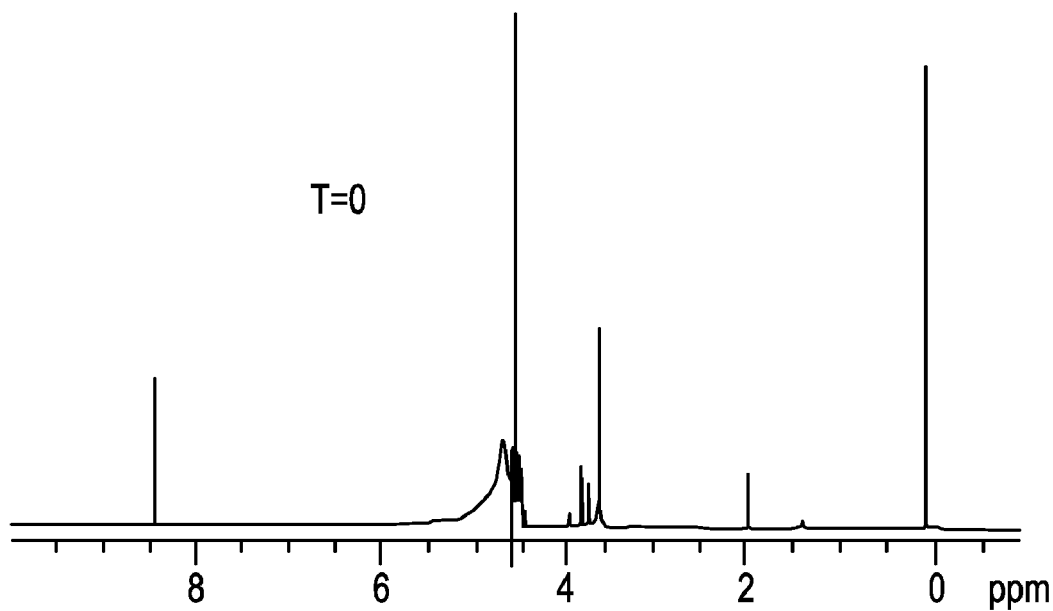
FIG. 8A shows destruction of glycerin in a brine stream as monitored by NMR by chlorinolysis at a basic pH, at time equal to zero minutes.
Figure 8B:
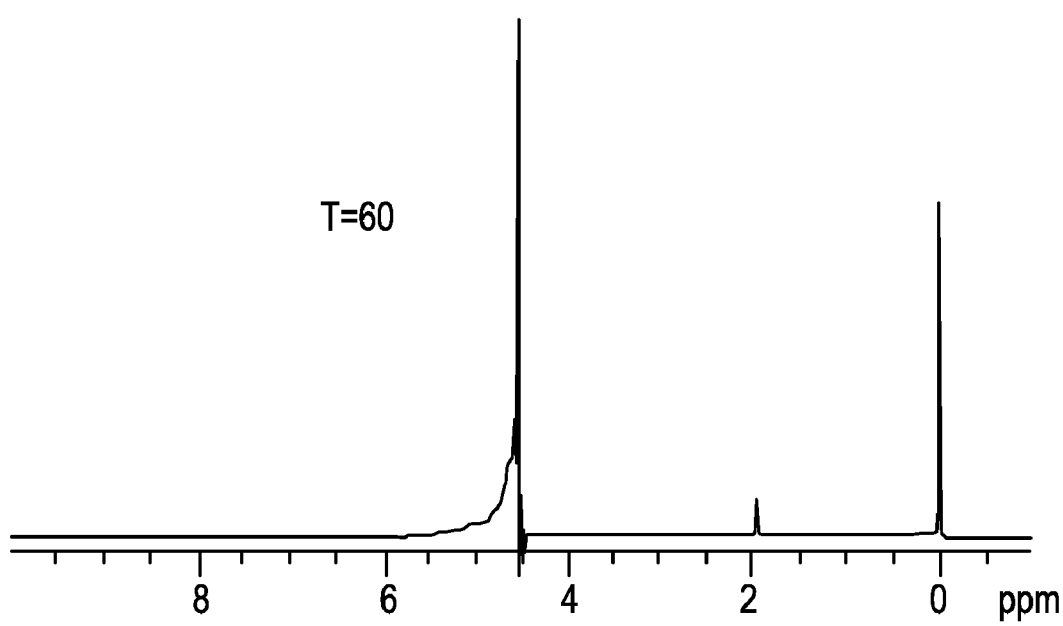
FIG. 8B shows destruction of glycerin in a brine stream as monitored by NMR by chlorinolysis at a basic pH, at time equal to sixty minutes.

The mixture of GTE brine and bleach is not admixed with any pH control agent such as hydrochloric acid (HCl) or sodium hydroxide (NaOH) for adjusting or maintaining the pH of the reaction mixture. The initial pH is permitted to fall as the reaction proceeds. The reaction mixture is mixed and heated in the flask at a temperature of about 100° C. for 20 minutes at atmospheric pressure. During the reaction, the reaction mixture pH drops to about 8.8 to about 8.5. Glycerin destruction achieved with the chlorinolysis is monitored using NMR. The reaction mixture is cooled down to about room temperature, and the TOC is measured to be about 82 ppm. The NMR spectrum at the start of the chlorinolysis (Time=0) is shown in FIG. 8A, and after the chlorinolysis (Time=60 minutes) is shown in FIG. 8B. As shown in FIGS. 8A and 8B, the NMR spectrum indicates that the chlorinolysis results in very substantial destruction of glycerin and no peaks for any new organic compounds.

The cooled reaction mixture is admixed with hydrochloric acid to adjust the pH of the chlorinolysis reaction product to about 2 for treatment with acidified activated carbon. About 15 g of acidified activated carbon is placed in a 50 ml burette, and conditioned with hydrochloric acid having a pH of about 2 to remove any impurities. The chlorinolysis reaction product is then added to the burette and the effluent is analyzed for TOC using a TOC analyzer. The acidified activated carbon reduces the TOC of the chlorinolysis reaction product from about 82 ppm down to less than 10 ppm as measured by the TOC analyzer.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process of reducing the organic content of a brine stream comprising subjecting the brine stream to at least two purification treatments to form a purified brine;
    wherein the at least two purification treatments are selected from an electrochemical treatment, a chlorinolysis treatment, a chemical oxidation treatment, a carbon adsorption treatment, an extraction treatment, a biological treatment and a crystallizing treatment;
    wherein the organic content of the purified brine is sufficiently low to enable reuse of the purified brine;
    wherein the at least two purification treatments comprise at least one crystallizing treatment comprising:
        (1) providing an aqueous brine solution comprising one or more inorganic salts and one or more organic compounds; and
        (2) conducting at least one unit operation for removing organic compounds from the aqueous brine solution of step (1) to obtain a purified brine solution;
    wherein at least about 80 weight-percent of the one or more inorganic salts of the aqueous brine solution provided in step (1) is sodium chloride;
    wherein the at least one unit operation of step (2) comprises a first redissolution operation comprising:
        (a) crystallizing the sodium chloride present in the aqueous brine solution to form sodium chloride crystals and a first mother liquor;
        (b) separating the sodium chloride crystals formed in step (a) from the first mother liquor formed in step (a);
        (c) redissolving the separated sodium chloride crystals of step (b) in an aqueous solution having an organic compound concentration substantially less than the organic compound concentration in the aqueous brine solution provided in step (1) to obtain a first purified brine solution; and
        (d) crystallizing the sodium chloride present in the first mother liquor of step (b) to produce a first recycle salt stream that is fed back to step (a) and a first mother liquor purge stream;
    wherein the first mother liquor purge stream of step (d) has a reduced volume of organic-containing purge; and
    wherein the weight-ratio of the amount of organic compound to the amount of sodium chloride present in the first purified brine solution of step (c) is less than about one-tenth of the weight-ratio of the amount of organic compound to the amount of sodium chloride present in the aqueous brine solution provided in step (1).

2. A process of reducing the organic content of a brine stream comprising subjecting the brine stream to at least two purification treatments to form a purified brine;
    wherein the at least two purification treatments are selected from an electrochemical treatment, a chlorinolysis treatment, a chemical oxidation treatment, a carbon adsorption treatment, an extraction treatment, a biological treatment and a crystallizing treatment;
    wherein the organic content of the purified brine is sufficiently low to enable reuse of the purified brine;
    wherein the at least two purification treatments comprise at least one electrochemical treatment comprising:
        (1) providing an aqueous brine solution comprising one or more inorganic salts and one or more organic compounds; and
        (2) conducting at least one unit operation for removing organic compounds from the aqueous brine solution of step (1) to obtain a purified brine solution;
    wherein at least about 80 weight-percent of the one or more inorganic salts of the aqueous brine solution provided in step (1) is sodium chloride;
    wherein the at least one unit operation of step (2) comprises: subjecting the aqueous brine solution of step (1) containing an organic content to an electrochemical process for a sufficient period of time and at a sufficient voltage to reduce the organic compound content of the aqueous brine solution to obtain a purified brine solution having a reduced organic compound content; and wherein the weight-ratio of the amount of organic compound to the amount of sodium chloride present in the purified brine solution of step (2) is less than about one-tenth of the weight-ratio of the amount of organic compound to the amount of sodium chloride present in the aqueous brine solution provided in step (1).

3. A process of reducing the organic content of a brine stream comprising subjecting the brine stream to at least two purification treatments to form a purified brine;

wherein the at least two purification treatments are selected from an electrochemical treatment, a chlorinolysis treatment, a chemical oxidation treatment, a carbon adsorption treatment, an extraction treatment, a biological treatment and a crystallizing treatment;

wherein the organic content of the purified brine is sufficiently low to enable reuse of the purified brine;

wherein the at least two purification treatments comprise at least one biological treatment comprising:
(1) providing an aqueous brine solution comprising one or more inorganic salts, one or more organic compounds, and optionally one or more microbial nutrients other than microbial nutrients comprised in the one or more inorganic salts and the one or more organic compounds; and
(2) conducting at least one unit operation for removing organic compounds from the aqueous brine solution of step (1) to obtain a purified brine solution;

wherein the aqueous brine solution of step (1) contains at least 10 weight-percent of the one or more inorganic salts, and at least about 80 weight-percent of the one or more inorganic salts of the aqueous brine solution of step (1) is sodium chloride;

wherein the at least one unit operation of step (2) comprises:
(a) contacting the aqueous brine solution with living microbes capable of oxidizing the organic compounds in the presence of oxygen;
(b) optionally adding biological nutrients to the aqueous brine solution proportional to microbial demand for biological nutrients not satisfied by the aqueous brine solution; and
(c) separating the microbes from the aqueous brine solution to obtain a purified brine solution;

wherein the weight-ratio of the amount of organic compound to the amount of sodium chloride present in the purified brine solution of step (c) is less than about one-tenth of the weight ratio of the amount of organic compound to the amount of sodium chloride present in the aqueous brine solution provided in step (1).

4. A process of reducing the organic content of a brine stream comprising subjecting the brine stream to at least two purification treatments to form a purified brine;

wherein the at least two purification treatments are selected from an electrochemical treatment, a chlorinolysis treatment, a chemical oxidation treatment, a carbon adsorption treatment, an extraction treatment, a biological treatment and a crystallizing treatment;

wherein the organic content of the purified brine is sufficiently low to enable reuse of the purified brine;

wherein the at least two purification treatments comprise at least one chlorinolysis treatment comprising:
(1) providing an aqueous brine solution comprising one or more inorganic salts and one or more organic compounds; and
(2) conducting at least one unit operation for removing organic compounds from the aqueous brine solution of step (1) to obtain a purified brine solution;

wherein at least about 80 weight-percent of the one or more inorganic salts of the aqueous brine solution provided in step (1) is sodium chloride;

wherein the at least one unit operation of step (2) comprises at least one chlorinolysis operation comprising:
(a) subjecting a brine by-product stream having a high total organic carbon content to chlorinolysis at a temperature of less than about 125° C. to obtain a chlorinolysis product stream; and
(b) treating the chlorinolysis product stream with activated carbon to obtain a purified brine solution;

wherein the weight-ratio of the amount of organic compound to the amount of sodium chloride present in the purified brine solution of step (b) is less than about one-tenth of the weight-ratio of the amount of organic compound to the amount of sodium chloride present in the aqueous brine solution provided in step (1).

5. A process of reducing the organic content of a brine stream comprising subjecting the brine stream to at least two purification treatments to form a purified brine;

wherein the at least two purification treatments are selected from an electrochemical treatment, a chlorinolysis treatment, a chemical oxidation treatment, a carbon adsorption treatment, an extraction treatment, a biological treatment and a crystallizing treatment;

wherein the organic content of the purified brine is sufficiently low to enable reuse of the purified brine;

wherein the at least two purification treatments comprise at least one chemical oxidation treatment comprising:
(1) providing an aqueous brine solution comprising one or more inorganic salts and one or more organic compounds; and
(2) conducting at least one unit operation for removing organic compounds from the aqueous brine solution of step (1) to obtain a purified brine solution;

wherein at least about 80 weight-percent of the one or more inorganic salts of the aqueous brine solution provided in step (1) is sodium chloride;

wherein the at least one unit operation of step (2) comprises: subjecting the aqueous brine solution of step (1) containing an organic content to at least one chemical oxidation treatment selected from: (1) a Fenton oxidation with hydrogen peroxide and iron (II) catalyst in two stages; (2) an activated carbon treatment followed by a Fenton oxidation with hydrogen peroxide and iron II) catalyst; or (3) a Fenton oxidation with hydrogen peroxide and iron (II) catalyst followed by an activated carbon treatment; to obtain a purified brine solution having a reduced organic compound content; and wherein the weight-ratio of the amount of organic compound to the amount of sodium chloride present in the purified brine solution of step (2) is less than about one-tenth of the weight-ratio of the amount of organic compound to the amount of sodium chloride present in the aqueous brine solution provided in step (1).

6. The process of claim 1, wherein the at least one unit operation of step (2) further comprises a second redissolution operation comprising:
(i) crystallizing the sodium chloride present in the first purified brine solution of step (c) to form sodium chloride crystals and a second mother liquor;
(ii) separating the sodium chloride crystals formed in step (i) from the second mother liquor formed in step (i);

(iii) redissolving the separated sodium chloride crystals of step (ii) in an aqueous solution having an organic compound concentration substantially less than the organic compound concentration in the first purified brine solution of step (c) to obtain a second purified brine solution having a total organic carbon concentration less than the total organic carbon concentration of the first purified brine solution of step (c); and (iv) crystallizing the sodium chloride present in the second mother liquor of step (ii) or a combined stream of the first mother liquor purge stream of step (d) and the second mother liquor of step (ii) to produce a second recycle salt stream that is fed back to step (a) and/or to step (i) and a second mother liquor purge stream;

wherein the second mother liquor purge stream of step (iv) has a reduced volume of organic-containing purge; and wherein the weight-ratio of the amount of organic compound to the amount of sodium chloride present in the second purified brine solution of step (iii) is less than about one-hundreth of the weight-ratio of the amount of organic compound to the amount of sodium chloride present in the aqueous brine solution provided in step (1).

7. The process of claim 1, wherein brine stream originates from a chemical process; and wherein the organic content of the purified brine is sufficiently low to be recycled back to the chemical process or to a different chemical process.

8. The process of claim 7, wherein the chemical process is selected from a process for making epichlorohydrin; a process for reacting a polyphenol compound with epichlorohydrin to make an epoxy resin; a process for making methylene dianiline or poly-methylene dianiline oligomers from phenol and formaldehyde in the presence of a hydrochloric acid; or a process for making epichlorohydrin from glycerin; or wherein the different chemical process is a chlor-alkali process.

9. The process of claim 4, wherein the at least one unit operation of step (2) comprises at least one chlorinolysis operation comprising:

(a) subjecting a brine by-product stream produced in the production of epichlorohydrin from glycerin to chlorinolysis by admixing the brine by-product stream with chlorine gas and sodium hydroxide at a pH of about 3.5 to about 11.8 and a temperature of less than about 125° C., said brine by-product stream having a total organic carbon content of at least about 500 ppm by weight and a sodium chloride content of about 15% by weight to about 23% by weight, based upon the weight of the brine by-product stream; wherein the chlorinolysis reduces the total organic carbon content of the brine by-product stream to less than about 100 ppm by weight, based upon the weight of the resulting chlorinolysis product stream;

(b) adjusting the pH of the chlorinolysis product stream to a pH of about 2 to about 3; and (c) treating the chlorinolysis product stream with acidified activated carbon to obtain a recyclable brine stream, wherein treatment of the chlorinolysis product stream with the activated carbon further reduces the total organic carbon content of the chlorinolysis product stream to less than about 10 ppm by weight.

10. The process of claim 5, wherein the purified brine solution is used as a recyclable brine stream; and said recyclable brine stream contains a total organic carbon content of less than about 10 ppm.

11. The process of claim 1, wherein the one or more organic compounds comprises (a) one or more multihydroxylated-aliphatic hydrocarbon compound(s), ester(s) thereof and/or monoepoxides thereof, and/or dimers, trimers and/or oligomers thereof, and/or halogenated and/or aminated derivatives thereof, (b) one or more organic acids having from 1 to 10 carbon atoms, ester(s) thereof, monoepoxide(s) thereof and/or salt(s) thereof, (c) one or more alkylene bisphenol compound(s) and/or epoxide(s), diols and/or chlorohydrins thereof, and/or (d) aniline, methylene dianiline, and/or phenol.

12. The process of claim 1, wherein the aqueous brine solution provided in step (1) is produced by epoxidation of chlorohydrin(s) by reacting chlorohydrin(s) with sodium hydroxide; and wherein the chlorohydrin(s) is/are produced by contacting a liquid-phase reaction mixture comprising glycerol and/or ester(s) thereof and/or monochlorohydrin(s) and/or ester(s) thereof with at least one chlorinating feed stream comprising at least one chlorinating agent, optionally in the presence of water, one or more catalyst(s), and/or one or more heavy byproduct(s) in a reaction vessel under hydrochlorination conditions.

13. The process of claim 1, wherein the aqueous brine solution provided in step (1) is produced by epoxidation of at least one alkylene bisphenol compound.

14. The process of claim 1, wherein the aqueous brine solution provided in step (1) comprises aniline, methylene dianiline and/or phenol; wherein the aqueous brine solution provided in step (1) is produced by sodium hydroxide neutralization of hydrogen chloride used to catalyze the reaction of aniline with formaldehyde to make methylene dianiline; and wherein the aqueous brine solution produced by sodium hydroxide neutralization of hydrogen chloride is subjected to azeotropic distillation to remove at least 50 weight-percent of aniline and/or methylene dianiline present in the aqueous brine solution prior to providing the aqueous brine solution in step (1).

15. The process of claim 14, wherein the aqueous brine solution provided in step (1) has not been subjected to a stripping operation to remove aniline and/or methylene dianiline prior to the first redissolution operation.

16. The process of claim 1, wherein the total organic carbon concentration of the aqueous brine solution provided in step (1) is at least 200 ppm.

17. The process of claim 1, wherein less than 5 weight-percent of the inorganic salt of the aqueous brine solution provided in step (1) is a salt having carbonate and/or sulfate anions.

18. The process of claim 1, wherein the purified brine solution obtained in step (2) has a total organic carbon concentration less than about 10 ppm.

19. The process of claim 1, wherein the purified brine is introduced into the anode side of an electrolytic cell as at least a portion of brine starting material for making (a) sodium hydroxide and (b) chlorine gas or hypochlorite via a chlor-alkali process.

20. An apparatus for reducing the organic content of a brine stream comprising a means for subjecting the brine stream to at least two purification treatment means to form a purified brine;

wherein the at least two purification treatment means are selected from an electrochemical treatment, a chlorinolysis treatment, a chemical oxidation treatment, a carbon adsorption treatment, an extraction treatment, a biological treatment and a crystallizing treatment;

wherein the organic content of the purified brine is sufficiently low to enable reuse of the purified brine;

wherein the at least two purification treatment means comprise at least one means selected from an electrochemical treatment, a chlorinolysis treatment, a chemical oxidation treatment, a carbon adsorption treatment, an extraction treatment, a biological treatment and a crystallizing treatment comprising:
(1) a means for providing an aqueous brine solution comprising one or more inorganic salts and one or more organic compounds; and
(2) a means for conducting at least one unit operation for removing organic compounds from the aqueous brine solution of means (1) to obtain a purified brine solution;

wherein at least about 80 weight-percent of the one or more inorganic salts of the aqueous brine solution provided in means (1) is sodium chloride; wherein the at least one unit operation of means (2) comprises: a means for subjecting the aqueous brine solution of means (1) containing an organic content to at least one means selected from an electrochemical treatment, a chlorinolysis treatment, a chemical oxidation treatment, a carbon adsorption treatment, an extraction treatment, a biological treatment and a crystallizing treatment to reduce the organic compound content of the aqueous brine solution to obtain a purified brine solution having a reduced organic compound content; and wherein the weight-ratio of the amount of organic compound to the amount of sodium chloride present in the purified brine solution of means (2) is less than about one-tenth of the weight-ratio of the amount of organic compound to the amount of sodium chloride present in the aqueous brine solution of means (1).

21. The apparatus of claim 20, wherein the brine stream originates from a chemical process; and the apparatus includes a means for recycling the purified brine solution to the chemical process or to a different chemical process.

* * * * *